US 12,521,656 B2

(12) United States Patent
Oomori et al.

(10) Patent No.: US 12,521,656 B2
(45) Date of Patent: Jan. 13, 2026

(54) FILTRATION DEVICE AND FILTRATION SYSTEM

(71) Applicant: MITSUBISHI KAKOKI KAISHA, LTD., Kanagawa (JP)

(72) Inventors: Kazuki Oomori, Kanagawa (JP); Masayoshi Usui, Kanagawa (JP); Koichi Tani, Kanagawa (JP); Akito Kamatani, Kanagawa (JP)

(73) Assignee: MITSUBISHI KAKOKI KAISHA, LTD., Kanagawa (JP)

( * ) Notice: Subject to any disclaimer, the term of this patent is extended or adjusted under 35 U.S.C. 154(b) by 0 days.

(21) Appl. No.: 18/707,060

(22) PCT Filed: Nov. 4, 2022

(86) PCT No.: PCT/JP2022/041153
§ 371 (c)(1),
(2) Date: May 2, 2024

(87) PCT Pub. No.: WO2023/080199
PCT Pub. Date: May 11, 2023

(65) Prior Publication Data
US 2024/0335775 A1    Oct. 10, 2024

(30) Foreign Application Priority Data
Feb. 24, 2022   (JP) .................. 2022-027233

(51) Int. Cl.
*B01D 35/06*   (2006.01)
*B03C 5/02*   (2006.01)

(52) U.S. Cl.
CPC ............... *B01D 35/06* (2013.01); *B03C 5/02* (2013.01)

(58) Field of Classification Search
CPC ........... B01D 35/06; B03C 5/02; C02F 11/15; Y02E 60/10
(Continued)

(56) References Cited

U.S. PATENT DOCUMENTS

| 4,468,306 A | 8/1984 | Freeman et al. |
| 4,569,739 A * | 2/1986 | Klinkowski ........... B01D 57/02 204/535 |

(Continued)

FOREIGN PATENT DOCUMENTS

| CN | 203392901 U | 1/2014 |
| CN | 205367831 U | 7/2016 |

(Continued)

OTHER PUBLICATIONS

Dec. 27, 2022, International Search Report for related PCT application No. PCT/JP2022/041153.

(Continued)

*Primary Examiner* — Madeline Gonzalez
(74) *Attorney, Agent, or Firm* — Paratus Law Group, PLLC

(57) ABSTRACT

A filtration device according to the present invention includes: a filter chamber 3 to which slurry 40 containing a particle and a liquid having different electric charges is supplied through a supply line; a first electrode group 10A or a second electrode group 10B including cathode electrodes 11, 12 or anode electrodes 13, 14 provided on both side surfaces of the filter chamber to face each other and configured to separate the particle 42 and the liquid 41 in the slurry 40 into separated substances by an electric field action; and a first discharge chamber 4 and a second discharge chamber 5 provided for the first electrode group 10A

(Continued)

and the second electrode group 10B to face the filter chamber 3 and configured to allow discharging of the separated substances.

7 Claims, 33 Drawing Sheets

(58) Field of Classification Search
USPC .. 210/348, 681, 748.01, 748.17, 416.1, 455; 204/630–640, 660, 665
See application file for complete search history.

(56) References Cited

U.S. PATENT DOCUMENTS

| | | |
|---|---|---|
| 4,755,305 A | 7/1988 | Fremont et al. |
| 4,767,514 A | 8/1988 | Candor |
| 2005/0072675 A1 | 4/2005 | Dudziak et al. |
| 2010/0155261 A1 | 6/2010 | Troshin et al. |
| 2010/0200425 A1 | 8/2010 | Arai |
| 2015/0315043 A1 | 11/2015 | Servida |
| 2021/0078877 A1 | 3/2021 | Boon |

FOREIGN PATENT DOCUMENTS

| | | |
|---|---|---|
| CN | 109455797 A | 3/2019 |
| CN | 112479319 A | 3/2021 |
| EP | 4205828 A1 | 7/2023 |
| JP | S61-018410 A | 1/1986 |
| JP | S61-161108 A | 7/1986 |
| JP | S62-183860 A | 8/1987 |
| JP | H07-008715 A | 1/1995 |
| JP | 2002-023583 A | 1/2002 |
| JP | 2006-506223 A | 2/2006 |
| JP | 2009-072778 A | 4/2009 |
| JP | 2015-527180 A | 9/2015 |
| JP | 2015-202481 A | 11/2015 |
| JP | 2017-056397 A | 3/2017 |
| JP | 7399604 B2 | 12/2023 |
| KR | 10-2009-0015338 A | 2/2009 |
| KR | 10-2010-0072942 A | 7/2010 |
| KR | 10-2020-0133736 A | 11/2020 |

OTHER PUBLICATIONS

Dec. 27, 2022, International Search Opinion for related PCT application No. PCT/JP2022/041153.
Jan. 11, 2022, International Search Report for related PCT application No. PCT/JP2021/040863.
Jan. 11, 2022, International Search Opinion for related PCT application No. PCT/JP2021/040863.
Aug. 29, 2023, Notice of Reasons for Refusal for related JP application No. 2023-533704.
Dec. 5, 2023, Decision to Grant a Patent for related JP application No. 2023-533704.
Sep. 4, 2024, Chinese Office Action issued for related CN Application No. 202280073694.4.
Oct. 29, 2024, Korean Office Action issued for related KR Application No. 10-2024-7014913.
Feb. 10, 2025, European Search Report issued for related EP Application No. 22890019.7.

* cited by examiner

FILTRATION DEVICE AND FILTRATION SYSTEM

CROSS REFERENCE TO PRIOR APPLICATION

This application is a National Stage Patent Application of PCT International Patent Application No. PCT/JP2022/041153 (filed on Nov. 4, 2022) under 35 U.S.C. § 371, which claims priority to International Application No. PCT/JP2021/040863 (filed on Nov. 5, 2021) and Japanese Patent Application No. 2022-027233 (filed on Feb. 24, 2022), which are all hereby incorporated by reference in their entirety.

TECHNICAL FIELD

The present disclosure relates to a filtration device and a filtration system.

BACKGROUND ART

A filtration device in the following Patent Literature includes a filter material provided with a plurality of holes. When slurry is deposited on the filter material and a filtration pressure is applied to the slurry, a liquid in the slurry passes through the holes of the filter material. A concentrate having a liquid content ratio of, for example, 20% to 30% remains on the filter material.

CITATION LIST

Patent Literature

Patent Literature 1: JPH07-8715A

SUMMARY OF INVENTION

Technical Problem

According to the filtration device in the above Patent Literature, it is necessary to stop supply of the slurry in order to collect the concentrate remaining on the filter material. That is, liquid removing processing is so-called batch processing, and it is not possible to continuously supply the slurry and perform the liquid removing processing.

The present disclosure provides a filtration device and a filtration system capable of continuously performing liquid removing processing.

Solution to Problem

A filtration device according to an aspect of the present disclosure includes: a filter chamber to which slurry containing a particle and a liquid having different electric charges is supplied through a supply line; a first electrode group or a second electrode group including a cathode electrode or an anode electrode provided on both side surfaces of the filter chamber to face each other and configured to separate the particle and the liquid in the slurry into separated substances by an electric field action; and a first discharge chamber and a second discharge chamber provided for the first electrode group and the second electrode group to face the filter chamber and configured to allow discharging of the separated substances.

A filtration system according to an aspect of the present disclosure includes: a storage tank configured to store slurry in which a charged particle and a liquid are mixed; a filtration device including a closed container in which a plurality of cathode electrode and a plurality of anode electrodes are provided and configured to continuously perform solid-liquid separation of the slurry inside the closed container; a supply line configured to allow continuous supply of the slurry from the storage tank to the inside of the closed container; a circulation line configured to allow extracting of a part of the slurry from the inside of the closed container and allow continuous circulation of the slurry to the storage tank; and a metering pump provided in the circulation line and configured to adjust a circulation amount of the slurry flowing through the circulation line per unit time to be smaller than a supply amount of the slurry flowing through the supply line per unit time.

Advantageous Effects of Invention

According to the present disclosure, slurry can be continuously subjected to liquid removing processing.

DESCRIPTION OF EMBODIMENTS

Hereinafter, the present disclosure will be described in detail with reference to the drawings. The present disclosure is not limited to the following embodiments for carrying out the invention (hereinafter, referred to as embodiments). Components in the following embodiments include those that can be easily assumed by those skilled in the art, those that are substantially the same, and those that are in a so-called equivalent scope. Further, the components disclosed in the following embodiments can be appropriately combined.

Embodiment 1

Figure 1:
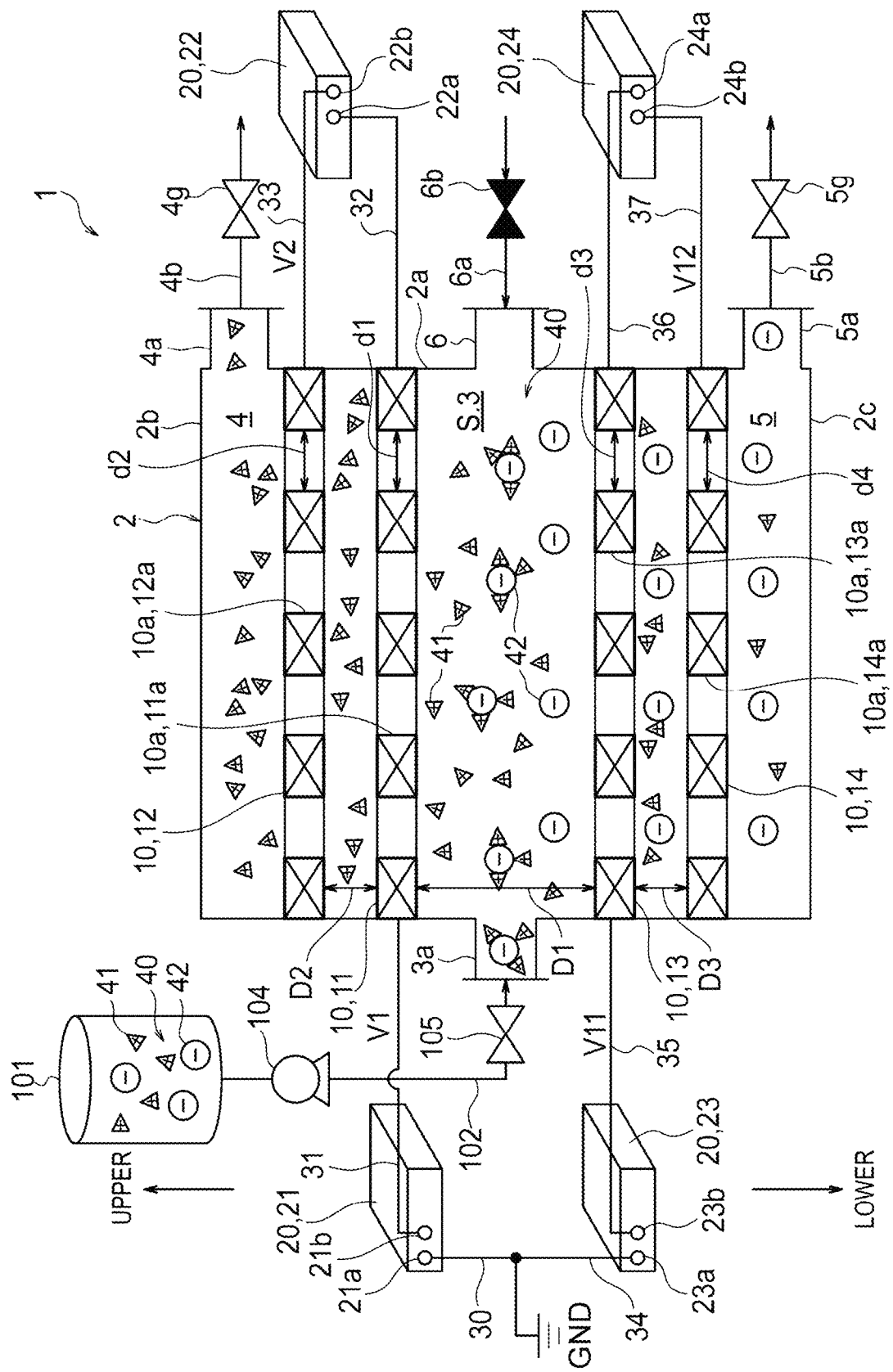
FIG. 1 is a schematic diagram schematically showing a filtration device according to Embodiment 1.
Figure 2:
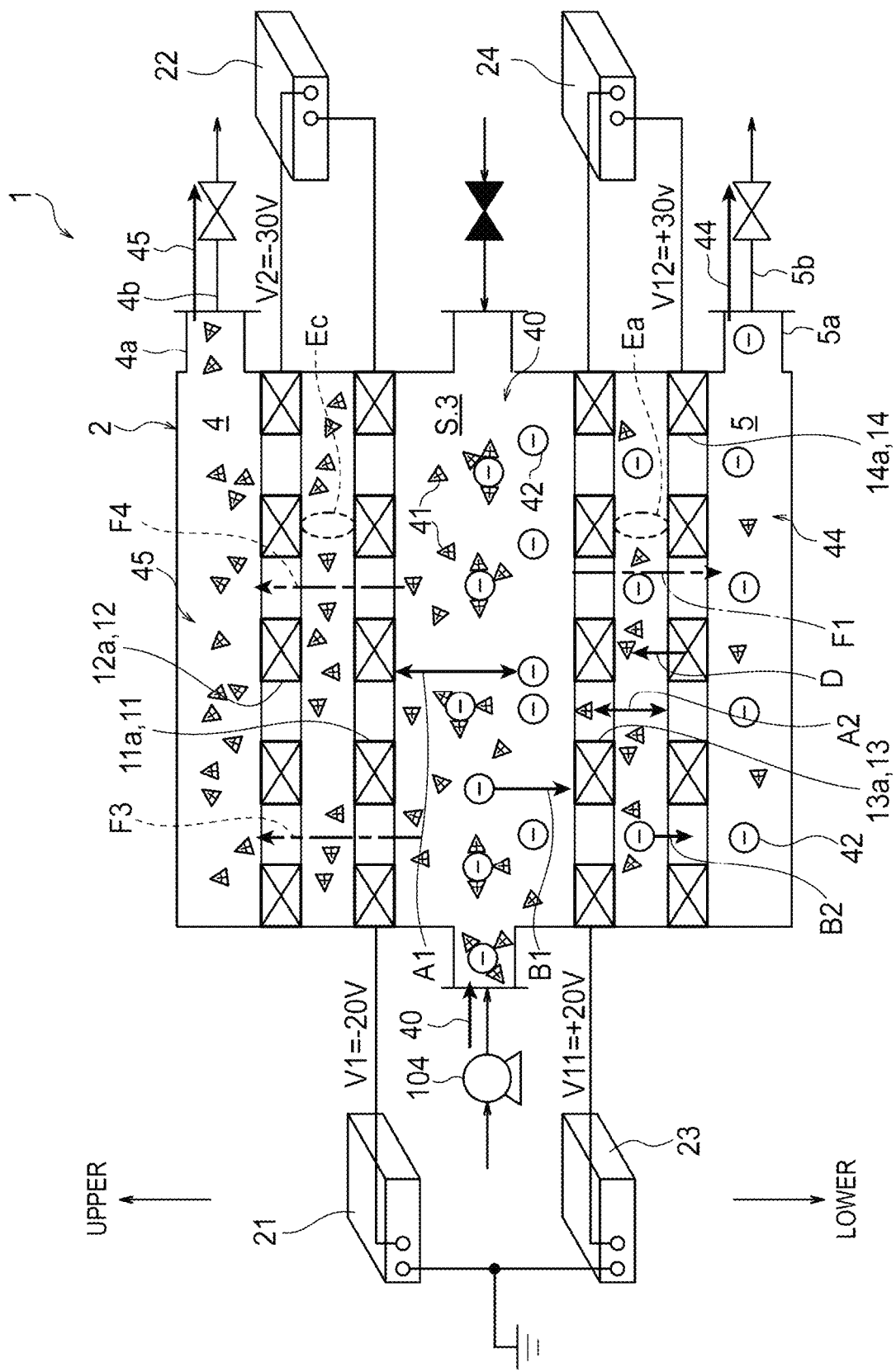
FIG. 2 is a schematic diagram showing a case where a continuous discharge operation method is performed in the filtration device according to Embodiment 1.
Figure 3:
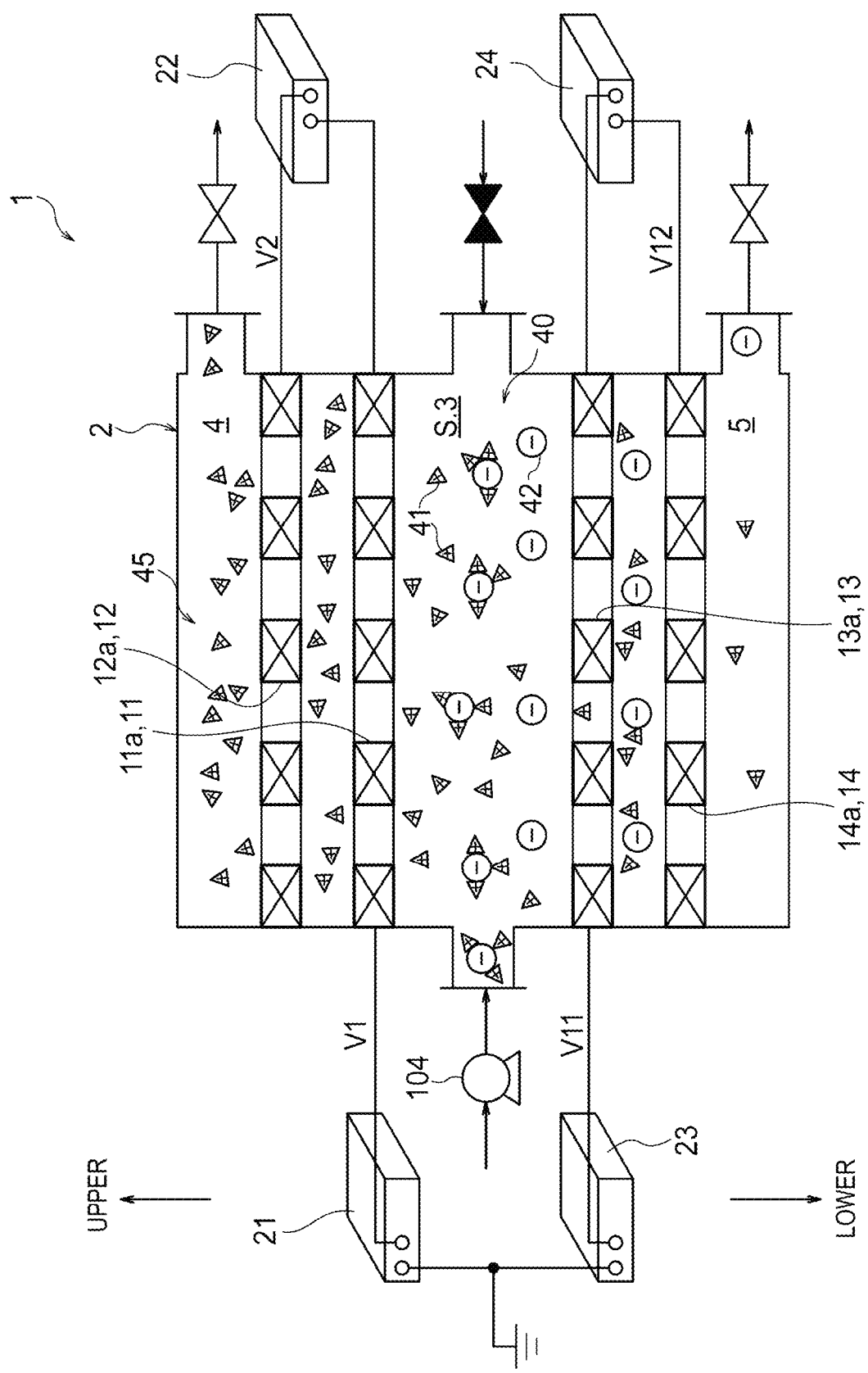
FIG. 3 is a schematic diagram showing a case where a partial discharge operation method is performed in the filtration device according to Embodiment 1.
Figure 4:
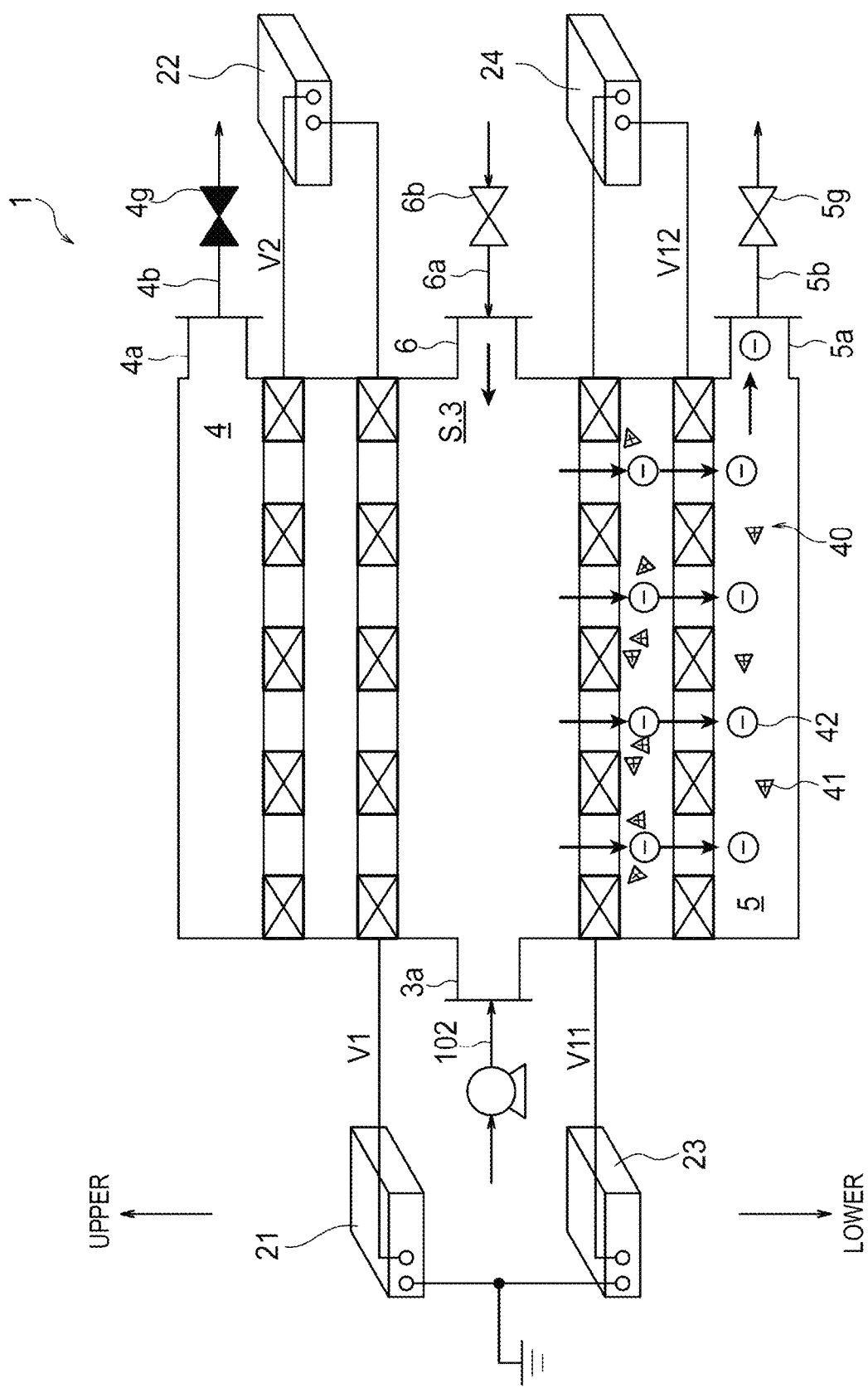
FIG. 4 is a schematic diagram showing a case where residual slurry is discharged in the filtration device according to Embodiment 1.
Figure 5:
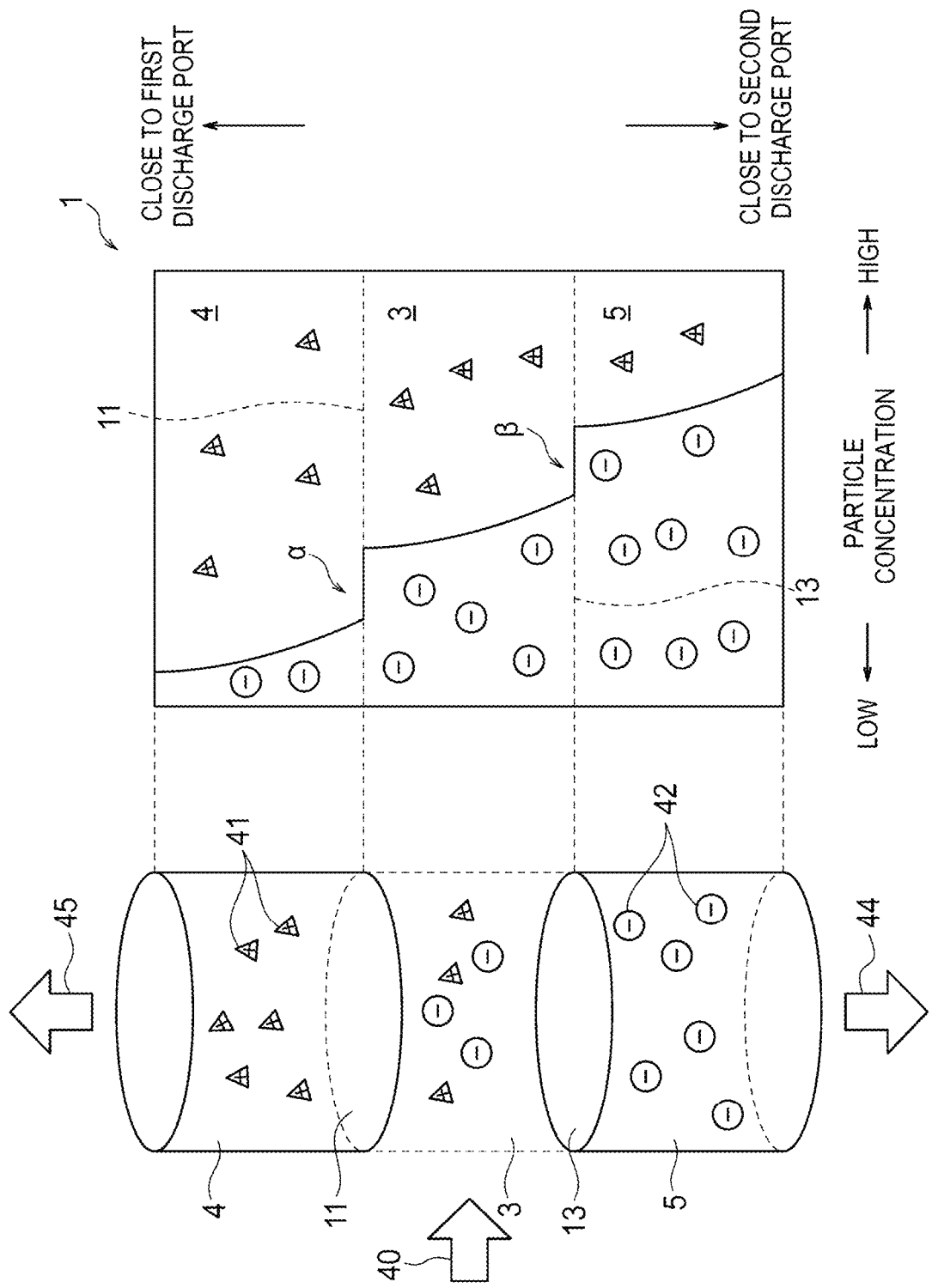
FIG. 5 is a diagram showing a particle concentration in the filtration device according to Embodiment 1.
Figure 6:
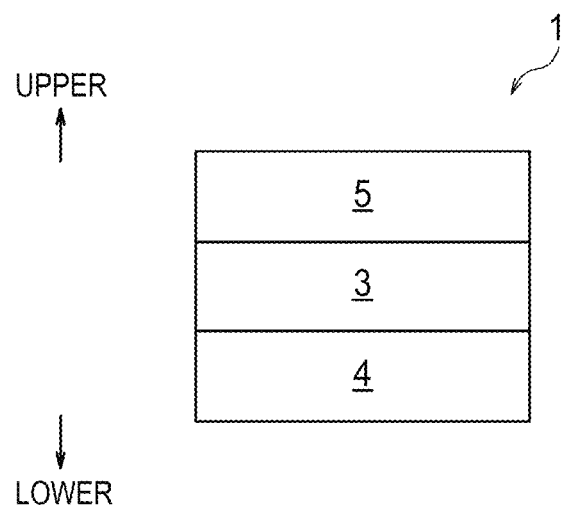
FIG. 6 is a schematic diagram showing a filtration device according to Modification 1.
Figure 7:
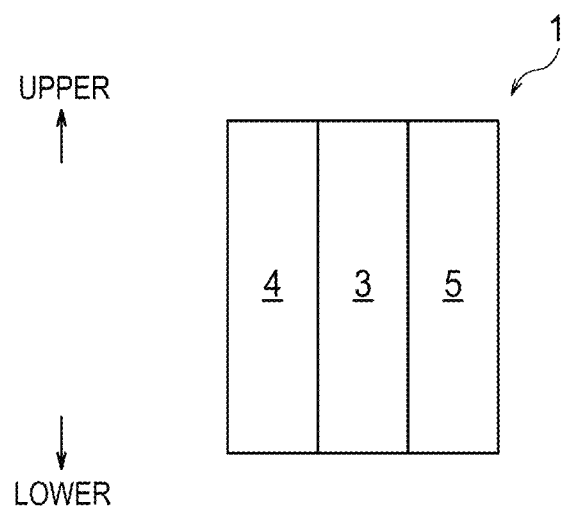
FIG. 7 is a schematic diagram showing a filtration device according to Modification 2.
Figure 8:
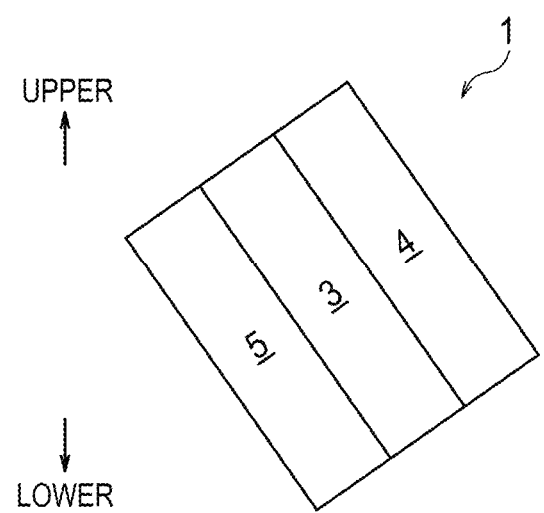
FIG. 8 is a schematic diagram showing a filtration device according to Modification 3.

FIG. 1 is a schematic diagram schematically showing a filtration device according to Embodiment 1. FIG. 2 is a schematic diagram showing a case where a continuous discharge operation method is performed in the filtration device according to Embodiment 1. FIG. 3 is a schematic diagram showing a case where a partial discharge operation method is performed in the filtration device according to Embodiment 1. FIG. 4 is a schematic diagram showing a case where residual slurry is discharged in the filtration device according to Embodiment 1. FIG. 5 is a diagram showing a particle concentration in the filtration device according to Embodiment 1. FIG. 6 is a schematic diagram showing the filtration device according to Modification 1. FIG. 7 is a schematic diagram showing the filtration device according to Modification 2. FIG. 8 is a schematic diagram showing the filtration device according to Modification 3.

A filtration device 1 according to the embodiment is a device that separates particles 42 from slurry 40 in which the particles 42 are dispersed in a liquid. The filtration device 1 can be applied to, for example, a life science field, a sewage treatment, and a wastewater treatment field. For example, in the life science field, the invention can be applied to a bioindustry in which microorganisms such as cultured cells, microalgae, bacteria, and viruses are cultured, use of enzymes, proteins, polysaccharides, lipids, and the like that are produced by cultured microorganisms outside a body or inside a body, bio-drug discovery or a cosmetics industry that is an application field, or a beverage industry, which handles brewing, fermentation, juice extraction, beverages, and the like. In the sewage treatment and wastewater treatment field, the invention can be applied to separation of biomass particles with hardly filtered fine biomass aqueous slurry. Alternatively, the filtration device 1 is a colloidal particle-based slurry in which surface-charged fine particles are highly dispersed by electric repulsion, and can be applied to concentrating and collecting colloidal fine particles.

As shown in FIG. 1, the filtration device 1 includes a closed container 2, a plurality of electrodes 10 disposed inside the closed container 2, and a plurality of power supplies 20 that supply a predetermined potential to the electrodes 10.

A closed space S is provided inside the closed container 2. The closed container 2 includes a tubular side wall 2a extending in a vertical direction (hereinafter, referred to as an upper-lower direction), an upper wall 2b closing an upper portion of the side wall 2a, and a lower wall 2c closing a lower portion of the side wall 2a. The plurality of electrodes 10 are disposed inside the closed space S. The electrode 10 extends in a horizontal direction orthogonal to the vertical direction and divides the closed space S in the upper-lower direction. Accordingly, the closed space S is divided into three sections, which are a filter chamber 3 located in a central portion of the closed space S in the upper-lower direction, a first discharge chamber 4 located above the filter chamber 3, and a second discharge chamber 5 located below the filter chamber 3.

The side wall 2a of the closed container 2 is provided with a supply port 3a, a first discharge port 4a, and a second discharge port 5a. The supply port 3a, the first discharge port 4a, and the second discharge port 5a allow the closed space S to communicate with an external space of the closed container 2.

The supply port 3a is provided on one side surface side of the filter chamber 3. One end of a supply line 102 is connected to the supply port 3a. The other end of the supply line 102 is connected to a storage tank 101. The slurry 40 in the storage tank 101 is supplied to the closed container 2 through the supply line 102. The supply line 102 is provided with a supply pump 104. The supply pump 104 pressurizes the slurry 40 in the supply line 102 toward the filter chamber 3. The closed space S is sealed. Therefore, a pressure applied by the supply pump 104 acts on the slurry 40 in the closed space S as a filtration pressure. The supply line 102 is provided with a valve 105.

The first discharge port 4a is provided in the first discharge chamber 4. A first discharge line 4b is connected to the first discharge port 4a. The first discharge line 4b is provided with a first valve 4g for adjusting a flow rate. A pressure adjustment valve (not shown) is provided downstream of the first discharge line 4b.

The second discharge port 5a is provided in the second discharge chamber 5. A second discharge line 5b is connected to the second discharge port 5a. The second discharge line 5b is provided with a second valve 5g for adjusting a flow rate. A pressure adjustment valve (not shown) is provided downstream of the second discharge line 5b.

As described above, the slurry 40 is supplied to the filter chamber 3 in the closed space S. The slurry 40 branches at the filter chamber 3 and flows into the first discharge chamber 4 or the second discharge chamber 5. In addition, a communication port 6 is provided in the side wall 2a of the closed container 2. The communication port 6 allows the filter chamber 3 to communicate with a supply line 6a. The supply line 6a is provided with a valve 6b. The valve 6b is normally closed, and is opened only when gas or a liquid is supplied into the filter chamber 3 from an outside.

The electrodes 10 are provided with a plurality of holes 10a penetrating in the upper-lower direction. The slurry 40 (a liquid and the particle 42) moves in the closed space S in the upper-lower direction through the hole 10a of the electrode 10.

An electrolytic corrosion prevention layer (not shown) is provided on a surface of the electrode 10. Examples of the electrolytic corrosion prevention layer include an insulating coating layer and a conductive noble metal layer. Examples of a material for the electrolytic corrosion prevention layer include titanium, aluminum, magnesium, and tantalum. Examples of a material of the conductive noble metal layer include platinum, gold, and palladium. In the case of the insulating coating layer, a thickness of the electrolytic corrosion prevention layer is, for example, preferably about 5 μm to 30 μm, and more preferably about 5 μm to 10 μm. A thickness of the conductive noble metal layer, which is platinum, gold, palladium or the like, for example, is preferably about 0.5 μm to 10 μm, and more preferably about 1 μm to 5 μm. The electrolytic corrosion prevention layer prevents corrosion of the surface of the electrode 10. Since the electrode 10 has an insulating coating layer, the electrode 10 does not come into contact with a liquid constituting the slurry 40. As a result, even when a potential is supplied to the electrode 10, electrolysis hardly occurs between the surface of the electrode 10 and the liquid.

The plurality of electrodes 10 include a plurality of cathode electrodes and a plurality of anode electrodes. The plurality of cathode electrodes are interposed between the filter chamber 3 and the first discharge chamber 4. In other words, the plurality of cathode electrodes separate the filter chamber 3 and the first discharge chamber 4. In the present embodiment, there are two cathode electrodes. Hereinafter, the plurality of cathode electrodes are referred to as a cathode first electrode 11 and a cathode second electrode 12 in this order from a side closer to the filter chamber 3.

The plurality of anode electrodes are interposed between the filter chamber 3 and the second discharge chamber 5. In other words, the plurality of anode electrodes separate the filter chamber 3 and the second discharge chamber 5. In the present embodiment, there are two anode electrodes. Hereinafter, the plurality of anode electrodes are referred to as an anode first electrode 13 and an anode second electrode 14 in this order from a side closer to the filter chamber 3.

The cathode first electrode 11 faces the anode first electrode 13 across the filter chamber 3. A distance D1 between the cathode first electrode 11 and the anode first electrode 13 is a distance that allows the particle 42 in the slurry 40 to move toward the anode first electrode 13, and is, for example, 0.1 mm or more and 100 mm or less, and more preferably 0.1 mm or more and 10 mm or less.

A distance D2 between the cathode first electrode 11 and the cathode second electrode 12 is not particularly limited, and is, for example, 0.1 mm or more and 20 mm or less, and more preferably 0.1 mm or more and 2 mm or less. The smaller the distance D2 between the cathode first electrode 11 and the cathode second electrode 12, the stronger a force of a cathode electric field Ec (see FIG. 2) generated between the cathode first electrode 11 and the cathode second electrode 12.

A distance D3 between the anode first electrode 13 and the anode second electrode 14 is not particularly limited, and is, for example, 0.1 mm or more and 20 mm or less, and more preferably 0.1 mm or more and 2 mm or less. The smaller the distance D3 between the anode first electrode 13 and the anode second electrode 14, the stronger a force of an anode electric field Ea (see FIG. 2) generated between the anode first electrode 13 and the anode second electrode 14.

A hole 11a of the cathode first electrode 11 and a hole 12a of the cathode second electrode 12 allow the filter chamber 3 to communicate with the first discharge chamber 4. A hole diameter d1 of the hole 11a of the cathode first electrode 11 is 0.5 μm or more and 500 μm or less, for example, about 70 μm. A hole diameter d2 of the hole 12a of the cathode second electrode 12 is 0.5 nm or more and 1000 nm or less, for example, about 100 nm. The hole diameters d1 and d2 of the holes 11a and 12a may not be the same.

A hole 13a of the anode first electrode 13 and a hole 14a of the anode second electrode 14 allow the filter chamber 3 to communicate with the second discharge chamber 5. A hole diameter d3 of the hole 13a of the anode first electrode 13 and a hole diameter d4 of the hole 14a of the anode second electrode 14 are, for example, 0.1 μm or more and 5000 μm or less, and more preferably 100 μm or more and 1000 μm or less. The hole diameters d3 and d4 of the holes 13a and 14a may not be the same.

The power supply 20 is a device that supplies a potential to the electrode 10. The number of power supplies 20 is the same as the number of electrodes 10 (four in the present embodiment). The power supply 20 includes two cathode power supplies (a cathode first power supply 21 and a cathode second power supply 22) connected to the two cathode electrodes, and two anode power supplies (an anode first power supply 23 and an anode second power supply 24) connected to the two anode electrodes.

The cathode first power supply 21 supplies a cathode first potential V1 to the cathode first electrode 11. A first terminal 21a of the cathode first power supply 21 is connected to a reference potential GND via an electric interconnect 30. The reference potential GND is, for example, a ground potential, and is not particularly limited in the present disclosure. A second terminal 21b of the cathode first power supply 21 is connected to the cathode first electrode 11 via an electric interconnect 31.

The cathode second power supply 22 supplies a cathode second potential V2 to the cathode second electrode 12. A first terminal 22a of the cathode second power supply 22 is connected to the cathode first electrode 11 via an electric interconnect 32. A second terminal 22b of the cathode second power supply 22 is connected to the cathode second electrode 12 via an electric interconnect 33.

The anode first power supply 23 supplies an anode first potential V11 to the anode first electrode 13. A first terminal 23a of the anode first power supply 23 is connected to the reference potential GND via an electric interconnect 34. A second terminal 2102 of the anode first power supply 23 is connected to the anode first electrode 13 via an electric interconnect 35.

The anode second power supply 24 applies an anode second potential V12 to the anode second electrode 14. A first terminal 24a of the anode second power supply 24 is connected to the anode first electrode 13 via an electric interconnect 36. A second terminal 24b of the anode second power supply 24 is connected to the anode second electrode 14 via an electric interconnect 37.

Cathode potentials (the cathode first potential V1 and the cathode second potential V2) and anode potentials (the anode first potential V11 and the anode second potential V12) supplied from the power supplies 20 are not constant and can be changed.

Next, the slurry 40 to be filtered by the filtration device 1 will be described. The slurry 40 is, for example, a suspension, and is a mixture of a liquid and the particle 42. The particle 42 is a target that has a charged surface. A particle diameter of the particle 42 is not particularly limited. The particle 42 having a particle diameter of, for example, 1 nm or more and 5000 μm or less can also be filtered.

Next, a method of operating the filtration device 1 will be described with reference to FIG. 2. The slurry 40 mentioned in the present embodiment includes, for example, slurry containing water as a liquid. The particle 42 is negatively charged. Water molecules 41 are positively charged, and the entire slurry 40 is in an electrically equilibrium state.

Regarding the method of operating the filtration device 1, first, the supply pump 104 is driven to supply the slurry 40 to the filter chamber 3. The supply pump 104 is continuously driven to continuously supply the slurry 40. A pressure by the supply pump 104 is set such that a pressure (a gauge pressure) in the closed space S is larger than an atmospheric pressure, for example, 0.005 MPa or more and 0.5 MPa or less, and preferably 0.02 MPa or more and 0.1 MPa or less.

Pressures downstream of the first discharge line 4b and the second discharge line 5b are adjusted to be substantially equal to the atmospheric pressure by a pressure adjustment valve (not shown). Accordingly, a pressure (hereinafter, referred to as a filtration pressure) from the supply port 3a (the filter chamber 3) toward the first discharge chamber 4 and the second discharge chamber 5 acts on the closed space S.

The cathode first potential V1 supplied from the cathode first power supply 21 to the cathode first electrode 11 is set to −20 V. The cathode second potential V2 supplied from the cathode second power supply 22 to the cathode second electrode 12 is set to −30 V. That is, the cathode power supply supplies the cathode potential (V1, V2) having the same polarity as a polarity (minus) of the particle 42 to the cathode electrode. As a distance from the filter chamber 3 increases, an absolute value of the cathode potential supplied from the cathode power supply increases (V2>V1).

The anode first potential V11 supplied from the anode first power supply 23 to the anode first electrode 13 is set to +20 V. The anode second potential V12 supplied from the anode second power supply 24 to the anode second electrode 14 is set to +30 V. That is, the anode power supply supplies the anode potential (V11, V12) having a polarity different from the polarity (minus) of the particle 42 to the anode electrode. As a distance from the filter chamber 3 increases, an absolute value of the anode potential supplied from the anode power supply increases (V12>V11).

According to the above-described operation method, when the slurry 40 is supplied to the filter chamber 3, the particle 42 in the slurry 40 receives a repulsive force from the cathode first electrode 11 that is charged with the same polarity (see an arrow A1 in FIG. 2). The particle 42 receives an attractive force from the anode first electrode 13 that is charged with a different polarity (see an arrow B1 in FIG. 2). Accordingly, the particle 42 in the filter chamber 3 moves toward the anode first electrode 13. The particle 42 moves downward (toward an anode first electrode 13 side) due to gravity. As described above, many particles 42 flowing into the filter chamber 3 are distributed near and above the anode first electrode 13.

The slurry 40 (the slurry 40 in which a concentration of the particles 42 is high) near and above the anode first electrode 13 passes through the hole 13a of the anode first electrode 13 and the hole 14a of the anode second electrode 14 due to the filtration pressure, and moves to the second discharge chamber 5 (see an arrow F1 in FIG. 2). In a process of the slurry 40 passing through the anode first electrode 13 and the anode second electrode 14, a proportion of water decreases and a proportion of the particles 42 increases, resulting in a concentrate 44. Details will be described below.

The anode electric field Ea is generated between the anode first electrode 13 and the anode second electrode 14. The anode electric field Ea exerts a force of pushing back the apparently positively charged water molecule (hereinafter, also referred to as "positively charged water molecule") 41 from the anode second electrode 14 to the anode first electrode 13. That is, the apparently positively charged water molecule 41 receives a repulsive force from the anode electric field Ea when passing between the anode first electrode 13 and the anode second electrode 14 (see an arrow A2 in FIG. 2).

As described above, the positively charged water molecule 41 is decelerated more than a movement speed when moving to the second discharge chamber 5 by simply receiving the filtration pressure. Therefore, an amount of water passing between the anode first electrode 13 and the anode second electrode 14 per unit time decreases. As a result, a proportion of water in the slurry 40 moved to the second discharge chamber 5 is smaller than that of the slurry 40 near and above the anode first electrode 13.

The anode electric field Ea between the anode first electrode 13 and the anode second electrode 14 exerts an attractive force that draws the negatively charged particle 42 from the anode first electrode 13 toward the anode second electrode 14 (see an arrow B2 in FIG. 2). That is, the particle 42 receives an attractive force from the electric field when passing between the anode first electrode 13 and the anode second electrode 14. Accordingly, the particle 42 is accelerated faster than a movement speed when moving to the second discharge chamber 5 by simply receiving the filtration pressure. Accordingly, an amount of the particles 42 passing between the anode first electrode 13 and the anode second electrode 14 per unit time increases. Therefore, a proportion of the particles 42 per unit volume in the slurry 40 moved to the second discharge chamber 5 is larger than that of the slurry 40 near and above the anode first electrode 13.

Thus, in the process of the slurry 40 passing between the anode first electrode 13 and the anode second electrode 14, the concentration of the particles 42 becomes high, resulting in the concentrate 44. The concentrate 44 is discharged from the second discharge line 5b through the second discharge port 5a due to the filtration pressure.

On the other hand, the slurry 40 having a low concentration of the particles 42 stays near and below the cathode first electrode 11 in the filter chamber 3. The slurry 40 passes through the hole 11a of the cathode first electrode 11 and the hole 12a of the cathode second electrode 12 due to the filtration pressure and moves to the first discharge chamber 4 (see an arrow F3 in FIG. 2).

Here, the cathode electric field Ec is generated between the cathode first electrode 11 and the cathode second electrode 12. The cathode electric field Ec exerts a repulsive force that prevents the negatively charged particle 42 from moving from the filter chamber 3 to the first discharge chamber 4. Therefore, the particle 42 is prevented from moving to the first discharge chamber 4.

The cathode electric field Ec generated between the cathode first electrode 11 and the cathode second electrode 12 exerts a force that draws the positively charged water molecule 41 from the filter chamber 3 toward the first discharge chamber 4. An electroosmotic flow occurs in which the positively charged water molecule 41 is drawn toward the first discharge chamber (see an arrow F4 in FIG. 2). Therefore, water in the filter chamber 3 is accelerated faster than a movement speed when moving to the first discharge chamber 4 by simply receiving the filtration pressure. Therefore, an amount of water that moves from the filter chamber 3 to the first discharge chamber 4 per unit time increases.

The water (filtrate 45) moving to the first discharge chamber 4 is discharged from the first discharge port 4a due to the filtration pressure.

As described above, most of the water in the slurry 40 moves toward the first discharge chamber 4. That is, a volume of movement from the filter chamber 3 to the first discharge chamber 4 or the second discharge chamber 5 per unit time is larger in the first discharge chamber 4. Therefore, the flow rates of water discharged from the first discharge port 4a and the second discharge port 5a are set to, for example, 9:1 (for example, 10 times concentrated) by the first valve 4g and the second valve 5g, and the amount of water discharged from the first discharge port 4a is adjusted to be large. Accordingly, a large amount of water is continuously discharged from the first discharge port 4a as the filtrate 45. The concentrate 44 is continuously discharged from the second discharge port 5a.

Here, in the present embodiment, the flow rate is set to, for example, 9:1 (for example, 10 times concentrated), but the flow rate can be appropriately set to, for example, 2:1 (for example, 3 times concentrated) by adjusting a flow rate of a metering pump.

As described above, as shown in FIG. 5, the repulsive force exerted by the cathode first electrode 11 and the cathode electric field Ec generated between the cathode first electrode 11 and the cathode second electrode 12 prevent a movement of many particles 42 to the first discharge chamber 4. Therefore, a particle concentration changes greatly with the cathode first electrode 11 as a boundary (see an arrow a in FIG. 5). That is, when moving beyond the cathode first electrode 11 to the first discharge chamber 4, the particle concentration greatly decreases.

On the other hand, the attractive force exerted by the anode first electrode 13 and the anode electric field Ea generated between the anode first electrode 13 and the anode second electrode 14 cause electrophoresis in which many particles 42 are drawn toward the second discharge chamber 5. Therefore, a particle concentration greatly changes with the anode first electrode 13 as a boundary (see an arrow R in FIG. 5). That is, when moving beyond the anode first electrode 13 to the second discharge chamber 5, the particle concentration greatly increases.

Therefore, according to the filtration device 1 in the present embodiment, for example, when the slurry 40 having a particle concentration of about 2% is supplied to the filter chamber 3, water (the filtrate 45) having a particle concentration of about 0.02% is discharged from the first discharge port 4a, and the concentrate 44 having a particle concentration of about 6% is discharged from the second discharge port 5a. As a result, in the present embodiment, a particle removal rate of 99% or more can be achieved.

Although an example of the method of operating the filtration device 1 is described above, the above-described method of operating the filtration device 1 is a method of continuously discharging the concentrate 44 from the second discharge chamber 5. In other words, the above-described operation method is an example in which the anode potentials (the anode first potential V11 and the anode second potential V12) to be supplied to the anode electrodes (23, 24) are set such that a force of the anode electric field Ea generated between the anode electrodes (23, 24) becomes smaller than the filtration pressure in the closed space S.

However, a method of using the filtration device 1 according to Embodiment 1 is not limited thereto.

Next, a usage method for intermittently discharging the concentrate 44 will be described. Hereinafter, intermittent discharge of the concentrate 44 may be referred to as partial discharge. Continuous discharge of the concentrate 44 may be referred to as continuous discharge.

In an operation method according to the partial discharge, values of the anode first potential V11 and the anode second potential V12 shown in FIG. 3 are adjusted to make the force of the anode electric field Ea generated between the anode first electrode 13 and the anode second electrode 14 larger than the filtration pressure. The cathode first potential V1 and the cathode second potential V2 are set to the same potential as in the operation of the continuous discharge.

Accordingly, as shown in FIG. 3, although the water (the water molecule 41) in the filter chamber 3 passes through the hole 13a of the anode first electrode 13 due to the filtration pressure, a movement of the water to the second discharge chamber 5 is restricted by the force of the anode electric field Ea. The particle 42 is more attracted by an attractive force of the anode second electrode 14, and is adsorbed to the anode second electrode 14. Therefore, the water and the particle 42 do not move to the second discharge chamber 5, and the particle 42 and the water stay between the anode first electrode 13 and the anode second electrode 14. When this state continues, the particles 42 staying between the anode first electrode 13 and the anode second electrode 14 increase, and the concentration of the particles 42 in the slurry 40 gradually increases. The water in the filter chamber 3 passes through the cathode first electrode 11 and the cathode second electrode 12 and is discharged from the first discharge port 4a as the filtrate 45.

After a certain period of time, the values of the anode first potential V11 and the anode second potential V12 are changed so as to be the same as those in the operation of the continuous discharge. Accordingly, the particles 42 and water staying between the anode first electrode 13 and the anode second electrode 14 move to the second discharge chamber 5, and the concentrate 44 having a high concentration of the particles 42 is generated. The concentrate 44 is discharged from the second discharge port 5a due to the filtration pressure.

After a certain amount of the concentrate 44 is discharged, the values of the anode first potential V11 and the anode second potential V12 are increased again to restrict the movement to the second discharge chamber 5. Thus, by changing the anode first potential V11 and the anode second potential V12, the discharge of the concentrate 44 becomes intermittent. The concentrate 44 has a water content smaller than that in the continuous discharge (the particle concentration is larger than 6%).

Next, a method of removing the slurry 40 remaining in the filter chamber 3 and the second discharge chamber 5 after filtration by the filtration device 1 will be described. As shown in FIG. 4, a valve (not shown) in the supply line 102 and the first valve 4g in the first discharge line 4b are closed. The second valve 5g in the second discharge line 5b and the valve 6b in the supply line 6a are opened. Compressed air is sent to the supply line 6a, and the compressed air is supplied from the communication port 6 into the filter chamber 3. Accordingly, the compressed air passes through the hole 13a of the anode first electrode 13 and the hole 14a of the anode second electrode 14 from an inside of the filter chamber 3, and moves to the second discharge chamber 5. The air is discharged from the second discharge port 5a to the external space. The slurry 40 remaining in the filter chamber 3 and the second discharge chamber 5 is discharged to the external space from the second discharge port 5a together with the compressed air. Accordingly, the entire amount of the slurry 40 remaining in the filter chamber 3 and the second discharge chamber 5 is collected. Although compressed air is supplied in the present embodiment, a liquid may be supplied. A method of supplying compressed gas and a liquid may be divided into several times, and is not particularly limited.

As described above, the filtration device 1 according to Embodiment 1 includes: the closed container 2 having the filter chamber 3, the first discharge chamber 4, and the second discharge chamber 5; the supply line 102 configured to allow supply of the slurry 40 in which the charged particle 42 and the liquid are mixed; the supply port 3a configured to allow the supply line 102 to communicate with the filter chamber 3; the first discharge port 4a configured to allow discharging of the liquid from the first discharge chamber 4; the second discharge port 5a configured to allow discharging of the concentrate 44 from which the liquid is separated from the slurry 40 from the second discharge chamber 5; and the plurality of electrodes 10 provided with the plurality of holes 10a configured to allow the particle 42 and the liquid to pass therethrough. The plurality of electrodes 10 include the plurality of cathode electrodes that separate the filter chamber 3 and the first discharge chamber 4, and the plurality of anode electrodes that separate the filter chamber 3 and the second discharge chamber 5. The plurality of cathode electrodes include the cathode first electrode 11 and the cathode second electrode 12 disposed closer to the first discharge chamber 4 than the cathode first electrode 11. The plurality of anode electrodes include the anode first electrode 13 facing the cathode first electrode 11 across the filter chamber 3, and the anode second electrode 14 disposed closer to the second discharge chamber 5 than the anode first electrode 13. The cathode first potential V1 having the same polarity as the polarity of the particle is supplied to the cathode first electrode 11. The cathode second potential V2 having the same polarity as the polarity of the particle is supplied to the cathode second electrode 12. The absolute value of the cathode second potential V2 is larger than the absolute value of the cathode first potential V1. The anode first potential V11 having the polarity different from the polarity of the particle is supplied to the anode first electrode 13. The anode second potential V12 having the polarity different from the polarity of the particles is supplied to the anode second electrode 14. The absolute value of the anode second potential V12 is larger than the absolute value of the anode first potential V11.

According to the filtration device in the present embodiment, the concentrate 44 does not remain in the filter chamber 3 and is discharged from the second discharge port 5a. Therefore, liquid removing processing of the slurry 40 can be continuously performed. The concentrate 44 is not deposited in the filter chamber 3. That is, a space for depositing the concentrate 44 in the filter chamber 3 is not required. Therefore, a size of the filter chamber 3 can be reduced (a size of the closed container 2 can be reduced). A special operation for discharging the concentrate 44 from the closed container 2 is not required.

In the filtration device 1 according to Embodiment 1, the first discharge chamber 4, the filter chamber 3, and the second discharge chamber 5 are disposed in this order from above in the vertical direction.

Accordingly, the particle 42 moves to the second discharge chamber 5 due to gravity, and is less likely to move to the first discharge chamber 4. Therefore, the filtrate 45 collected from the first discharge port 4a becomes clear.

An electrolytic corrosion prevention layer is provided on the surface of the electrode 10 of the filtration device 1 according to Embodiment 1.

Accordingly, electric corrosion of the electrode 10 is avoided. Since electrolysis hardly occurs, power consumption can be reduced.

In the method of operating the filtration device 1 according to Embodiment 1, the anode potentials (the anode first potential V11 and the anode second potential V12) to be supplied to the plurality of anode electrodes are set such that the force of the anode electric field Ea generated between the plurality of anode electrodes becomes smaller than the filtration pressure in the closed space S.

Accordingly, the concentrate 44 can be continuously discharged.

In the method of operating the filtration device 1 according to Embodiment 1, after the force of the anode electric field Ea generated between the plurality of anode electrodes is made larger than the filtration pressure in the closed space S, third potentials (the anode first potential V11 and the anode second potential V12) to be supplied to the plurality of anode electrodes are changed such that the force of the anode electric field Ea becomes smaller than the filtration pressure in the closed space S.

Accordingly, partial discharge of the concentrate 44 can be performed.

Although Embodiment 1 is described above, the present disclosure is not limited to the embodiment. For example, although the electrode 10 according to Embodiment 1 has the electrolytic corrosion prevention layer, an electrode having no electrolytic corrosion prevention layer may be used in the present disclosure. The filtration device 1 according to Embodiment 1 includes the supply pump 104 that pushes the slurry 40 inside the supply line 102 toward the filter chamber 3. However, in the present disclosure, the slurry 40 may be supplied to a pump of a device other than the filtration device. That is, the filtration device itself may not include a pump. Further, in the embodiment, the filtration pressure is applied from a supply port 3a side, but the filtration pressure may be applied to a differential pressure between the supply port 3a side and a first discharge port 4a side and a differential pressure between the supply port 3a side and the second discharge port 5a.

The filtration device 1 according to Embodiment 1 includes the plurality of cathode power supplies that supply potentials to the plurality of cathode electrodes and the plurality of anode power supplies that supply potentials to the plurality of anode electrodes. However, in the present disclosure, a potential may be supplied to a power supply of a device other than the filtration device. That is, the filtration device itself may not include the power supply itself.

Although the closed container 2 according to Embodiment 1 is arranged in an order of the first discharge chamber 4, the filter chamber 3, and the second discharge chamber 5 from a top. However, in the present disclosure, as shown in FIG. 6, the second discharge chamber 5, the filter chamber 3, and the first discharge chamber 4 may be arranged in this order from the top. As shown in FIG. 7, the first discharge chamber 4, the filter chamber 3, and the second discharge chamber 5 may be arranged side by side in the horizontal direction. As shown in FIG. 8, the first discharge chamber 4, the filter chamber 3, and the second discharge chamber 5 may be arranged side by side in an oblique direction. In a case of modifications in FIGS. 7 and 8, the supply port 3a of the slurry 40 is on a bottom side.

Positions of the supply port 3a, the first discharge port 4a, and the second discharge port 5a provided for the filter chamber 3, the first discharge chamber 4, and the second discharge chamber 5 (directions of opening portions in the chambers) may be appropriately set to the horizontal direction, the upper-lower direction, the oblique direction, or the like in the present disclosure.

Embodiment 2

Figure 9:
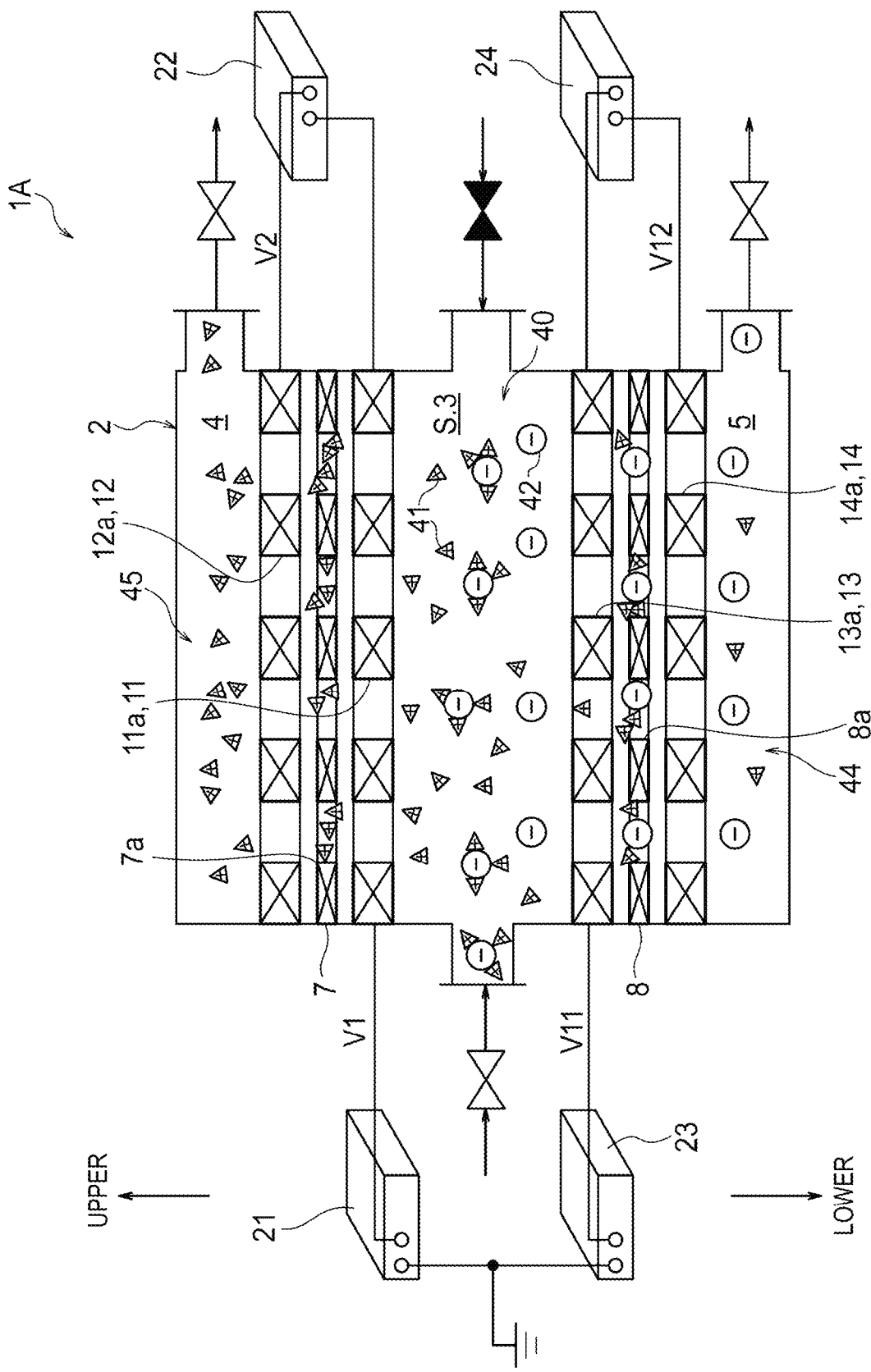
FIG. 9 is a schematic diagram schematically showing a filtration device according to Embodiment 2.

FIG. 9 is a schematic diagram schematically showing a filtration device according to Embodiment 2. As shown in FIG. 9, a filtration device 1A according to Embodiment 2 is different from the filtration device 1 according to Embodiment 1 in that the filtration device 1A includes a filter material 7 disposed between the cathode first electrode 11 and the cathode second electrode 12. The filtration device 1A according to Embodiment 2 is different from the filtration device 1 according to Embodiment 1 in that a dielectric 8 is provided between the anode first electrode 13 and the anode second electrode 14. Hereinafter, the differences will be mainly described.

The filter material 7 extends in a horizontal direction. A plurality of holes 7a penetrating in an upper-lower direction are provided in the filter material 7. A diameter of the hole 7a is smaller than the hole diameter d1 of the hole 11a of the cathode first electrode 11 and the hole diameter d2 of the hole 12a of the cathode second electrode 12. In FIG. 9, the holes are substantially the same for the sake of drawing. The diameter of the hole 7a of the filter material 7 may be about 4 times to 20 times the diameter of the particle 42.

The dielectric 8 is made of an insulating material and extends in the horizontal direction. According to the dielectric 8, the force of the anode electric field Ea acting between the anode first electrode 13 and the anode second electrode 14 increases. The dielectric 8 is provided with a hole 8a penetrating in the upper-lower direction. A diameter of the hole 8a is large enough to allow the particle 42 to pass through, and is, for example, 1000 nm or more and 4000 nm or less. A filter material such as filter paper may be used as the dielectric 8.

As described above, in the filtration device 1A according to Embodiment 2, the filter material 7 is provided between the plurality of cathode electrodes (the cathode first electrode 11 and the cathode second electrode 12).

Accordingly, as shown in FIG. 9, since the filter material 7 is provided between the plurality of cathode electrodes (the cathode first electrode 11 and the cathode second electrode 12), the particle 42 cannot pass through the hole 7a of the filter material 7 and cannot move to the first discharge chamber 4. Therefore, clear filtrate containing no particle 42 is collected into the first discharge chamber 4. The force of the anode electric field Ea generated between the cathode first electrode 11 and the cathode second electrode 12 is larger than that according to Embodiment 1 by the filter material 7. Therefore, the particle 42 is even more difficult to move to the first discharge chamber 4. Further, an amount of water moving to the first discharge chamber 4 per unit time is increased, and a filtration processing time can be shortened.

In the filtration device 1A according to Embodiment 2, the dielectric 8 provided with the plurality of holes 8a is provided between the plurality of anode electrodes (the anode first electrode 13 and the anode second electrode 14).

Accordingly, the force of the anode electric field Ea acting between the anode first electrode 13 and the anode second electrode 14 is larger than that according to Embodiment 1, and an amount of movement of the water molecule 41 moving to the second discharge chamber 5 is reduced. That is, a water content of the concentrate 44 is reduced. As a result, a concentration rate of the concentrate 44 increases.

Accordingly, the particle 42 can pass through the hole 8a of the dielectric 8 and move toward the second discharge chamber 5.

Although Embodiment 2 is described, the filtration device according to the present disclosure may include only one of the filter material 7 and the dielectric 8, and it is more preferable to provide the filter material 7.

Embodiment 3

Figure 10:
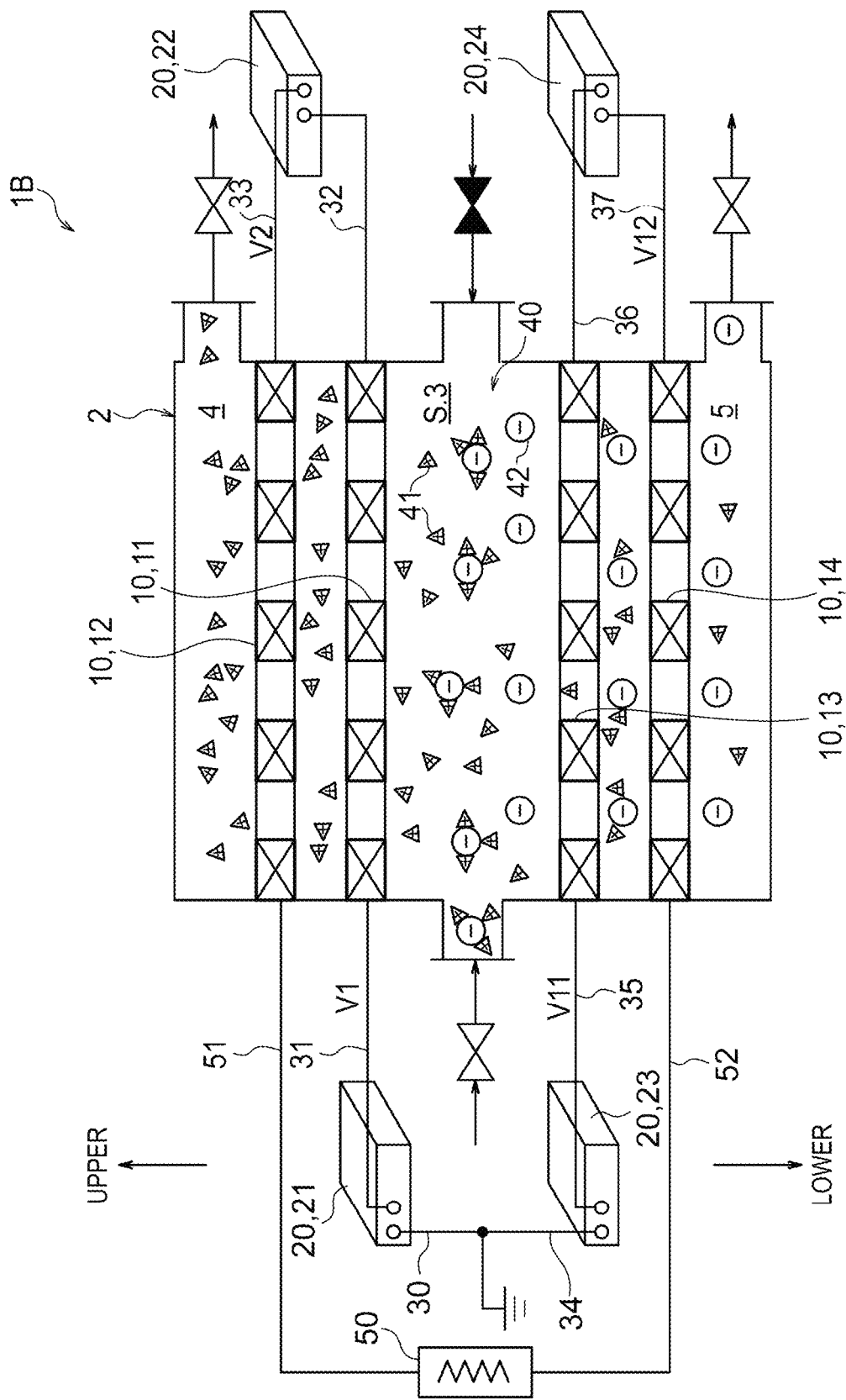
FIG. 10 is a schematic diagram schematically showing a filtration device according to Embodiment 3.
Figure 11:
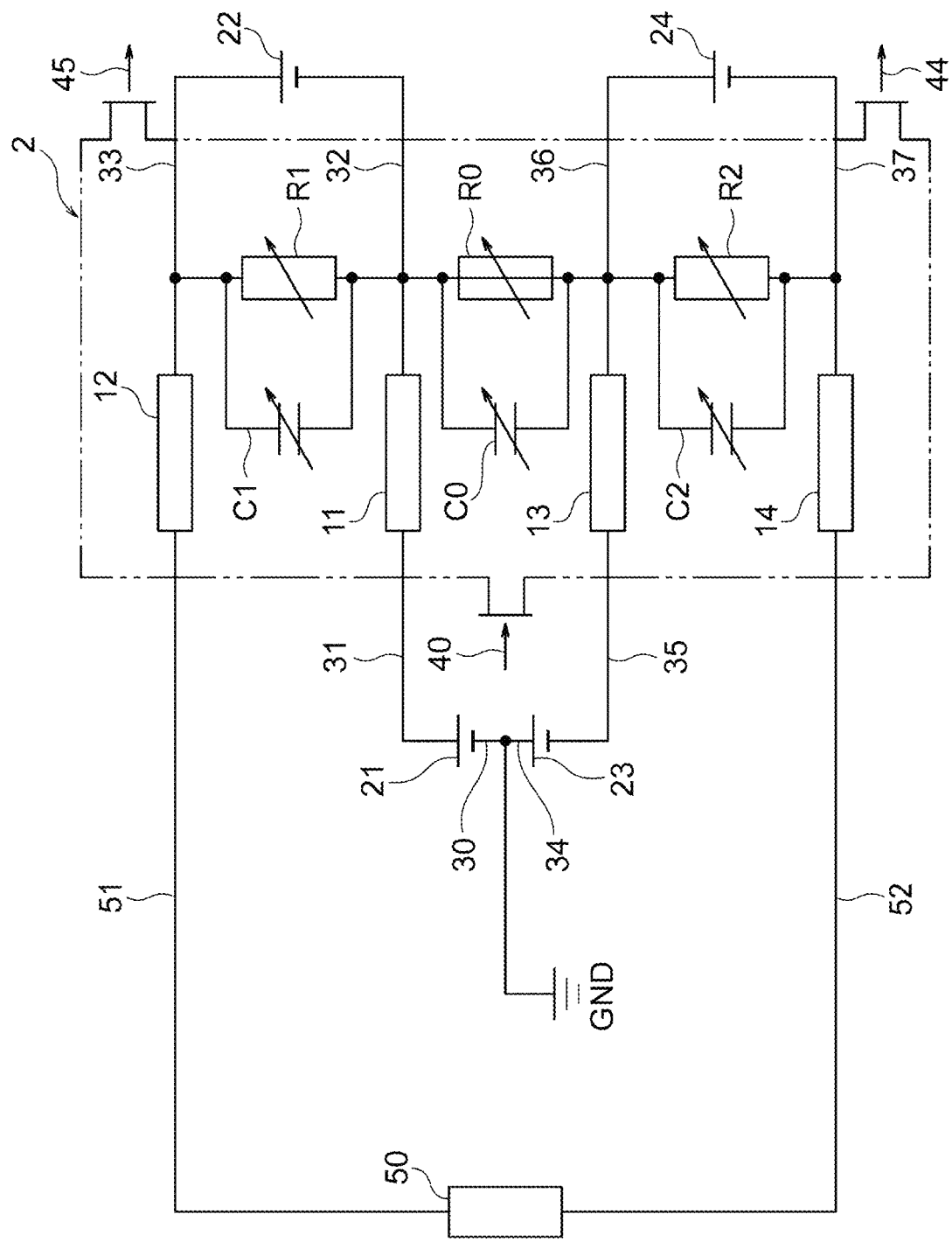
FIG. 11 is an electrical equivalent circuit diagram of the filtration device according to Embodiment 3.

FIG. 10 is a schematic diagram schematically showing a filtration device according to Embodiment 3. FIG. 11 is an electrical equivalent circuit diagram of the filtration device according to Embodiment 3. A filtration device 1B according to Embodiment 3 is different from the filtration device 1 according to Embodiment 1 in that a bleeder resistor 50, a first electric interconnect 51, and a second electric interconnect 52 are provided.

The bleeder resistor 50 is an electrical load. One end of the first electric interconnect 51 having the other end connected to the cathode second electrode 12 is connected to the bleeder resistor 50. The other end of the first electric interconnect 51 is connected to the cathode second electrode 12. That is, the other end of the first electric interconnect 51 is connected to the cathode second electrode 12 of the plurality of cathode electrodes that is farthest from the filter chamber 3.

One end of the second electric interconnect 52 having the other end connected to the anode second electrode 14 is connected to the bleeder resistor 50. The other end of the second electric interconnect 52 is connected to the anode second electrode 14. That is, the other end of the second electric interconnect 52 is connected to the anode second electrode 14 of the plurality of anode electrodes that is farthest from the filter chamber 3.

As shown in FIG. 11, in the filtration device 1B, a resistance component R0 and a capacitance component C0 are connected in parallel between the cathode first electrode 11 and the anode first electrode 13. The resistance component R0 and the capacitance component C0 are components that are equivalently represented by the liquid and particle 42 that enter between the cathode first electrode 11 and the anode first electrode 13.

A resistance component R1 and a capacitance component C1 are connected in parallel between the cathode first electrode 11 and the cathode second electrode 12. The resistance component R1 and the capacitance component C1 are components that are equivalently represented by the liquid and particle 42 that enter between the cathode first electrode 11 and the cathode second electrode 12.

A resistance component R2 and a capacitance component C2 are connected in parallel between the anode first electrode 13 and the anode second electrode 14. The resistance component R2 and the capacitance component C2 are components that are equivalently represented by the liquid and particle 42 that enter between the anode first electrode 13 and the anode second electrode 14.

According to Embodiment 3, the plurality of electrodes 10, the plurality of power supplies 20, and electric interconnects 30 to 37 form a closed loop circuit by the bleeder resistor 50, the first electric interconnect 51, and the second electric interconnect 52. In the filtration device 1 according to Embodiment 1 and the filtration device 1A according to Embodiment 2 that do not include the bleeder resistor 50, the first electric interconnect 51, and the second electric interconnect 52, there is a possibility that a current leaks to the liquid in the slurry 40 from the cathode second electrode 12 and the anode second electrode 14 having the highest potential, leading to an increase in power consumption. On the other hand, according to Embodiment 3, the leakage current that occurs from the cathode second electrode 12 and the anode second electrode 14 flows to the first electric interconnect 51 or the second electric interconnect 52. Since a short circuit occurs when the first electric interconnect 51 and the second electric interconnect 52 are directly connected, the bleeder resistor 50 is disposed between the first electric interconnect 51 and the second electric interconnect 52.

As described above, the filtration device 1B according to Embodiment 3 includes the bleeder resistor 50, the first electric interconnect 51 having the one end connected to the bleeder resistor 50, and the second electric interconnect 52 having the one end connected to the bleeder resistor 50. The other end of the first electric interconnect 51 is connected to the electrode 10 of the plurality of cathode electrodes that is the farthest from the filter chamber 3. The other end of the second electric interconnect 52 is connected to the electrode 10 of the plurality of anode electrodes that is farthest from the filter chamber 3.

According to the filtration device 1B in Embodiment 3, since the bleeder resistor 50, the first electric interconnect 51, and the second electric interconnect 52 are provided, it is possible to avoid the leakage of the current to the liquid and reduce the power consumption.

Embodiment 4

Figure 12:
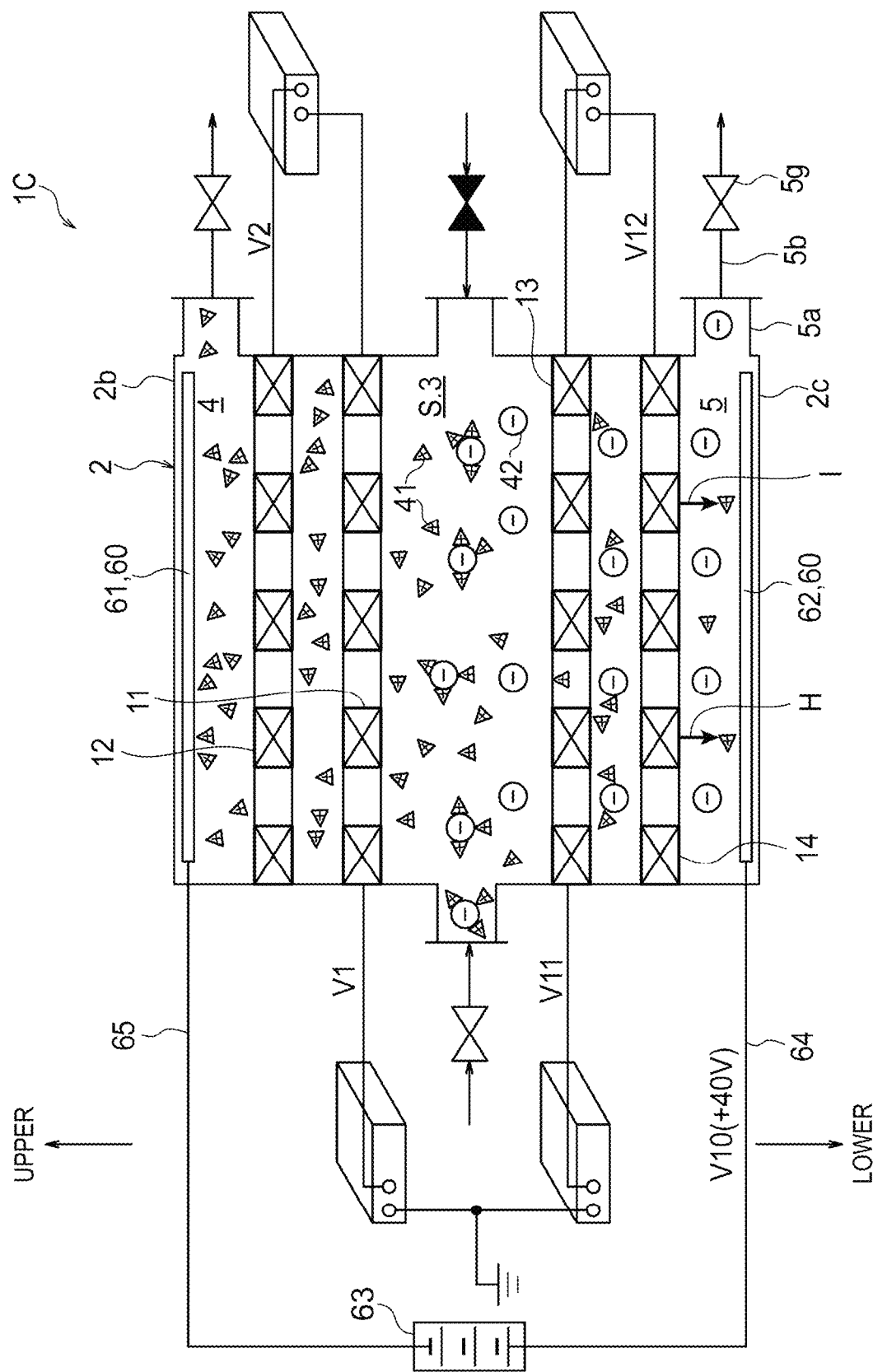
FIG. 12 is a schematic diagram schematically showing a filtration device according to Embodiment 4.

FIG. 12 is a schematic diagram schematically showing a filtration device according to Embodiment 4. A filtration device 1C according to Embodiment 4 is different from the filtration device 1 according to Embodiment 1 in that the filtration device 1C includes two neutralization electrodes 60 (a first neutralization electrode 61 and a second neutralization electrode 62) and a neutralization power supply 63 that supplies a potential of the neutralization electrode.

The first neutralization electrode 61 is disposed in the first discharge chamber 4. The first neutralization electrode 61 extends in a horizontal direction along the upper wall 2b of the closed container 2. The first neutralization electrode 61 faces the second electrode. The second neutralization electrode 62 is disposed in the second discharge chamber 5. The second neutralization electrode 62 extends in the horizontal direction along the lower wall 2c of the closed container 2. The second neutralization electrode 62 faces the third electrode. The neutralization power supply 63 is connected to the second neutralization electrode 62 via an electric interconnect 64, and supplies a potential (positive potential) having a polarity different from that of the particle to the second neutralization electrode 62. The neutralization power supply 63 is connected to first neutralization electrode 61 via an electric interconnect 65.

Next, a method of using the filtration device according to Embodiment 4 will be described. During filtration in the filtration device 1C, the negatively charged particle 42 may be attracted to the anode second electrode 14 and adsorbed to the anode second electrode 14. Since the anode first electrode 13 has a smaller attractive force than the anode second electrode 14, the particle 42 is less likely to be adsorbed to the anode first electrode 13.

In such a situation, the neutralization power supply 63 supplies a potential V10 having a polarity different from that of the particle 42 and having an absolute value larger than that of the potential of the anode second electrode 14 to the second neutralization electrode 62. For example, since the anode second potential V12 of the anode second electrode 14 is +30 V, the potential of +40 V is supplied to the second neutralization electrode 62. Accordingly, the particle 42 adsorbed to the anode second electrode 14 is attracted to the second neutralization electrode 62 that exerts a larger attractive force (see arrows H and I in FIG. 12), and are adsorbed to the second neutralization electrode 62. Thereafter, the supply of the potential to the second neutralization electrode 62 is stopped. Accordingly, the particle 42 adsorbed to the second neutralization electrode 62 moves to the second discharge port 5a and is discharged due to a filtration pressure. When the neutralization power supply 63 supplies a potential of +40 V to the second neutralization electrode 62, electrons are supplied from the first neutralization electrode 61.

As described above, the neutralization electrode (the second neutralization electrode 62) disposed in the second discharge chamber 5 according to Embodiment 4 and the neutralization power supply 63 that supplies the neutralization potential (V10) having a polarity different from the polarity of the particle 42 to the neutralization electrode (the second neutralization electrode 62) are provided. The absolute value of the neutralization potential (V10) is larger than the absolute value of the potential supplied to the electrode (the anode second electrode 14) of the plurality of anode electrodes that is farthest from the filter chamber 3 (V10>V4).

Accordingly, the particle 42 is easily peeled off from the anode second electrode 14. Therefore, the particle 42 is less likely to remain in the closed space S, and the particle 42 can be reliably collected. Although Embodiment 4 is described above, the present disclosure may include only the second neutralization electrode 62 and the neutralization power supply 63, and may not include the first neutralization electrode 61.

Embodiment 5

Figure 13:
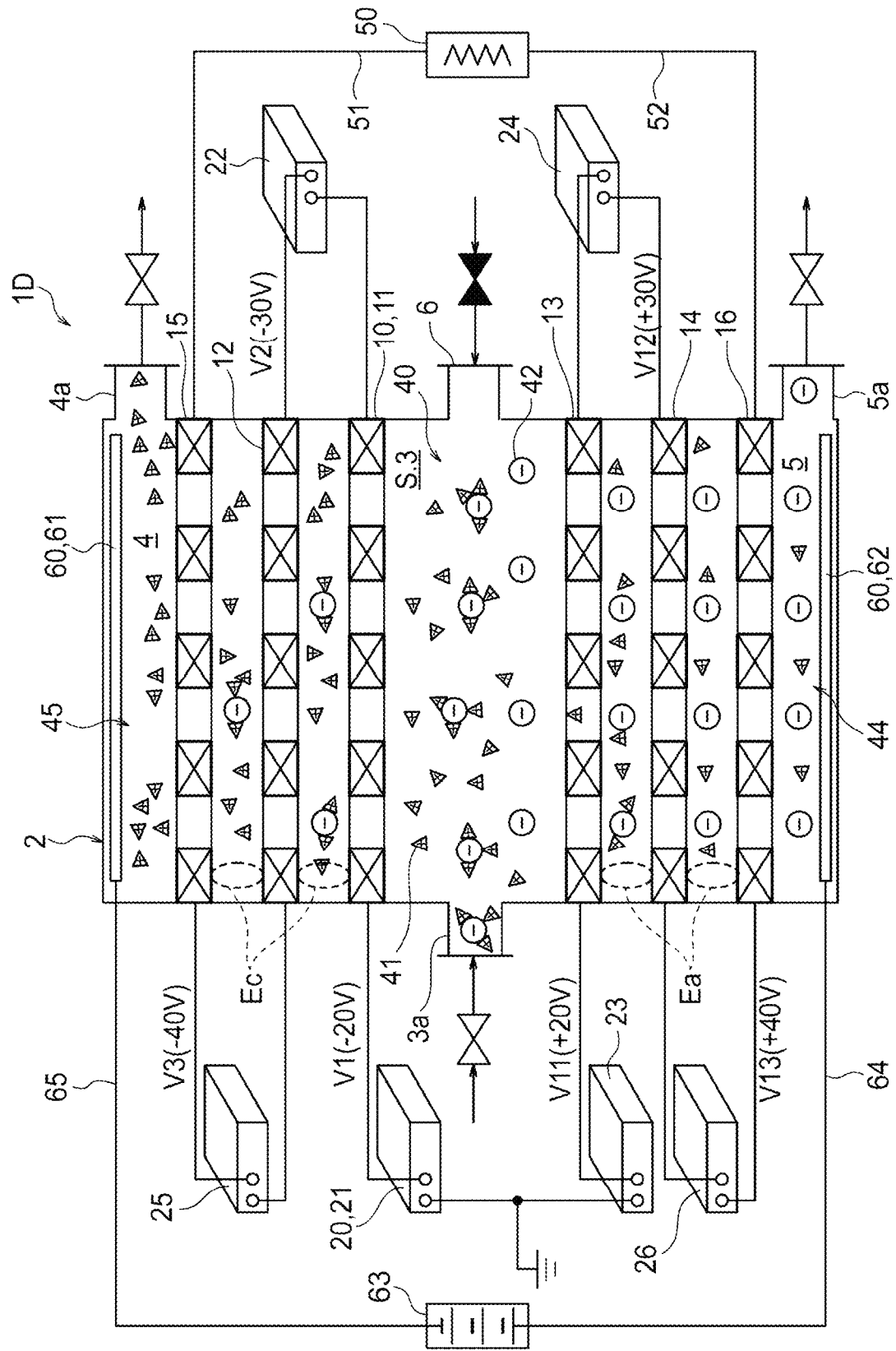
FIG. 13 is a schematic diagram schematically showing a filtration device according to Embodiment 5.

FIG. 13 is a schematic diagram schematically showing a filtration device according to Embodiment 5. As shown in FIG. 13, a filtration device 1D according to Embodiment 5 is different from the filtration device according to Embodiment 1 in that three cathode electrodes and three anode electrodes are provided. The filtration device 1D according to Embodiment 5 is different from the filtration device according to Embodiment 1 in that the number of the power supplies 20 is also increased in response to the increase in the number of electrodes. The filtration device 1D according to Embodiment 5 is different from the filtration device 1 according to Embodiment 1 in that the filtration device 1D includes the bleeder resistor 50 and the neutralization electrode 60. Hereinafter, differences will be described, but since the bleeder resistor 50 and the neutralization electrode 60 are described in Embodiment 3 and Embodiment 4, description thereof is omitted.

The cathode electrode includes the cathode first electrode 11, the cathode second electrode 12, and a cathode third electrode 15 disposed in this order from the filter chamber 3 side. The anode electrode includes the anode first electrode 13, the anode second electrode 14, and an anode third electrode 16 disposed in this order from the filter chamber 3 side.

The power supply 20 includes cathode power supplies (the cathode first power supply 21, the cathode second power supply 22, and a cathode third power supply 25) and anode power supplies (the anode first power supply 23, the anode second power supply 24, and an anode third power supply 26). The cathode first power supply 21 supplies the cathode first potential V1 to the cathode first electrode 11. The cathode second power supply 22 supplies the cathode second potential V2 to the cathode second electrode 12. The cathode third power supply 25 supplies a cathode third potential V3 to the cathode third electrode 15. The anode first power supply 23 supplies the anode first potential V11 to the anode first electrode 13. The anode second power supply 24 supplies the anode second potential V12 to the anode second electrode 14. The anode third power supply 26 supplies an anode third potential V13 to the anode third electrode 16.

Next, the potential supplied from the power supply 20 to the electrode 10 during an operation of the filtration device 1C will be described. The cathode first potential V1 supplied from the cathode first power supply 21 to the cathode first electrode 11 is set to −20 V. The cathode second potential V2 supplied from the cathode second power supply 22 to the cathode second electrode 12 is set to −30 V. The cathode third potential V3 supplied from the cathode third power supply 25 to the cathode third electrode 15 is set to −40 V.

Accordingly, the cathode electric field Ec is generated between the cathode first electrode 11 and the cathode second electrode 12 and between the cathode second electrode 12 and the cathode third electrode 15. The two cathode electric fields Ec exert repulsive forces on the particle 42. Therefore, the particle 42 is less likely to move to the first discharge chamber 4 than in Embodiment 1, and the clearer filtrate 45 can be collected than in Embodiment 1.

Due to the two cathode electric fields Ec, an amount of water moving from the filter chamber 3 to the first discharge chamber 4 per unit time is larger than that of the filtration device 1 according to Embodiment 1. Therefore, water moving to the second discharge chamber 5 is relatively reduced, and a water content of the concentrate 44 is reduced.

In the filtration device 1D according to Embodiment 5, the anode first potential V11 supplied from the anode first power supply 23 to the anode first electrode 13 is set to +20 V. The anode second potential V12 supplied from the anode second power supply 24 to the anode second electrode 14 is set to +30 V. The anode third potential V13 supplied from the anode third power supply 26 to the anode third electrode 16 is set to +40 V.

Accordingly, the particle 42 is gradually attracted to the anode first electrode 13, the anode second electrode 14, and the anode third electrode 16, and moves to the second discharge chamber 5. The anode electric field Ea is generated between the anode first electrode 13 and the anode second electrode 14 and between the anode second electrode 14 and the anode third electrode 16.

According to the two anode electric fields Ea, water (the positively charged water molecule 41) moving from the filter chamber 3 to the second discharge chamber 5 receives a large repulsive force, and a movement speed to the second discharge chamber 5 is greatly decelerated. Therefore, water moving to the second discharge chamber 5 per unit time is reduced, and the water content of the concentrate 44 is reduced. According to Embodiment 5, in a partial discharge operation, a movement of water from the filter chamber 3 to the second discharge chamber 5 is reliably reduced.

According to the filtration device 1D in Embodiment 5, the number of electrodes 10 is increased, and the water content of the concentrate 44 can be reduced. In the filtration device 1D according to Embodiment 5, the filter material 7 and the dielectric 8 may be further provided between the plurality of electrodes 10. In Embodiment 5, the number of the electrodes 10 disposed between the filter chamber 3 and the first discharge chamber 4 is three, but may be four or more. Similarly, the number of electrodes 10 disposed between the filter chamber 3 and the second discharge chamber 5 is three, but may be four or more. At this time, it is necessary to set the cathode potentials applied to the plurality of cathode electrodes and the anode potentials applied to the plurality of anode electrodes such that an absolute value of a potential increases as a distance from the filter chamber 3 increases. Embodiment 5 in which the number of the electrodes 10 is increased is described. However, in the present disclosure, when the number of the electrodes 10 is increased, the bleeder resistor 50 and the neutralization electrode 60 are not essential, and the bleeder resistor 50 and the neutralization electrode 60 may not be provided.

Embodiment 6

Figure 14:
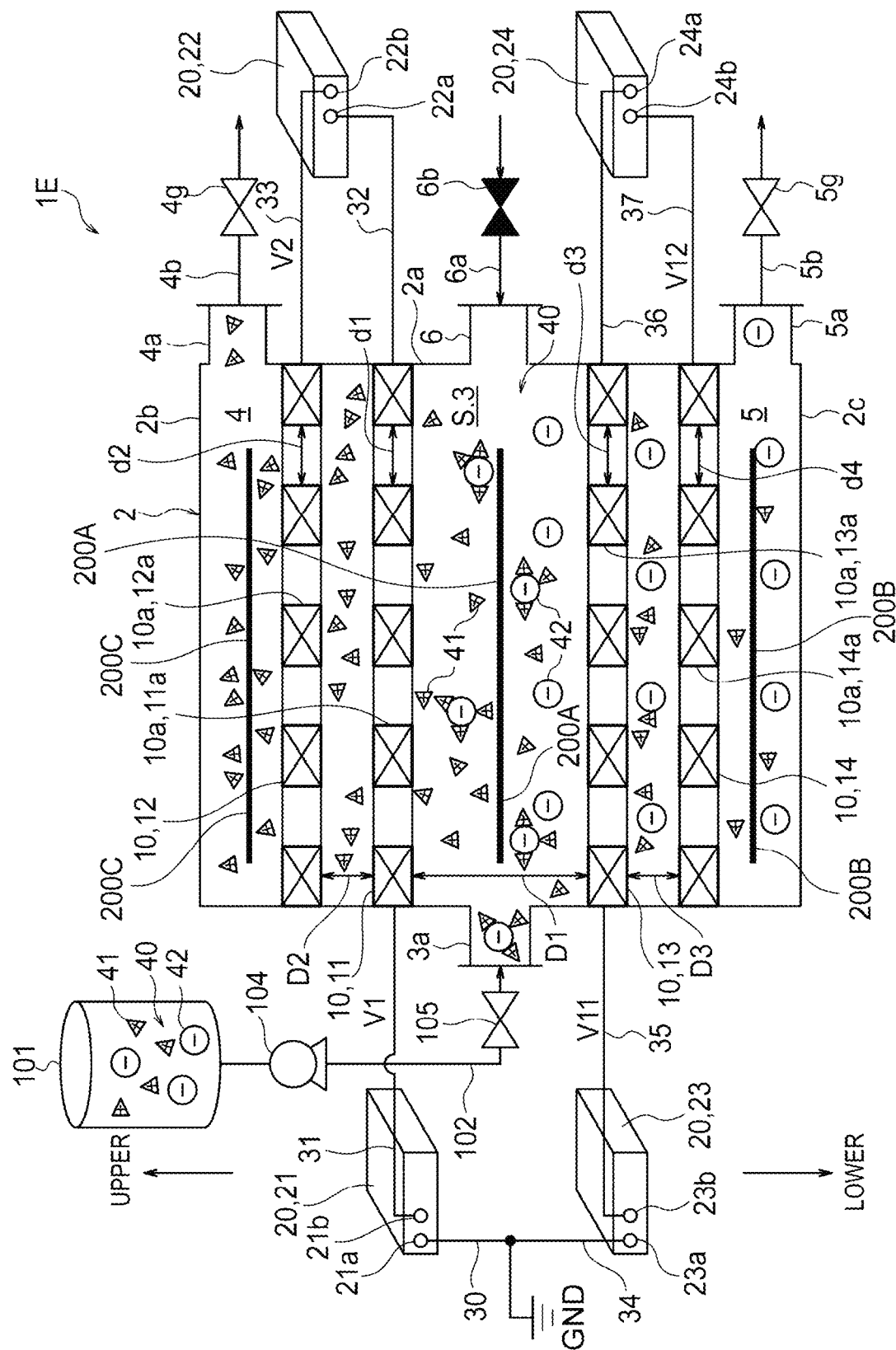
FIG. 14 is a schematic diagram schematically showing a filtration device according to Embodiment 6.
Figure 15A:
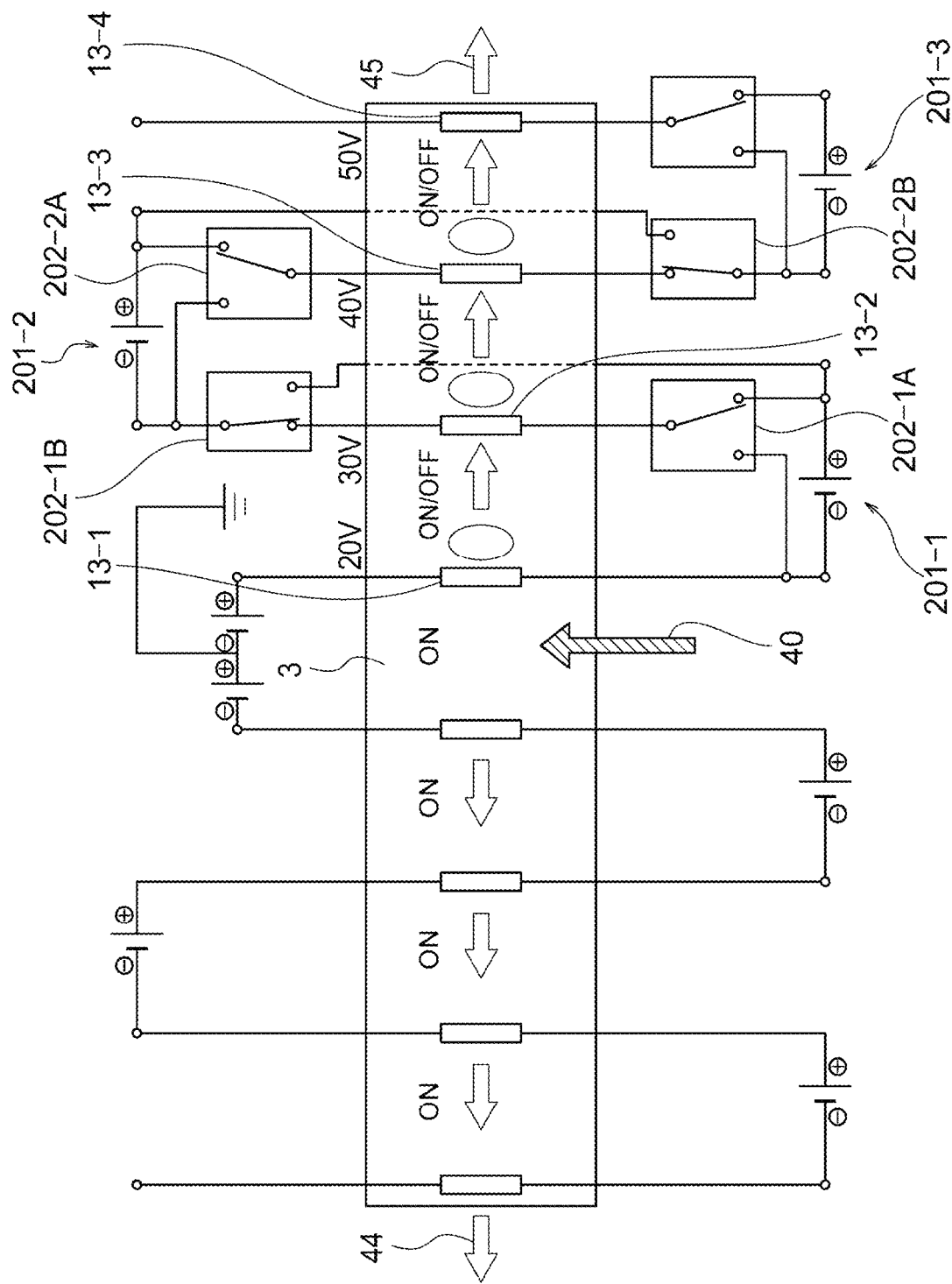
FIG. 15A is a schematic diagram in which vibration members are provided in a filter chamber and a first discharge chamber and a second discharge chamber 5 according to Embodiment 6.
Figure 15B:
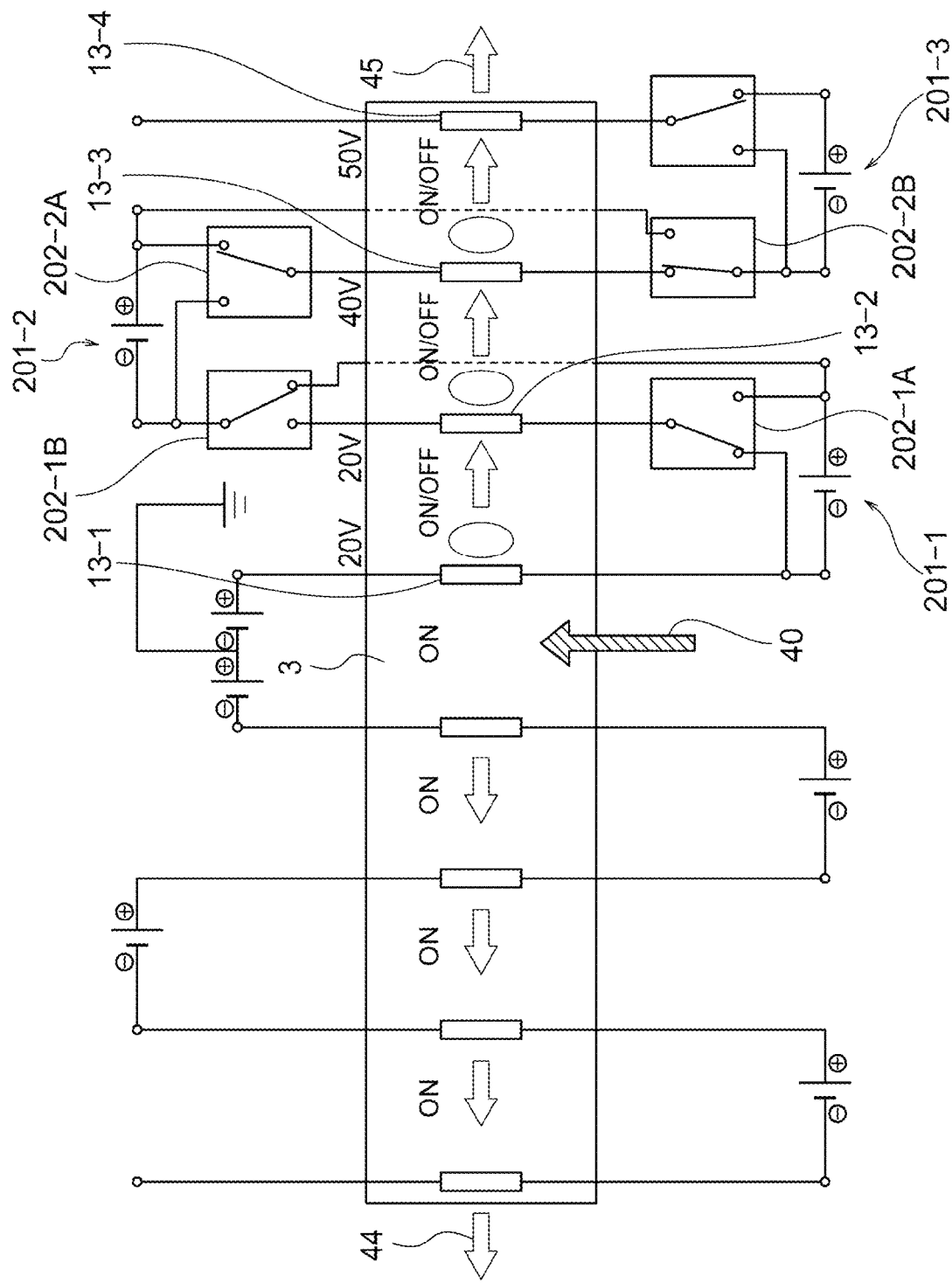
FIG. 15B is a schematic diagram in which vibration members are provided in the filter chamber and the first discharge chamber and the second discharge chamber 5 according to Embodiment 6.

FIG. 14 is a schematic diagram schematically showing a filtration device according to Embodiment 6. FIGS. 15A and 15B are schematic diagrams in which vibration members are provided in the filter chamber and the first discharge chamber and the second discharge chamber 5 according to Embodiment 6. As shown in FIG. 14, in a filtration device 1E according to Embodiment 6, vibrating members 200 (200A, 200B, and 200C) are disposed inside the filter chamber 3, the first discharge chamber 4, and the second discharge chamber 5. The vibrating member 200 may be provided at at least one location.

In the description of the present embodiment, an anode electrode has four electrode configurations.

The vibrating member 200 may be any member as long as the vibrating member vibrates the water molecule 41 that is an internal liquid and the particle 42. As the vibrating member 200, for example, a piezoelectric vibrator can be used, but the present invention is not limited thereto.

As shown in FIGS. 15A and 15B, in electric field filtration, in a case of the slurry 40 containing the particle 42 exhibiting strong cohesiveness, the particle 42 stays or adheres to an inside of the filter chamber 3 and among a first anode electrode 13-1, a second anode electrode 13-2, a third anode electrode 13-3, and a fourth anode electrode 13-4, and a collection rate of the particles 42 tends to decrease, but this tendency is eliminated by providing the vibrating member 200.

By providing the piezoelectric member 200, adhesion of the particle 42 can be prevented. Therefore, a voltage applied to the first anode electrode 13-1, the second anode electrode 13-2, the third anode electrode 13-3, and the fourth anode electrode 13-4 can be lowered as a whole.

That is, in the related art, in order to improve separation of particles, for example, 10 V is applied to the first anode electrode 13-1, 20 V is applied to the second anode electrode 13-2, 30 V is applied to the third anode electrode 13-3, and 40 V is applied to the fourth anode electrode 13-4, the applied voltage can be halved to 5 V for the first anode electrode 13-1, 10 V for the second anode electrode 13-2, 20 V for the third anode electrode 13-3, and 40 V for the fourth anode electrode 13-4, and the applied voltage can be reduced overall. As a result, it is possible to significantly reduce power consumption of the filtration device, reduce electrolysis, and reduce heat generation.

In particular, when an organism is separated as a separation object, a heat generation reduction effect is large.

Test Example

Improvement in filtration performance due to a vibration function and a switching function by the piezoelectric vibrator was confirmed.

As an evaluation sample of a vibration test, a colloidal silica particle diameter of 450 nm, which is a fine particle exhibiting a high cohesiveness in electric field filtration, was selected.

As shown in FIG. 14, the piezoelectric vibrators 200A, 200B, and 200C, which are the vibrating member 200, were disposed at three locations inside the filter chamber 3, the first discharge chamber 4, and the second discharge chamber 5.

As described below, it was confirmed that the addition of the vibration function is effective in improving adhesion in the filter chamber 3 and improving the filtration performance.

In a case of "no vibration applied" in which the piezoelectric vibrator was not disposed, after 30 minutes from a start of an operation, turbidity occurred in the filtrate 45, and a slight filtration differential pressure of 0.01 MPa occurred.

In a case of "vibration applied" in which the piezoelectric vibrators 200A, 200B, and 200C were disposed at three locations inside the filter chamber 3, the first discharge chamber 4, and the second discharge chamber 5, it was possible to operate stably for 50 minutes from a start to an end of an operation without any fluctuation in a filtrate state or a filtration pressure.

Results are shown in Table 1.

TABLE 1

| Evaluation items | No vibration applied | Vibration applied |
|---|---|---|
| Improvement in particle collection rate* | 55.7% | 92.9% |
| Particle residual reduction* | 44.3% | 7.1% |
| High separation efficiency maintenance | 97.4% | 99.9% |

Here, from beginning to end in "Table 1", a balance is for a weight of supplied solid particles as 100%, and in a case of vibration applied, clarity of the filtrate 45 could be maintained and high separation efficiency could be maintained.

Next, a case where the switching function is added in "vibration applied" will be described.

FIG. 15A is a schematic diagram in which the vibration members are provided in the filter chamber and the first discharge chamber and the second discharge chamber 5. In the present embodiment, for convenience of description, the first anode electrode 13-1, the second anode electrode 13-2, the third anode electrode 13-3, and the fourth anode electrode 13-4 are disposed from the filter chamber 3 side. A test example in which an ON/OFF switching function is sequentially added to the piezoelectric vibrator in an electric field on a concentrate 45 side will be described based on FIG. 15A.

In the present test example, a first anode power supply 201-1, a second anode power supply 201-2, and a third anode power supply 201-3 on a concentration side (+) were equipped with microcomputer-controlled relays to enable an operation in an ON/OFF switching mode sequentially. By sequentially turning off the electric field, (−) charged condensed particles stayed between (+) electrodes are released at a timing to be discharged and prevented from depositing.

The power supplies (the first anode power supply 201-1, the second anode power supply 201-2, and the third anode power supply 201-3) on the concentration side (+) were equipped with a microcomputer-controlled relay to enable an operation in an ON/OFF switching mode sequentially.

By sequentially turning off the electric field, (−) charged condensed particles stayed between (+) electrodes were released at a timing to be discharged, preventing depositing of the fine particles.

An operation and effect of sequentially repeating ON and OFF will be described.

It is assumed that the particle 42 in the present test example is negatively charged.

Even if there is a potential difference between the electrodes, in a case of a potential difference of 10 V, a small amount of particles 42 adhere to the electrodes.

The first to fourth anode electrodes 13-1 to 13-4 are connected to the first anode power supply 201-1, the second anode power supply 201-2, and the third anode power supply 201-3.

For example, a potential of the first anode electrode 13-1 is +20 V, a potential of the second electrode 13-2 is +30 V, a potential of the third electrode 13-3 is +40 V, and a potential of the fourth electrode 13-4 is +50 V.

Since +20 V is constantly applied to the first electrode 13-1 in the filter chamber 3, the particle 42 in the slurry 40 in the filter chamber 3 is attracted to a first anode electrode 13-1 side.

In such a case, at the second anode electrode 13-2 to the fourth anode electrode 13-4, ON-OFF of switching of the first anode power supply 13-1 to the third anode power supply 13-3 is sequentially repeated.

When a +30 V switch box applied to the second anode electrode 13-2 is OFF, the potential of the first anode electrode 13-2 becomes +20 V. At this time, a relay 202-1A and a relay 202-1B are switched from one to another at the same time.

Normally, when the second anode electrode 13-2 is ON and +30 V is applied to the second anode electrode 13-2, a potential difference with the third anode electrode 13-3 (+40 V) is +10 V.

At this time, when the second anode electrode 13-2 is OFF by switching, the second anode electrode 13-2 is conducted to the first anode electrode 13-1 side, and the potential of the second anode electrode 13-2 becomes +20 V. As a result, since the third anode electrode 13-3 is normally +40 V, a potential difference between the second anode electrode and the third anode electrode 13-3 when the second anode electrode is OFF is +20 V, which is twice the potential difference of +10 V at the time of constant ON.

In the present embodiment, since the particle 42 is negatively charged, an effect of attracting the particle 42 to a third electrode 13-3 side is increased.

Similarly, when a +40 V switch box applied to the third anode electrode 13-3 is OFF, the potential of the second anode electrode 13-2 becomes +30 V. At this time, a relay 202-2A and a relay 202-2B are switched from one to another at the same time. As a result, since the fourth anode electrode 13-4 is normally +50 V, a potential difference between the third anode electrode and the fourth anode electrode 13-4 when the third anode electrode is OFF is +20 V, which is twice the potential difference of +10 V at the time of constant ON.

Figure 15C:
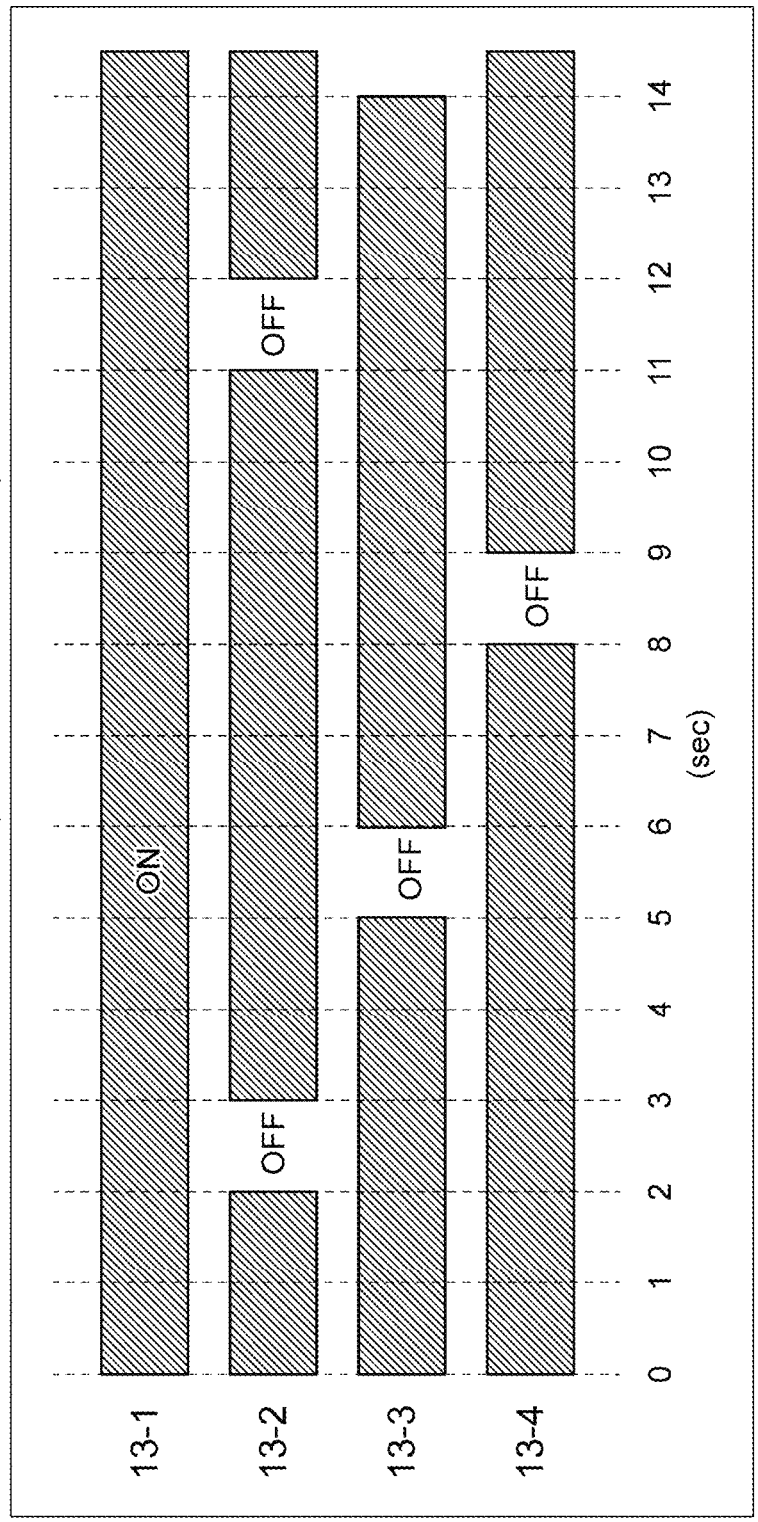
FIG. 15C is an operation time chart of a switching box of the filtration device according to Embodiment 6.

FIG. 15C is an operation time chart of a switching box of the filtration device according to Embodiment 6. As shown in FIG. 15C, a voltage is normally applied to the first anode electrode 13-1.

The second anode electrode 13-2 to the anode 4 electrode 13-4 are ON for 2 seconds and OFF for 1 second repeatedly. A switching time can be appropriately changed.

Results of the switching are shown in Table 2.

TABLE 2

| Evaluation items | No vibration applied | Only vibration applied | Vibration applied + switching |
|---|---|---|---|
| Improvement in concentration collection rate* | 55.7% | 60.0% | 62.8% |
| Particle residual reduction* | 44.3% | 7.1% | 7.6% |

As shown in "Table 2", a concentration collection rate could be improved by providing switching.

Embodiment 7

Figure 16:
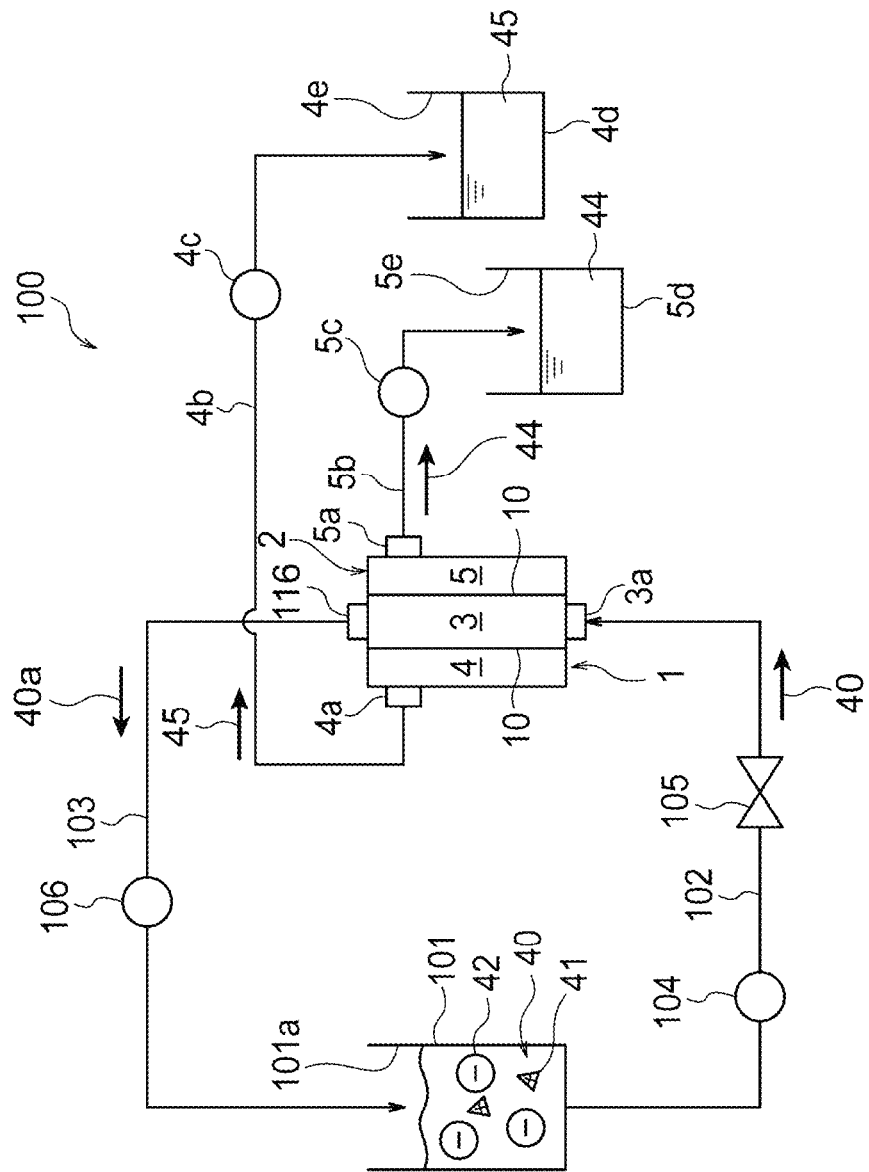
FIG. 16 is a diagram schematically showing a filtration system according to Embodiment 7.

FIG. 16 is a diagram schematically showing a filtration system according to Embodiment 7. A filtration system 100 is a system that supplies the slurry 40 to the filtration device 1 to perform solid-liquid separation and collects the concentrate 44 and the filtrate 45. The solid-liquid separation by the filtration device 1 is not batch processing but continuous processing. Therefore, in the filtration system 100, the device can continuously supply the slurry 40 and continuously collect the concentrate 44 and the filtrate 45.

The filtration system 100 according to the present embodiment can be applied to, for example, the life science field, sewage treatment, and wastewater treatment field. In the life science field, the invention can be applied to, for example, a bioindustry in which microorganisms such as cultured cells, microalgae, bacteria, and viruses are cultured, use of enzymes, proteins, polysaccharides, lipids, and the like that are produced by cultured microorganisms outside a body or inside a body, bio-drug discovery or a cosmetics industry that is an application field, or a beverage industry, which handles brewing, fermentation, juice extraction, beverages, and the like. In the sewage treatment and wastewater treatment field, the invention can be applied to separation of biomass particles with hardly filtered fine biomass aqueous slurry. Alternatively, the filtration system 100 is a colloidal particle-based slurry in which surface-charged fine particles are highly dispersed by electric repulsion, and can be applied to concentrating and collecting colloidal fine particles.

In general, many particles are negatively charged (−), but conversely, some particles are positively charged (+). Examples of the (+) charged particles include titanium oxide and colloidal alumina.

Depending on the particles, a charged state may change depending on pH.

When the particle 42 dispersed in the liquid water molecule 41 is negatively charged (−), the liquid water molecule 41 in which the particle 42 is dispersed apparently behaves in a positive (+) manner.

In contrast, when the particle dispersed in the liquid water molecule 41 is positively charged (+), the liquid water molecule 41 in which the particle 42 is dispersed apparently behaves in a negative (−) manner.

As shown in FIG. 16, the filtration system 100 includes the filtration device 1, the storage tank 101, the supply line 102, a circulation line 103, the first discharge line 4b, a first discharge tank 4d, the second discharge line 5b, and a second discharge tank 5d.

The storage tank 101 stores the slurry 40. An opening portion 101a is provided in an upper portion of the storage tank 101. Therefore, the slurry 40 is supplied from the opening portion 101a into the storage tank 101, and gas in the slurry 40 is released from the opening portion 101a into an atmosphere. The slurry 40 is, for example, a suspension, and is a mixture of a liquid and the particle 42. The particle 42 is a target that has a charged surface. A particle diameter of the particle 42 is not particularly limited. The particle 42 having a particle diameter of, for example, 1 nm or more and 5000 μm or less can also be filtered.

The supply line 102 is a pipe that connects the closed container 2 of the filtration device 1 and the storage tank 101. The supply line 102 is provided with the supply pump 104 and the valve 105. The supply pump 104 sucks the slurry 40 from the storage tank 101 and sends the slurry to the closed container 2. The supply pump 104 is a metering pump capable of keeping a flow rate (supply amount) per unit time constant. Therefore, the flow rate (supply amount) of the slurry 40 flowing through the supply line 102 per unit time is adjusted to a predetermined amount by the supply pump 104. The valve 105 is a valve that opens and closes the supply line 102.

The circulation line 103 is a pipe that connects the closed container 2 and the storage tank 101. The circulation line 103 is provided with a circulation pump 106. The circulation pump 106 sucks the slurry 40 from the closed container 2 and sends the slurry to the storage tank 101. The circulation pump 106 is a metering pump capable of keeping a flow rate (a supply amount) per unit time constant. A flow rate (a circulation amount) of the slurry 40 extracted from the closed container 2 by the circulation pump 106 per unit time is adjusted to be smaller than the flow rate (a supply amount) of the slurry 40 supplied to the closed container 2 per unit time.

The first discharge line 4b is a pipe for discharging the filtrate 45 from the closed container 2. The first discharge line 4b is provided with a metering pump 4c for adjusting a flow rate of the filtrate 45. The filtrate 45 discharged from the first discharge line 4b is stored in the first discharge tank 4d. An opening portion 4e is provided in an upper portion of the first discharge tank 4d.

The second discharge line 5b is a pipe for discharging the concentrate 44 from the closed container 2. The second discharge line 5b is provided with a metering pump 5c for adjusting a flow rate of the concentrate 44. The concentrate 44 discharged from the second discharge line 5b is stored in the second discharge tank 5d. An opening portion 5e is provided in an upper portion of the second discharge tank 5d.

Figure 17:
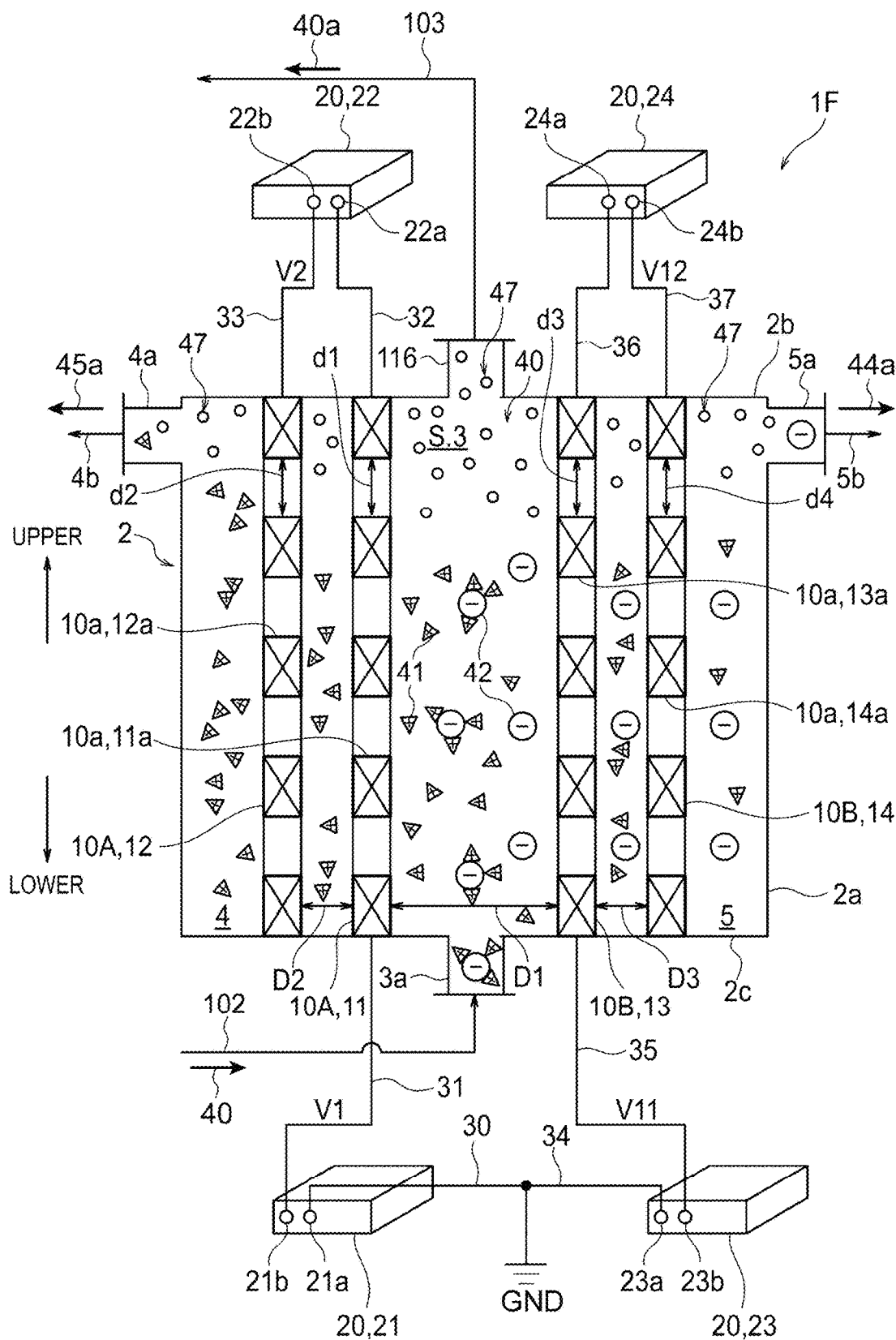
FIG. 17 is a schematic diagram schematically showing a filtration device according to Embodiment 7.

FIG. 17 is a schematic diagram schematically showing a filtration device according to Embodiment 7. As shown in FIG. 17, a filtration device 1F includes the closed container 2, a plurality of electrodes 10 disposed inside the closed container 2, and a plurality of power supplies 20 that supply a predetermined potential to the electrodes 10.

An inside of the closed container 2 is a closed space S. The closed container 2 includes the tubular side wall 2a extending in a vertical direction (an upper-lower direction), the upper wall 2b closing the upper portion of the side wall 2a, and the lower wall 2c closing the lower portion of the side wall 2a. The plurality of electrodes 10 are disposed in the closed space S. The electrode 10 extends in the vertical direction (the upper-lower direction). The plurality of electrodes 10 are parallel to each other. The electrodes 10 divide the closed space S in a direction (a horizontal direction) orthogonal to the vertical direction. Therefore, the closed space S is divided into three sections, which are the filter chamber 3 located at a central portion of the filtration device 1F, the first discharge chamber 4 located on a left side of the filter chamber 3, and the second discharge chamber 5 located on a right side of the filter chamber 3.

The closed container 2 is provided with the supply port 3a, the first discharge port 4a, the second discharge port 5a, and a take-out port 116. The supply port 3a, the first discharge port 4a, the second discharge port 5a, and the take-out port 116 allow the closed space S to communicate with an external space of the closed container 2.

The supply port 3a is provided in the filter chamber 3. The supply port 3a is provided in the lower wall 2c and is connected to the supply line 102. Accordingly, the slurry 40 is supplied from the supply line 102 to the filter chamber 3. The supply pump 104 pressurizes the slurry 40 in the supply line 102 toward the filter chamber 3. The closed space S is sealed. Therefore, a pressure applied by the supply pump 104 acts on the slurry 40 in the closed space S as a filtration pressure.

The first discharge port 4a is provided in the first discharge chamber 4. The first discharge port 4a is provided in the upper portion of the side wall 2a and is connected to the first discharge line 4b. The second discharge port 5a is provided in the second discharge chamber 5. The first discharge port 4a is provided in the upper portion of the side wall 2a and is connected to the second discharge line 5b. The take-out port 116 is provided in the filter chamber 3. The take-out port 116 is provided in the upper wall 2b and is connected to the circulation line 103.

The details of the solid-liquid separation by the filtration device 1F are as described above, and in the closed space S, the slurry 40 is separated into the filtrate 45 and the concentrate 44. The filtrate 45 flows into the first discharge chamber 4 and the concentrate 44 flows into the second discharge chamber 5. In the filtration device 1F, the electrode 10 is applied during the solid-liquid separation. Therefore, the electrode 10 generates heat, and the slurry 40 is heated. Electrolysis of water generates gas 47 around the electrode 10. The gas 47 moves to the upper portion of the closed space S by buoyancy.

Next, a method of using the filtration system 100 shown in FIG. 16 when the solid-liquid separation is performed in the filtration device 1F will be described. As shown in FIG. 16, when the solid-liquid separation is performed in the filtration device 1, the supply pump 104, the circulation pump 106, the metering pump 4c, and the metering pump 5c are driven. Accordingly, the slurry 40 is supplied from the storage tank 101 to the filter chamber 3. The slurry 40 in an upper portion (near the supply port 6) of the filter chamber 3 is discharged and flows to the storage tank 101. The filtrate 45 in an upper portion (near the first discharge port 4a) of the first discharge chamber 4 flows into the first discharge tank 4d. The concentrate 44 in an upper portion (near the second discharge port 5a) of the second discharge chamber 5 flows into the second discharge tank 5d.

The gas 47 accumulated in the upper portion of the filter chamber 3 in the closed space S is discharged from the filter chamber 3 together with the slurry 40 flowing through the circulation line 103. Therefore, slurry 40a containing the gas 47 moves to a storage tank 101 side through the circulation line 103, and the gas 47 is diffused on an upper open side of the slurry 40 stored in the storage tank 101. The gas 47 accompanying the slurry 40a containing the gas 47 passes through the opening portion 101a of the storage tank 101 and is released into the atmosphere. After the gas 47 is released, the slurry 40 gradually moves downward within the storage tank 101. The slurry 40 passes through the supply line 102 and returns to the closed container 2. A cause of gas generation is that, when electricity is passed through water, the water is electrolyzed, resulting in generation of hydrogen ($H_2$) and oxygen ($O_2$).

As described above, the slurry 40a containing the gas 47 extracted through the circulation line 103 is cooled (to room temperature) by radiating heat when passing through the circulation line 103 or stored in the storage tank 101. Therefore, a temperature of the extracted slurry 40 is prevented from increasing.

On the other hand, the slurry 40 staying in the closed space S without being extracted through the circulation line 103 is cooled by the new slurry 40 supplied from the supply line 102. Here, in the present embodiment, the slurry 40 in the closed space S is extracted through the circulation line 103. Accordingly, a supply amount of the new slurry 40 is increased as compared with a case where the slurry 40 is not extracted through the circulation line 103. Therefore, the slurry 40 staying in the closed space S is cooled by a large amount of the new slurry 40, and the temperature thereof is prevented from increasing.

The gas 47 accumulated in the upper portion of the first discharge chamber 4 is discharged from the first discharge chamber 43 together with the filtrate 45 flowing in the first discharge line 4b. The filtrate 45 containing the gas 47 moves to the first discharge tank 4d, and the gas 47 is released from the opening portion 4e of the first discharge tank 4d into the atmosphere.

Similarly, the gas accumulated in the upper portion of the second discharge chamber 5 is discharged from the second discharge chamber 5 together with the concentrate 44 flowing in the second discharge line 5b. The concentrate 44a containing the gas 47 moves to the second discharge tank 5d, and the gas 47 is released from the opening portion 5e of the second discharge tank 5d into the atmosphere.

As described above, according to the filtration system 100 in the present embodiment, the slurry 40 can be continuously supplied from the storage tank 101 to the filter chamber 3 for liquid removing processing, and a temperature increase of the slurry 40 is prevented. The gas 47 in the closed container 2 is removed.

As shown in FIG. 17, the filtration device 1F according to Embodiment 7 is obtained by vertically placing the filtration device 1 according to Embodiment 1 shown in FIG. 1 (which is a modification of FIG. 7 described above). As shown in FIG. 17, the supply port 3a of the supply line 103 of the filtration device 1F of the filtration system 100 according to Embodiment 7 is connected to a vicinity of a bottom side of the filter chamber 3 of the closed container 2, and allows supply of the slurry 40 into the closed container, and the circulation line 103 allows extracting of the slurry 40a containing the unfiltered gas 47 that passes through the filter chamber 3 from a vicinity of an upper side of the filter chamber 3 of the closed container 3.

Other configurations are the same as those of the filtration device 1 according to Embodiment 1, and description thereof is omitted.

When the filtration device is placed horizontally, the supply line may be connected to one side surface (left side surface) of the filter chamber 3 of the closed container 2 to allow supply the slurry 40 into the closed container, and the circulation line (103) may allow extracting of the slurry (40) from a side surface (right side surface) of the filter chamber 3 of the closed container (3) opposite to the one side surface.

As described above, as shown in FIGS. 16 and 17, the filtration system 100 according to Embodiment 7 includes: the storage tank 101 configured to store the slurry 40 in which the charged particle 42 and the liquid are mixed; the filtration device 1 including the closed container 2 in which the plurality of cathode electrodes 11, 12 (10) and the plurality of anode electrodes 13, 14 (10) are provided and configured to continuously perform the solid-liquid separation of the slurry 40 inside the closed container 2; the supply line 102 configured to allow continuous supply of the slurry 40 from the storage tank 101 to the inside of the closed container 2; the circulation line 103 configured to allow extracting of a part of the slurry 40 from the inside of the closed container 2 and allow continuous circulation of the slurry 40 to the storage tank 101; and the metering pump (circulation pump 106) provided in the circulation line 103 and configured to adjust a circulation amount of the slurry 40 flowing through the circulation line 103 per unit time to be smaller than a supply amount of the slurry 40 flowing through the supply line 102 per unit time.

In the filtration system 100 according to Embodiment 7, a part of the slurry 40 is extracted from the closed container 2 through the circulation line 103. The gas 47 is discharged to an outside of the closed container 2 together with the extracted slurry 40. Accordingly, the liquid removing processing can be continuously performed.

The gas 47 is removed from the inside of the closed container 2. The slurry 40 extracted through the circulation line 103 circulates to the storage tank 101 and radiates heat. On the other hand, a large amount of the slurry 40 is supplied to the slurry 40 remaining inside the closed container 2 and cooled. Therefore, the temperature increase of the slurry 40 is prevented.

As shown in FIGS. 16 and 17, the filtration device 1F according to Embodiment 7 includes: the closed container 2 having the filter chamber 3, the first discharge chamber 4, and the second discharge chamber 5; the supply port 3a configured to allow the supply line 102 to communicate with the filter chamber 3; the first discharge port 4a configured to allow discharging of the liquid from the first discharge chamber 4; the second discharge port 5a configured to allow discharging of the concentrate 44 from which the liquid is separated from the slurry 40 from the second discharge chamber 5; and the plurality of electrodes 10 provided with the plurality of holes 10a configured to allow the particle 42 and the liquid to pass therethrough.

The plurality of electrodes 10 include the plurality of cathode electrodes that separate the filter chamber 3 and the first discharge chamber 4, and the plurality of anode electrodes that separate the filter chamber 3 and the second discharge chamber 5. The plurality of cathode electrodes include the cathode first electrode 11 and the cathode second electrode 12 disposed closer to the first discharge chamber 4 than the cathode first electrode 11. The plurality of anode electrodes include the anode first electrode 13 facing the cathode first electrode 11 across the filter chamber 3, and the anode second electrode 14 disposed closer to the second discharge chamber 5 than the anode first electrode 13. The cathode first potential V1 having the same polarity as the polarity of the particle is supplied to the cathode first electrode 11. The cathode second potential V2 having the same polarity as the polarity of the particle is supplied to the cathode second electrode 12. The absolute value of the cathode second potential V2 is larger than the absolute value of the cathode first potential V1. The anode first potential V11 having the polarity different from the polarity of the particle is supplied to the anode first electrode 13. The anode second potential V12 having the polarity different from the polarity of the particles is supplied to the anode second electrode 14. The absolute value of the anode second potential V12 is larger than the absolute value of the anode first potential V11.

According to the filtration device 1F in the present embodiment, the concentrate 44 is discharged from the second discharge port 5a. Therefore, liquid removing processing of the slurry 40 can be continuously performed. The concentrate 44 does not stay in the filter chamber 3. That is, a space for making the concentrate 44 stay in the filter chamber 3 is not required. Therefore, a size of the filter chamber 3 can be reduced (a size of the closed container 2 can be reduced).

The circulation line 103 according to Embodiment 7 allows extracting of the slurry 40 from the upper portion of the closed container 2. More specifically, the filter chamber 3, the first discharge chamber 4, and the second discharge chamber 5 are disposed in the horizontal direction. The closed container 2 has the take-out port 116 through which the upper portion of the filter chamber 3 communicates with the circulation line 103. The first discharge port 4a discharges the liquid (the filtrate 45) from the upper portion of the first discharge chamber 4. Similarly, the second discharge port 5a discharges the liquid from the upper portion of the second discharge chamber 5.

The gas 47 accumulates on an upper side inside the closed container 2 (the filter chamber 3, the first discharge chamber 4, and the second discharge chamber 5). Therefore, according to the configuration, the gas 47 can be extracted from the filtration device 1 by allowing a large amount of the gas 47 to be accompanied by the slurry 40, the concentrate 44, and the filtrate 45 from the take-out port 116, the first discharge port 4a, and the second discharge port 5a.

As shown in FIG. 17, the filtration device includes: the filter chamber 3 to which the slurry 40 containing the particle (+) 42 and a liquid (the water molecule (−) 41) having different electric charges is supplied through the supply line 102; a first electrode group 10A including the cathode electrodes 11 and 12 or a second electrode group 10B including the anode electrodes 13 and 14 provided on both side surfaces of the filter chamber 3 to face each other and configured to separate the particle 42 and the liquid (the water molecule 41) in the slurry 40 into separated substances by an electric field action; and the first discharge chamber 4 and the second discharge chamber 5 provided for the first electrode group 10A and the second electrode group 10B to face the filter chamber 3 and configured to allow discharging of the separated substances.

In the present embodiment, the separated substance is the filtrate 45 separated from the slurry 40 in the filter chamber 3 into the first discharge chamber 4 and the concentrate 44 separated from the slurry 40 in the filter chamber 3 into the second discharge chamber 5.

As described above, according to the filtration system 100 in Embodiment 7, the slurry 40 can be continuously subjected to the liquid removing processing, and the gas 47 generated in the filter chamber 3 by electrolysis is removed, thereby preventing the gas generated in the closed container S from staying.

(Embodiment 8)<Embodiment of Washing>

Figure 18:
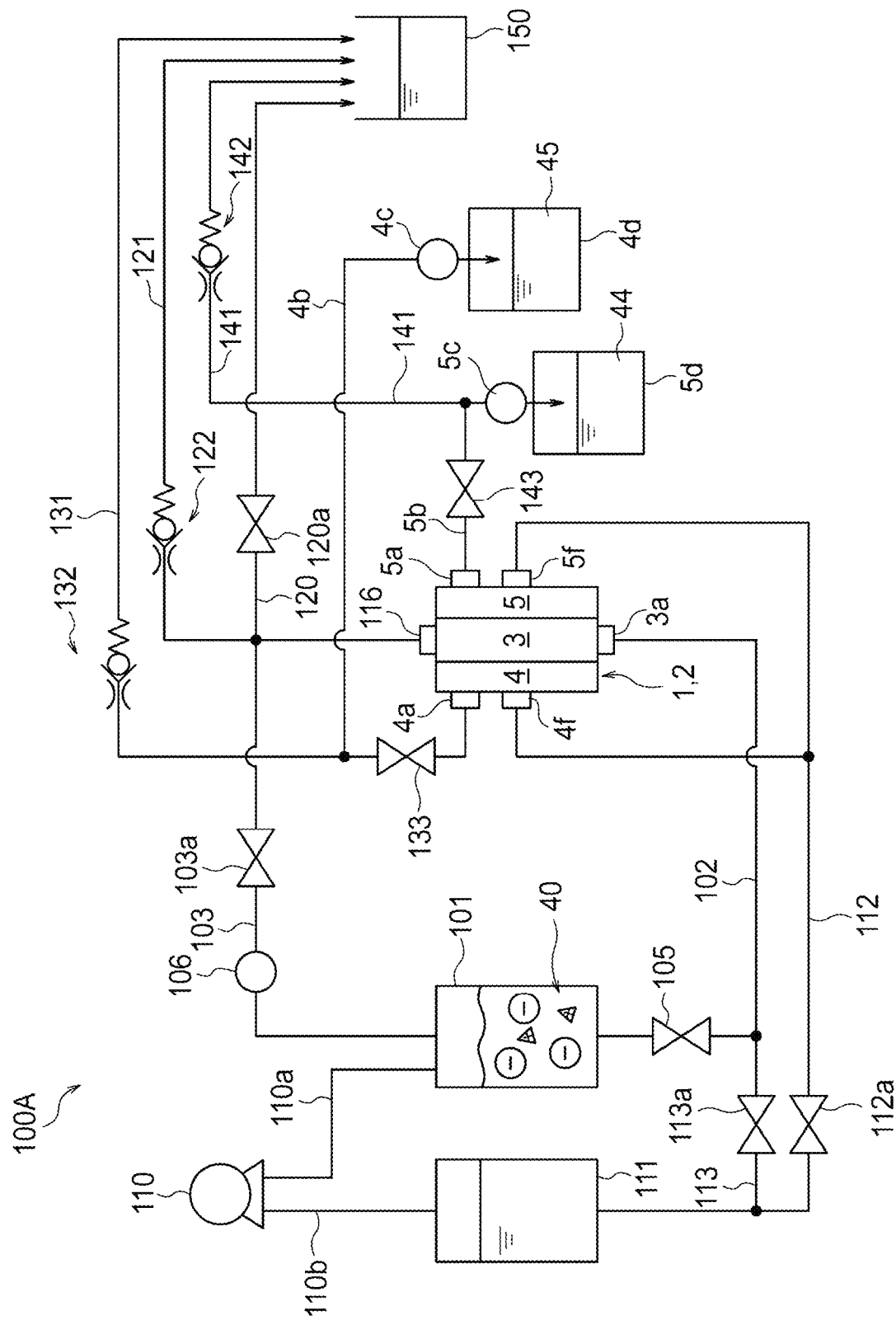
FIG. 18 is a diagram schematically showing a filtration system according to Embodiment 8.

FIG. 18 is a diagram schematically showing a filtration system according to Embodiment 8. As shown in FIG. 18, Embodiment 8 is different from Embodiment 7 in that a filtration system 100A is provided instead of the filtration system 100. The filtration system 100A according to Embodiment 8 is different from that of Embodiment 7 in that a compressor 110, a washing tank 111, a washing drainage line 120, and gas vent valves (122, 132, 142) are provided. The filtration system 100A according to Embodiment 8 is different from the filtration system 100 according to Embodiment 7 in that the supply pump 104 is not provided. Hereinafter, the difference will be mainly described.

The closed container 2 of the filtration system 100A is provided with a first backwashing port 4f and a second backwashing port 5f. The first backwashing port 4f allows an external space of the closed container 2 to communicate with the first discharge chamber 4. The second backwashing port 5f allows an external space of the closed container 2 to communicate with the second discharge chamber 5. The first backwashing port 4f and the second backwashing port 5f are located at a central portion of the closed container 2 in an upper-lower direction.

The compressor 110 is a device that discharges compressed air. The compressed air discharged from the compressor 110 is sent to the storage tank 101 through a first line 110a or sent to the washing tank 111 through a second line 110b. In Embodiment 8, the storage tank 101 is a closed container having a closed upper portion. The first discharge tank 4d and the second discharge tank 5d are closed containers. When the compressed air is supplied from the compressor 110 to the storage tank 101, the slurry 40 in the storage tank 101 is pressurized and flows into the supply line 102. As a result, the slurry 40 moves to the closed container 2 (the filter chamber 3).

Instead of the compressor 110, a pressurizing unit such as a gas cylinder may be used.

The washing tank 111 stores washing water for washing the filtration device 1. Examples of the washing water include ion exchange water, distilled water, pure water, clear filtrate (a co-liquid), but are not particularly limited in the present disclosure. An outlet of the washing tank 111 is connected to a backwashing line 112 and a washing line 113. The backwashing line 112 is branched in a middle, one branched end is connected to the first backwashing port 4f, and the other branched end is connected to the second backwashing port 5f. The washing line 113 is connected to the supply line 102.

The washing tank 111 is a closed container with a closed upper portion. When the compressed air is supplied from the compressor 110 to the washing tank 111, washing water is pressurized and flows to the backwashing line 112 or the washing line 113. The backwashing line 112 is provided with a valve 112a for opening and closing a flow path formed by the backwashing line 112. The washing line 113 is provided with a valve 113a for opening and closing a flow path formed by the washing line 113.

One end of the washing drainage line 120 is connected to the circulation line 103 (specifically, between the take-out port 116 and a valve 103a), and the other end is connected to a filtrate tank 150. The washing drainage line 120 is provided with a valve 120a for opening and closing the washing drainage line 120.

A first gas vent valve 122 is a valve that extracts the gas 47 flowing through the circulation line 103 and releases the gas 47 to an atmosphere. A pipe 121 for the first gas vent valve 122 according to the present embodiment is connected to a confluence of the circulation line 103 and the washing drainage line 120. The slurry 40 flowing toward the first gas vent valve 122 together with the gas 47 is discharged to the filtrate tank 150.

A second gas vent valve 132 is a valve that extracts the gas 47 flowing through the first discharge line 4b and releases the gas 47 into the atmosphere. The filtrate 45 flowing through a pipe 131 for the second gas vent valve 132 together with the gas 47 is discharged to the filtrate tank 150.

A third gas vent valve 142 is a valve that extracts the gas 47 flowing through the second discharge line 5b and releases the gas 47 during durability. The concentrate 44 flowing through a pipe 141 for the third gas vent valve 142 together with the gas 47 is discharged to the filtrate tank 150.

The filtrate tank 150 is a tank for collecting a fluid flowing through the washing drainage line 120 and the pipes 121, 131, and 141.

Next, a method of using the filtration system 100A according to Embodiment 8 will be described.

Figure 19:
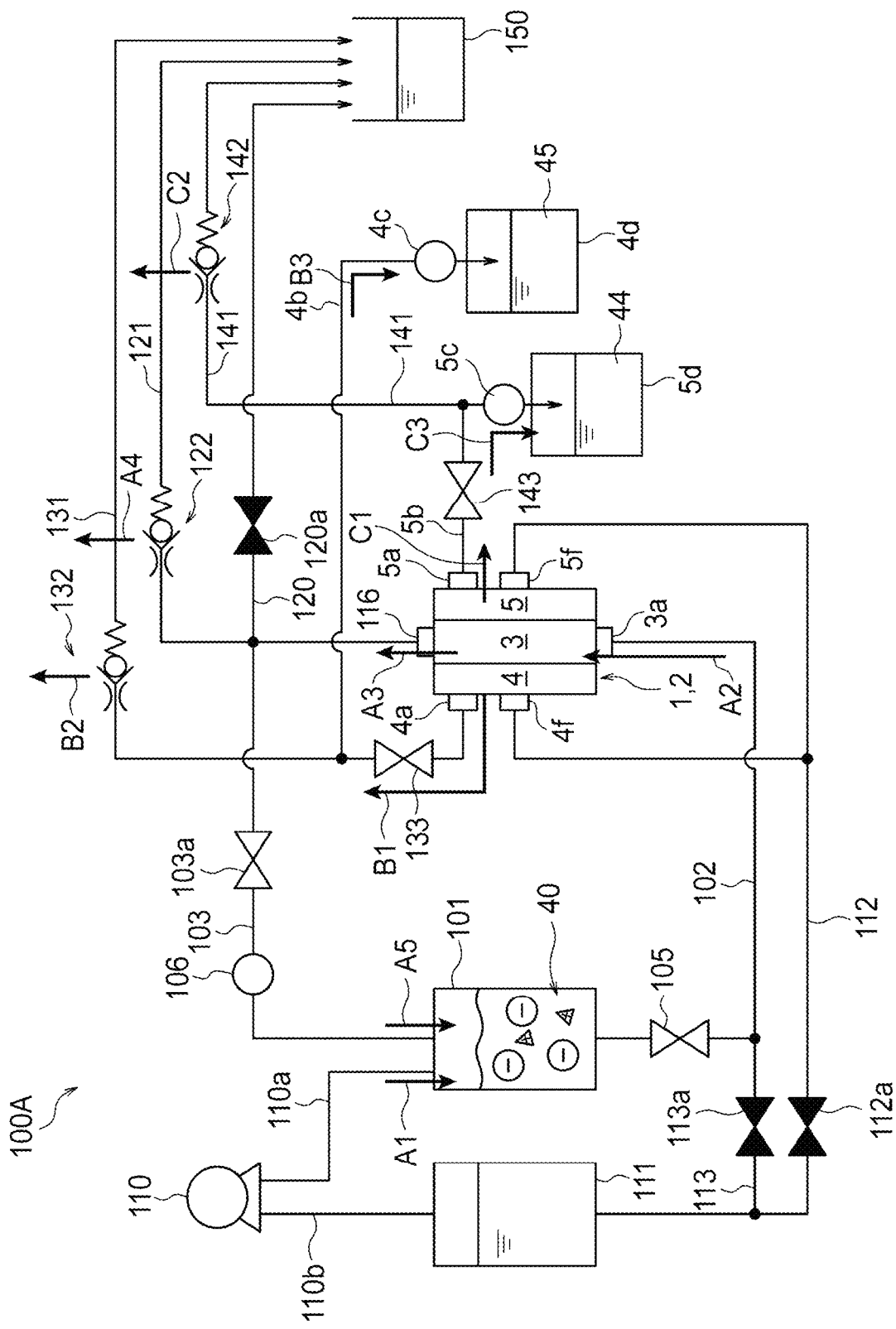
FIG. 19 is a schematic diagram showing a method of using solid-liquid separation in the filtration system according to Embodiment 8.

As shown in FIG. 19, FIG. 19 is a schematic diagram showing a method of using the solid-liquid separation in the filtration system according to Embodiment 8. As shown in FIG. 19, when the solid-liquid separation for the slurry 40 is performed in the filtration device 1, valves 105, 103a, 133, and 143 are opened. On the other hand, the valves 112a, 113a, and 120a are closed. The compressor 110 is driven to supply compressed air to the storage tank 101 (see an arrow A1). Accordingly, the slurry 40 in the storage tank 101 passes through the supply line 102 and moves to the filter chamber 3 of the closed container 2 (see an arrow A2).

The solid-liquid separation by the filtration device 1 causes the filtrate 45 to move to the first discharge chamber 4. The concentrate 44 moves to the second discharge chamber 5. The slurry 40 located in an upper portion of the filter chamber 3 moves from the take-out port 116 to the circulation line 103 (see an arrow A3). The gas 47 staying in the upper portion of the filter chamber 3 flows into the circulation line 103 together with the slurry 40.

The gas 47 moving in the circulation line 103 is discharged into the atmosphere from the first gas vent valve 122 (see an arrow A4). The slurry 40 flowing toward the first gas vent valve 122 is collected in the filtrate tank 150. The slurry 40 moving in the circulation line 103 is circulated to the storage tank 101 (see an arrow A5). The slurry 40 is deposited on the slurry 40 stored in the storage tank 101. The slurry 40 radiates heat absorbed in the closed container 2 and is cooled. After cooling, the slurry 40 moves through the supply line 102 again and is supplied to the filter chamber 3. The slurry 40 in the filter chamber 3 is cooled by the supplied new slurry 40.

The filtrate 45 moving to the first discharge chamber 4 is discharged from the first discharge port 4a and flows through the first discharge line 4b (see an arrow B1). The gas 47 in an upper portion of the first discharge chamber 4 flows to the first discharge line 4b together with the filtrate 45. The gas 47 is released from the second gas vent valve 132 into the atmosphere (see an arrow B2). The filtrate 45 flowing toward the second gas vent valve 132 is collected in the filtrate tank 150. The filtrate 45 flowing through the first discharge line 4b is collected in the first discharge tank 4d (see an arrow B3).

The concentrate 44 moving to the second discharge chamber 5 is discharged from the second discharge port 5a and flows through the second discharge line 5b (see an arrow C1). The gas 47 in an upper portion of the second discharge chamber 5 flows to the second discharge line 5b together with the concentrate 44. The gas 47 is released from the third gas vent valve 142 into the atmosphere (see an arrow C2). The concentrate 44 flowing toward the third gas vent valve 142 is collected in the filtrate tank 150. The concentrate 44 flowing through the second discharge line 5b is collected in the second discharge tank 5d (see an arrow C3).

As described above, according to the filtration system 100A in Embodiment 8, the gas 47 is released from the gas vent valve (122, 132, 142). A temperature increase of the slurry 40 is avoided.

Figure 20:
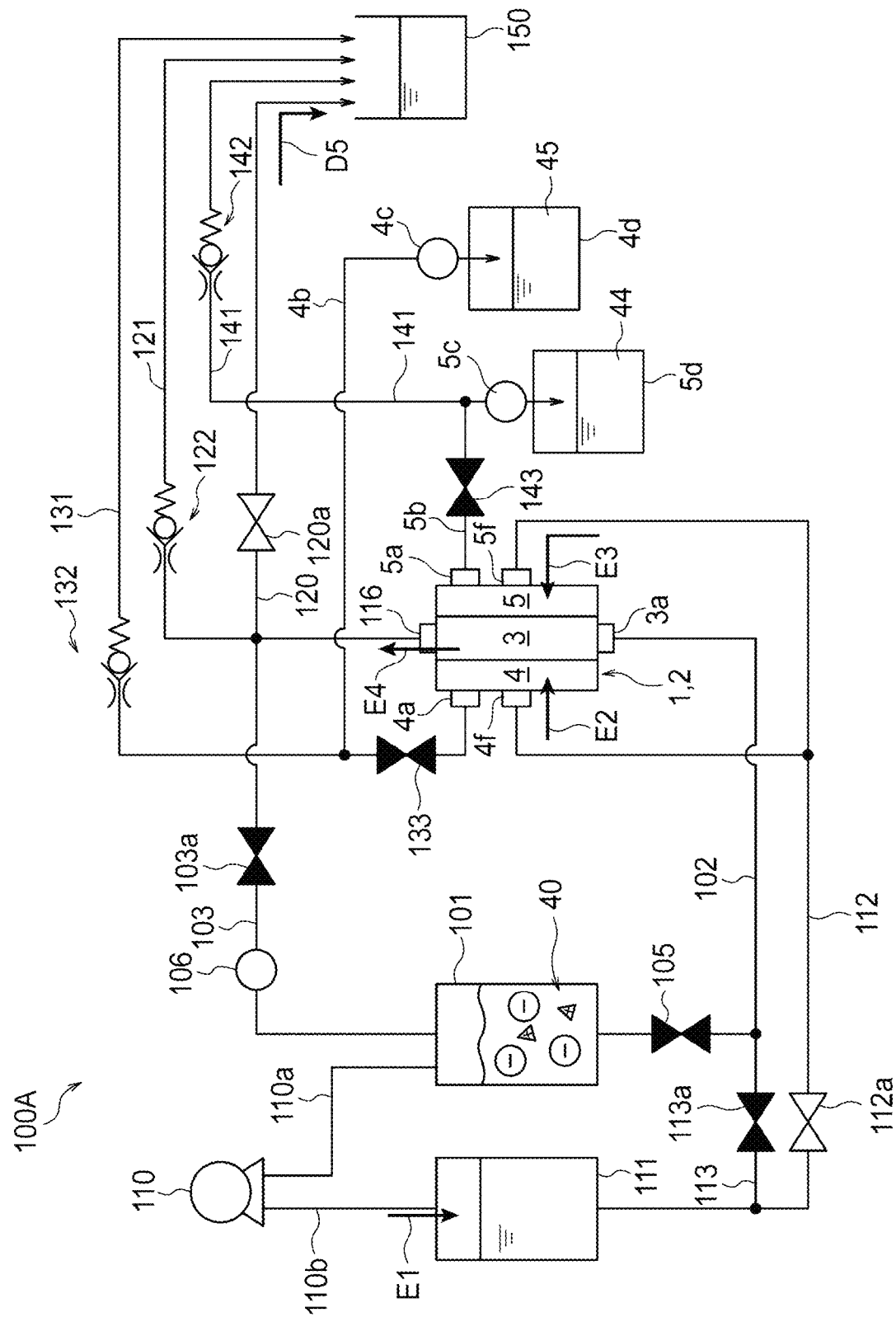
FIG. 20 is a schematic diagram showing a method of using backwashing in the filtration system according to Embodiment 8.

FIG. 20 is a schematic diagram showing a method of using backwashing in the filtration system according to Embodiment 8. As shown in FIG. 20, when the filtration device 1A is backwashed, the valves 113a, 105, 133, 143, and 103a are closed. The valves 112a and 120a are opened. The compressor 110 is driven to supply compressed air to the washing tank 111 (see an arrow E1). The washing water in the washing tank 111 flows through the backwashing line 112, passes through the first backwashing port 4f, and flows into the first discharge chamber 4 (see an arrow E2). The washing water passes through the second backwashing port 5f and flows into the second discharge chamber 5 (see an arrow E3). The washing water in the first discharge chamber 4 and the second discharge chamber 5 passes through an opening of the electrode 10 and flows into the filter chamber 3. Accordingly, the slurry 40 adhered to the electrode 10 is washed away. The washing water flowing into the filter chamber 3 passes through the take-out port 116 and flows into the circulation line 103 (see an arrow E4). The washing water passes through the washing drainage line 120 and is collected in the filtrate tank 150 (see an arrow E5).

Figure 21:
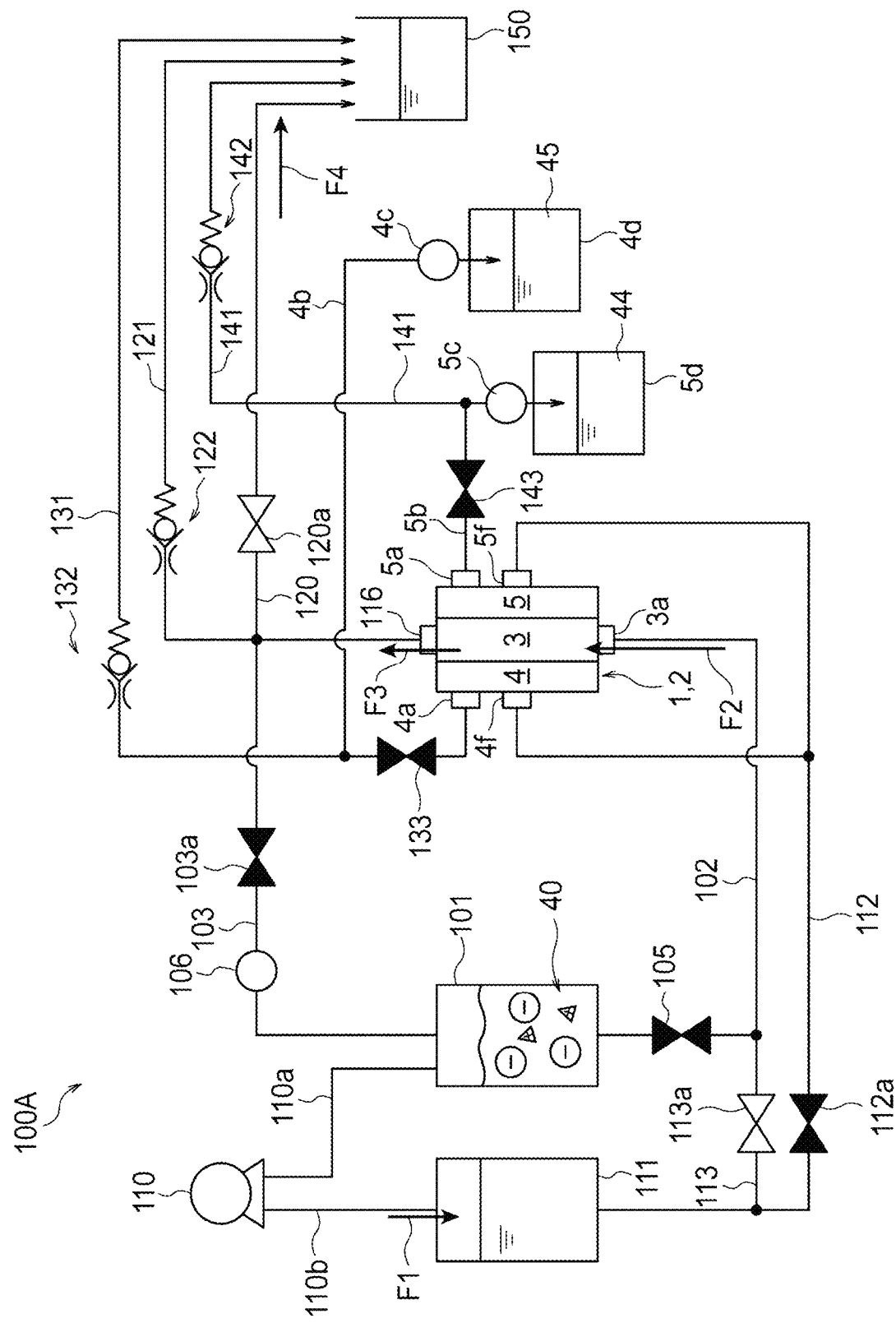
FIG. 21 is a schematic diagram showing a method of using washing in the filtration system according to Embodiment 8.

FIG. 21 is a schematic diagram showing a method of using washing in the filtration system according to Embodiment 8. Next, a method of using washing by the filtration system 100A will be described. When the filtration device 1 is washed, the valves 112a, 105, 133, 143, and 103a are closed. The valves 113a and 120a are opened. The compressor 110 is driven to supply compressed air to the washing tank 111 (see an arrow F1). The washing water in the washing tank 111 flows through the washing line 113, passes through the supply port 3a, and flows into the filter chamber 3 (see an arrow F2). The washing water flows from the filter chamber 3 to the first discharge chamber 4 and the second discharge chamber 5, and is discharged from the take-out port 116 (see an arrow F3). The washing water passes through the washing drainage line 120 and is collected in the filtrate tank 150 (see an arrow F4). In the backwashing, the valve 113a may be opened to supply the washing water from the supply port 3a.

Embodiment 9

Figure 22:
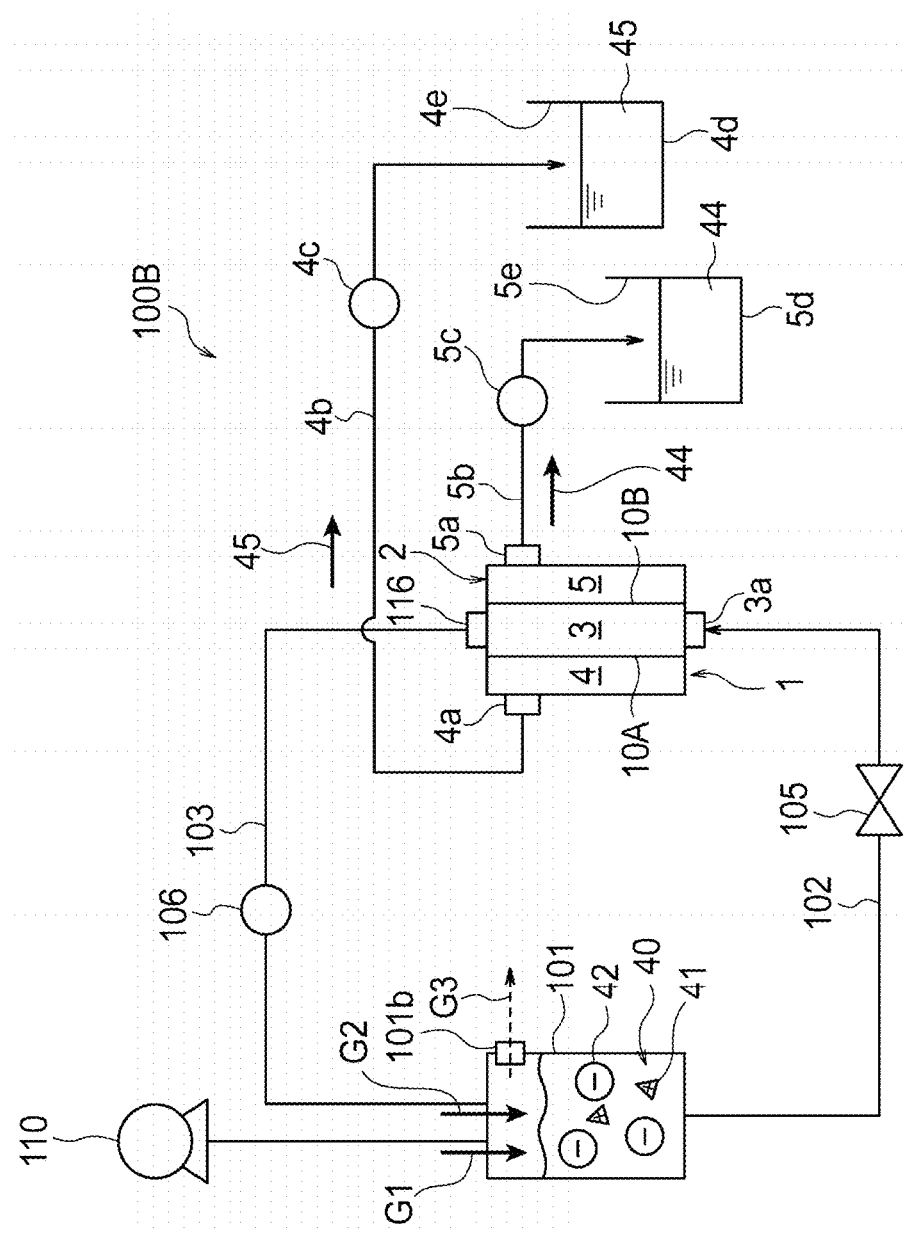
FIG. 22 is a diagram schematically showing a filtration system according to Embodiment 9.

FIG. 22 is a diagram schematically showing a filtration system according to Embodiment 9. A filtration system 100B according to Embodiment 9 is different from Embodiment 7 in that the supply pump 104 is not provided. The filtration system 100B according to Embodiment 9 is different from Embodiment 7 in that the storage tank 101 is closed. The filtration system 100B according to Embodiment 9 is different from Embodiment 7 in that a pressure adjustment valve 101b is provided in the storage tank 101. The filtration system 100B according to Embodiment 9 is different from Embodiment 7 in that the air compressor 110 is provided.

A method of using the filtration system 100B according to Embodiment 9 will be described. When the compressor 110 is driven, compressed air is supplied to the storage tank 101 (see an arrow G1). The gas 47 accumulated in an upper portion of the filter chamber 3 of the closed space S is accompanied by the slurry 40, passes through the circulation line 103, and is diffused in the storage tank 101 (see an arrow G2). Therefore, a pressure in the storage tank 101 rises above an atmospheric pressure. Therefore, a supply amount of the compressed air from the compressor 110 can be set smaller than that in Embodiment 8. Specifically, a pressure supplied by the compressor 110 is such that an internal pressure in the storage tank 101 is 0.02 MPa to 0.2 MPa, which is slight pressurization.

The gas 47 accumulated in the upper portion of the filter chamber 3 is continuously supplied into the storage tank 101. Therefore, the internal pressure in the storage tank 101 gradually increases. When the internal pressure in the storage tank 101 becomes a predetermined value or more, the pressure adjustment valve 101b is operated. Therefore, the gas 47 in the storage tank 101 is discharged to an outside of the storage tank 101 (see an arrow G3). Accordingly, damage to the storage tank 101 can be avoided. Control for adjusting a supply amount of the compressed air by the compressor 110 can be eliminated.

In the filtration system 100B according to Embodiment 9 as well, gas accumulated in an upper portion of the first discharge chamber 4 is accompanied by the filtrate 45 flowing in the first discharge line 4b, moves to the first discharge tank 4d, and is released into an atmosphere from the opening portion 4e of the first discharge tank 4d. Gas accumulated in an upper portion of the second discharge chamber 5 is accompanied by the concentrate 44 flowing in the second discharge line 5b, moves to the second discharge tank 5d, and is released into the atmosphere from the opening portion 5e of the second discharge tank 5d.

In the filtration system 100B according to Embodiment 9, an example is given in which the compressor 110 is used to supply slight pressurization of the storage tank 101, but the present disclosure is not limited thereto. For example, the storage tank 101 may be disposed above the filtration device 1, and the slurry 40 in the storage tank 101 may be supplied to the filtration device 1 by a water head pressure.

Although the embodiments are described above, the present disclosure is not limited to the above-described examples. For example, the present disclosure may be a filtration device using an electrode, and may be a filtration device other than the filtration device described in the embodiments. Although the electrode 10 in the embodiment extends in the upper-lower direction, the electrode 10 may be inclined in the upper-lower direction. The take-out port 116 is provided in the upper wall 2b, but may be provided in an upper portion of the side wall 2a. On the other hand, the first discharge port 4a and the second discharge port 5a may be provided on the upper wall 2b instead of the upper portion of the side wall 2a. Even in such a modification, the gas 47 in the closed container 2 can be discharged from the take-out port 116, the first discharge port 4a, and the second discharge port 5a.

Embodiment 10

Figure 23:
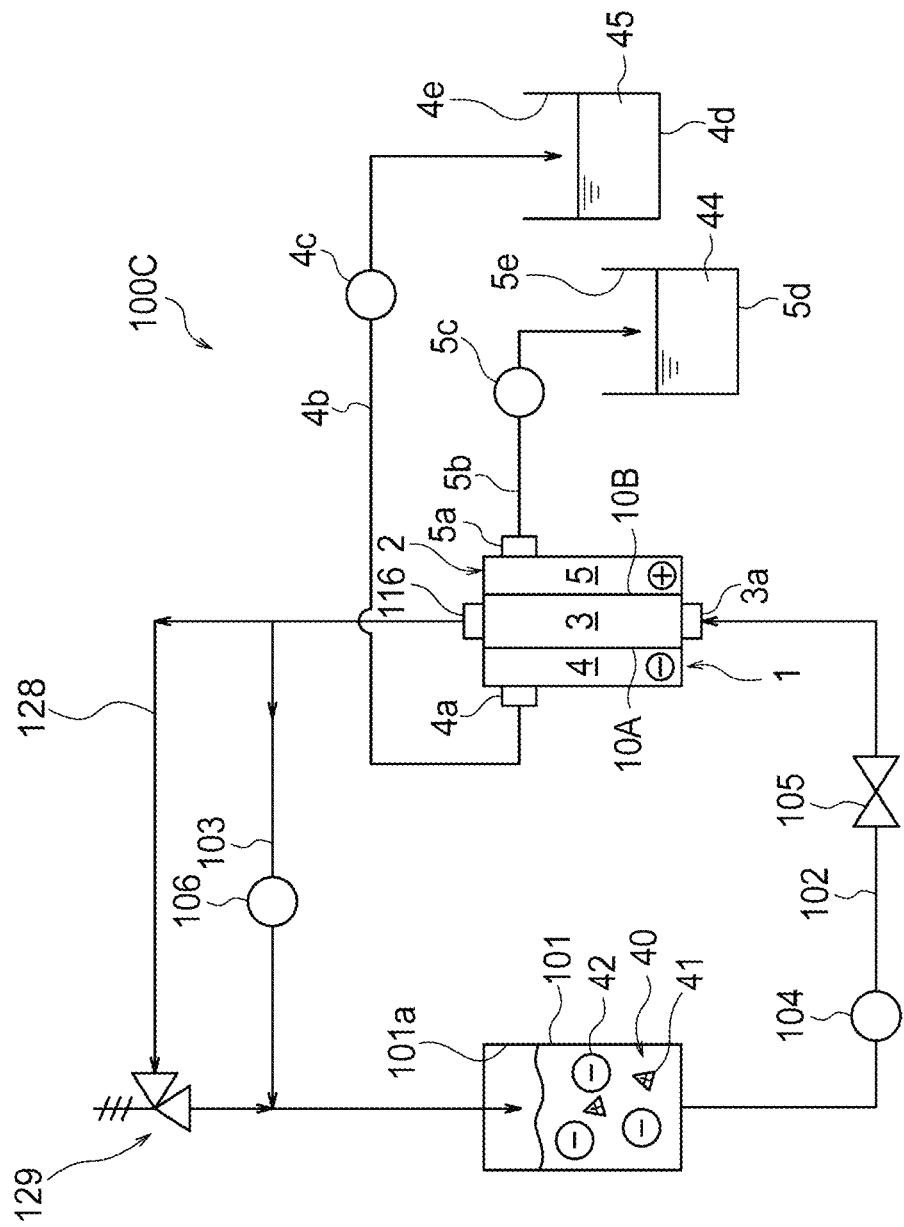
FIG. 23 is a diagram schematically showing a filtration system according to Embodiment 10.

FIG. 23 is a diagram schematically showing a filtration system according to Embodiment 10. As shown in FIG. 23, in a filtration system 100C according to Embodiment 10, a pressure adjustment line 128 is disposed and a back pressure valve (pressure adjustment valve) 129 is disposed in the pressure adjustment line 128 in order to keep a pressurized state of the filter chamber 3 constant. The back pressure valve 129 is set to, for example, 0.05 MPa, and has a function of releasing a pressure when the pressure becomes this value or more. Accordingly, constant pressure filtration is maintained.

Here, assuming an ideal flow rate of the filtration system, it is assumed that the slurry 40 supplied through the line 102 is supplied at a flow rate of, for example, "3" by the metering pump 104. At this time, for example, it is ideal to achieve balance by setting a discharge amount of the filtrate 45 to "1", a discharge amount of the concentrate 44 to "1", and a flow rate of the circulation to "1". However, actual operating conditions cannot be maintained in this ideal balance due to various factors.

Therefore, in order to keep the pressurized state constant, the operation is performed under a condition of plus a (for example, flow rates "0.3" to "0.5"). For example, when the slurry 40 is supplied by the metering pump 104 at a flow rate of "3.5", the slurry 40 is returned to the storage tank 101 when the pressure becomes 0.05 MPa or more in the pressure adjustment line 128 provided with the back pressure valve 129.

Thus, in the present embodiment, in order to keep the pressurized state constant so that the flow rate of the slurry 40 from the circulation line 103 becomes "1", the back pressure valve 129 is disposed in the pressure adjustment line 128, and by an operation of the back pressure valve 129, the constant pressure filtration can be maintained. As a result, it is possible to stably separate separated substances (the filtrate 45 and the concentrate 44) from the slurry 40 continuously. The disposition of the pressure adjustment line 128 and the back pressure valve 129 is preferable because the constant pressure filtration can be reliably maintained by applying the pressure adjustment line 128 and the back pressure valve 129 to another embodiment of the present invention.

Embodiment 11

Figure 24:
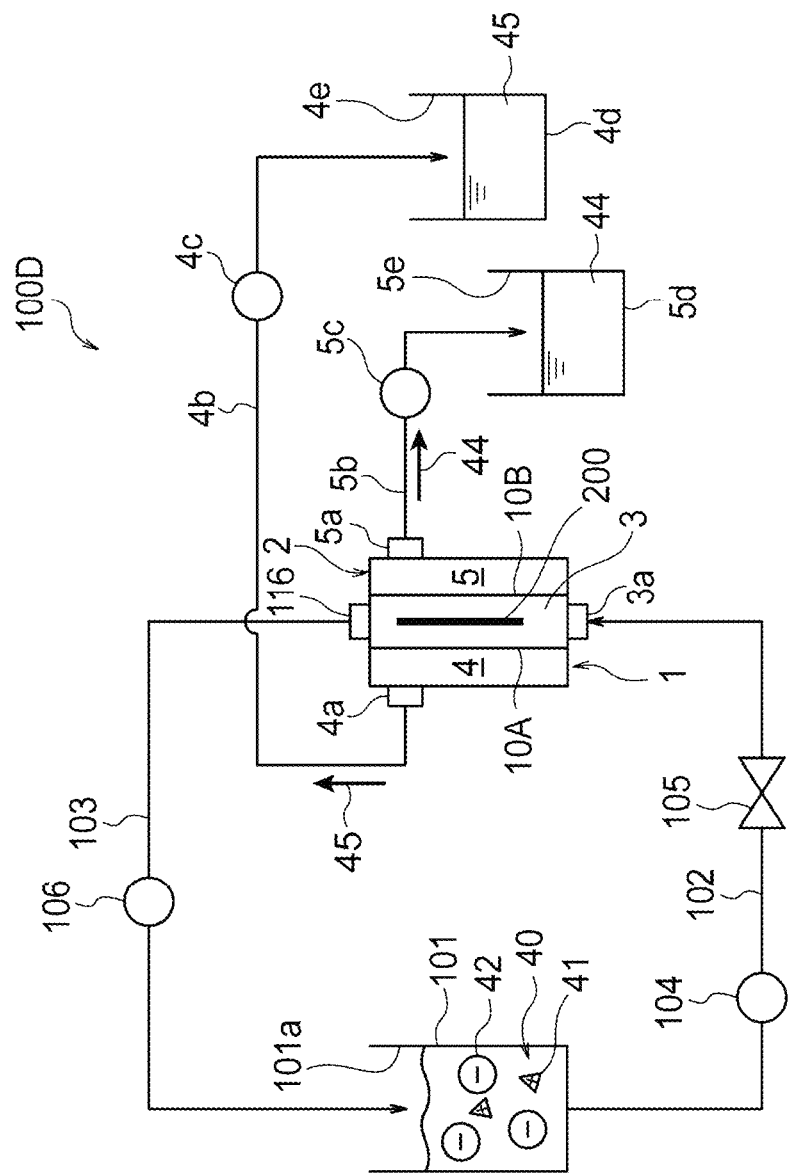
FIG. 24 is a diagram schematically showing a filtration system according to Embodiment 11.

FIG. 24 is a diagram schematically showing a filtration system according to Embodiment 11. As shown in FIG. 24, a filtration system 100D according to Embodiment 11 includes the vibrating member 200 at at least one location inside the filter chamber 3, the first discharge chamber 4, or the second discharge chamber 5.

In the filtration system 100D according to Embodiment 11, in electric field filtration, in a case of separating the slurry 40 containing the particle 42 exhibiting strong cohesiveness, the particle 42 stays or adheres to an inside of the filter chamber 3 and among the first anode electrode 13-1, the second anode electrode 13-2, the third anode electrode 13-3, and the fourth anode electrode 13-4, and a collection rate of the particles 42 tends to decrease, but this tendency is eliminated by providing the vibrating member 200. Details are described in Embodiment 6, so that the description thereof is omitted.

Embodiment 12

Figure 25A:
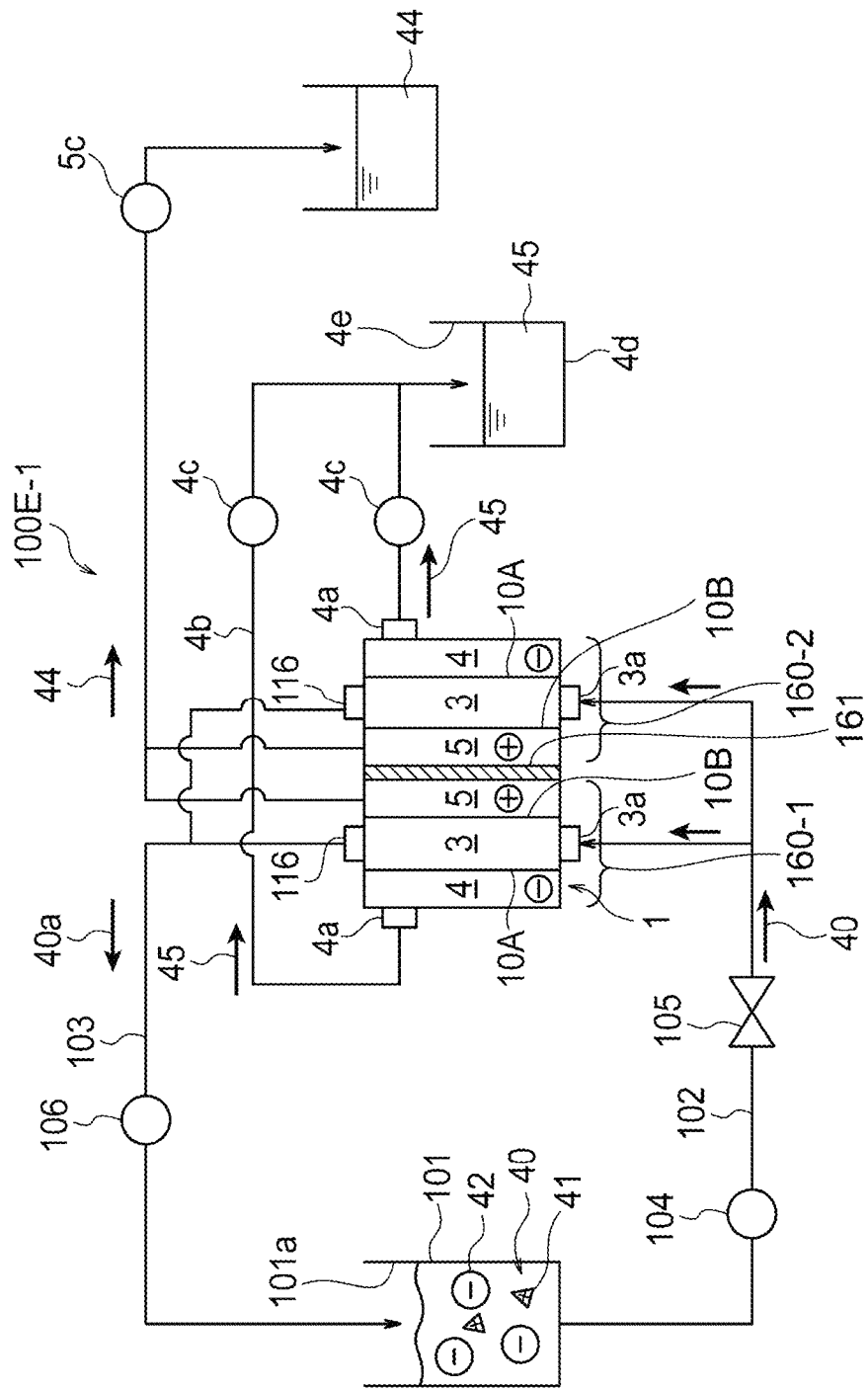
FIG. 25A is a diagram schematically showing a filtration system according to Embodiment 12.

FIG. 25A is a diagram schematically showing a filtration system according to Embodiment 12. As shown in FIG. 25A, a filtration system 100E-1 according to Embodiment 12 has a filtration device unit as one unit module, which includes: the filter chamber 3 to which slurry 40 containing the particle 42 and a medium (the water molecule 41) having an electric charge (−) different from an electric charge (+) of the particle 42 is supplied; a first separation electrode group 10A and a second separation electrode group 10B facing both side surfaces of the filter chamber 3 and configured to electrically separate the particle 42 and the medium (the water molecule 41) in the slurry 40; and the cathode-side first discharge chamber 4 and the anode-side second discharge chamber 5 provided on sides of the first separation electrode group 10A and the second separation electrode group 10B opposite to the filter chambers and configured to allow discharging of the separated substances (the medium (the water molecule 41) and the particle 42). When modules including filtration device units 160 (160-1, 160-2, and so on) are coupled, a plurality of modules are coupled using a coupling chamber 161.

According to the present embodiment, by constructing a filtration device group by sequentially folding back the coupling of the filtration device units 160 (160-1, 160-2, and so on) of the module based on the coupling chamber 161, it is possible to improve a processing capacity (increase a filtration area) and increase a discharge amount of the separated substance (the filtrate 45, the concentrate 44).

Figure 25B:
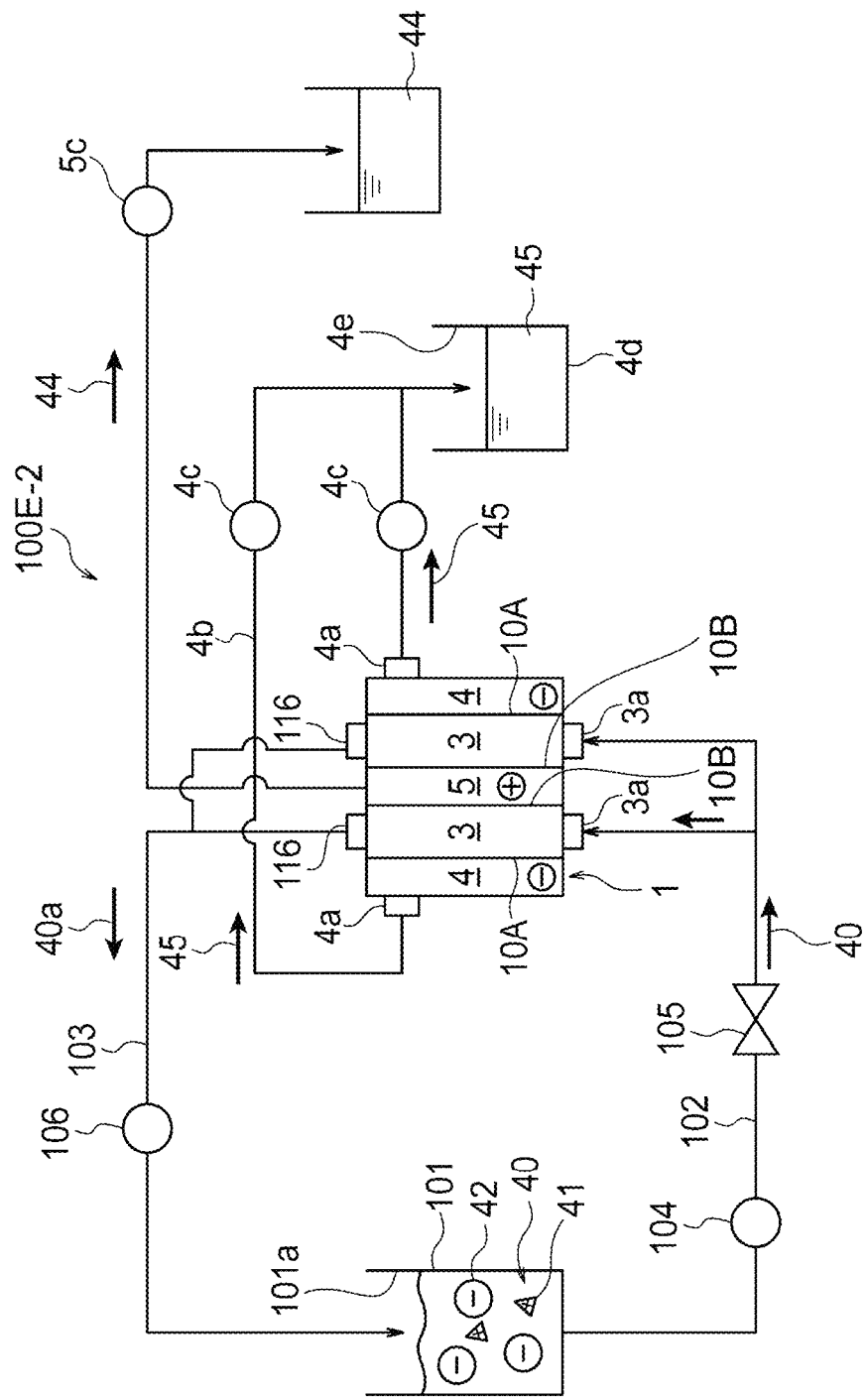
FIG. 25B is a diagram schematically showing a filtration system according to a modification of Embodiment 12.

FIG. 25B is a diagram schematically showing a filtration system according to a modification of Embodiment 12. A filtration system 100E-2 according to the modification of Embodiment 12 does not use the coupling chamber 161 for coupling used in FIG. 25A, and shares either the first discharge chamber 4 or the second discharge chamber 5.

In the present embodiment, the second discharge chamber 5 is shared.

In a case of further coupling, a filtration device unit 160-3 (not shown) may be provided next to the filtration device unit 160-2 to share the first discharge chamber 4.

According to the modification of the filtration system 100E-2 in the present embodiment, either the first discharge chamber 4 or the second discharge chamber 5 is shared without using the coupling chamber 161 used in the filtration system 100E-1. As a result, even when a throughput of the filtration device is increased, a capacity of the entire filtration device can be reduced. Since it is possible to reduce one of the coupling chamber 161 and the first discharge chamber 4 or the second discharge chamber 5, it is possible to reduce the number of components of the filtration device.

Embodiment 13

Figure 26:
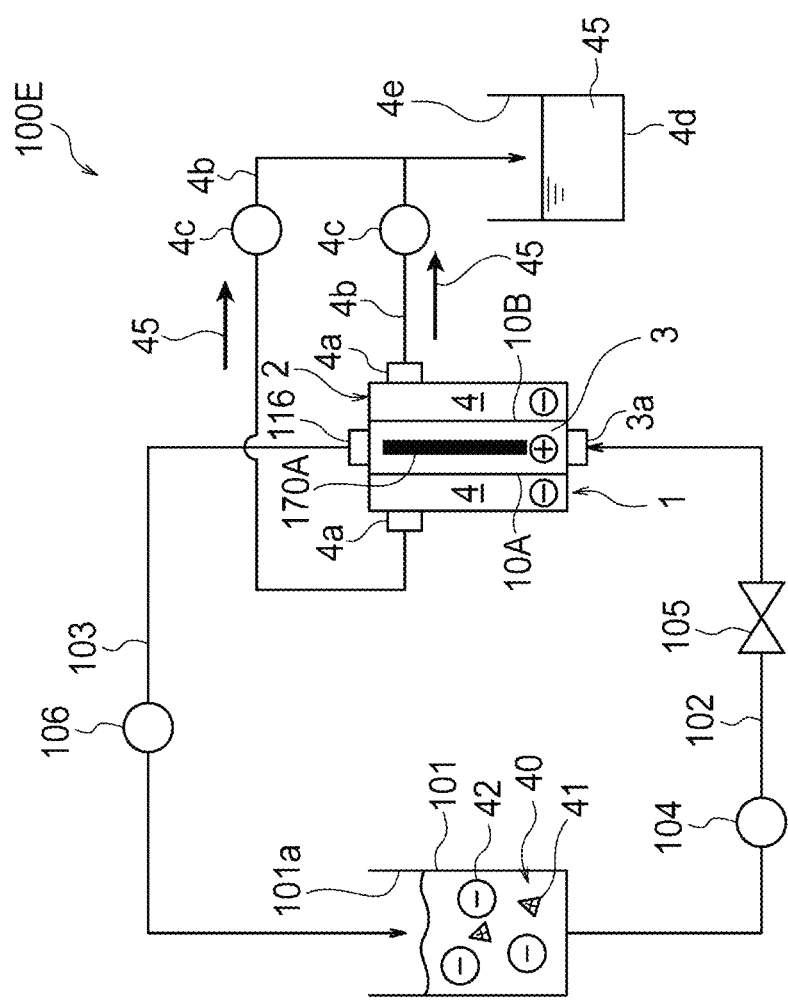
FIG. 26 is a diagram schematically showing a filtration system according to Embodiment 13.

FIG. 26 is a diagram schematically showing a filtration system according to Embodiment 13.

Figure 28:
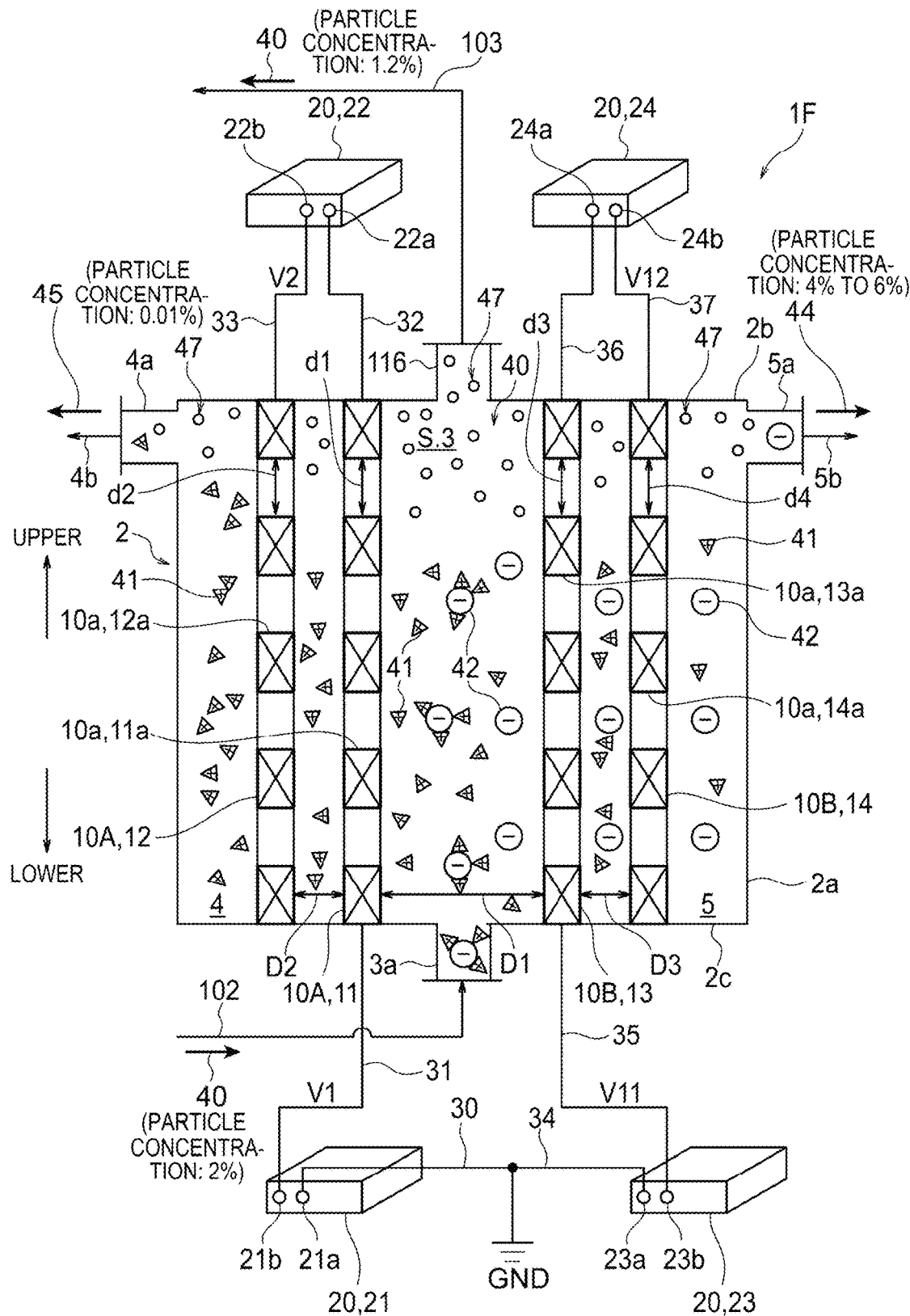
FIG. 28 is a schematic diagram schematically showing a filtration device according to Embodiment 7.
Figure 29:
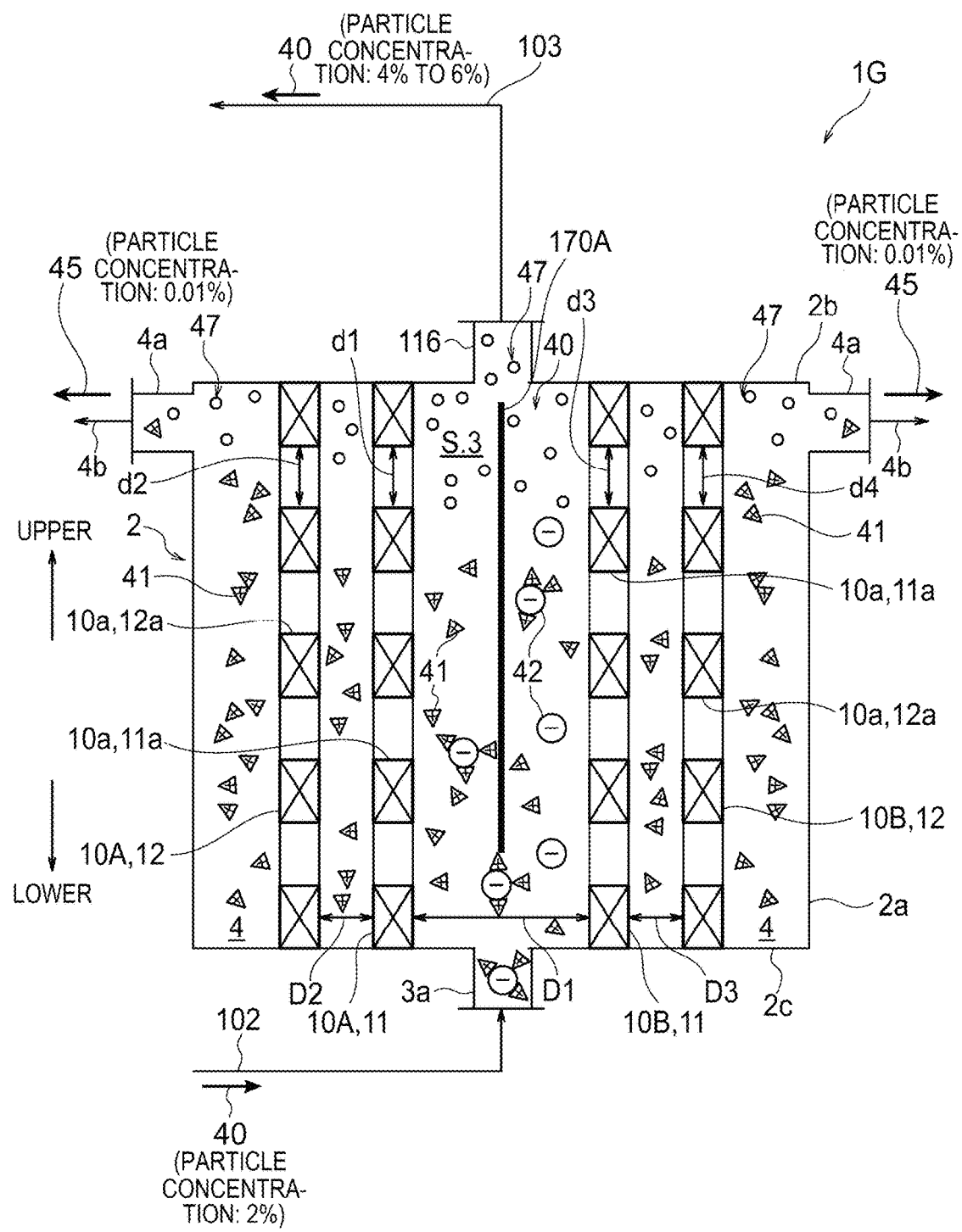
FIG. 29 is a schematic diagram schematically showing a filtration device according to Embodiment 13.
Figure 31A:
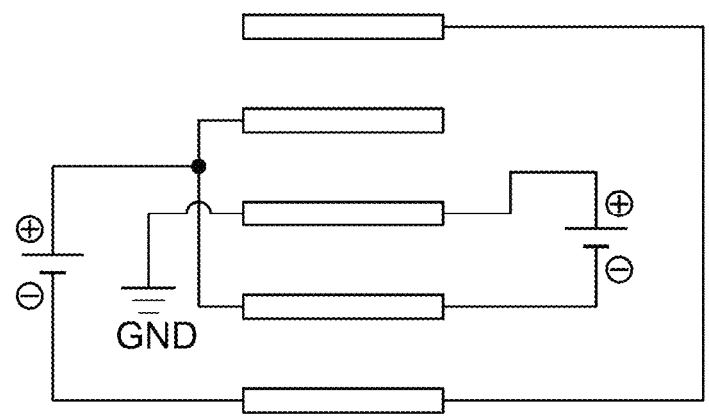
FIG. 31A is a parallel circuit diagram showing a power supply configuration of Embodiment 13 or 14.
Figure 31B:
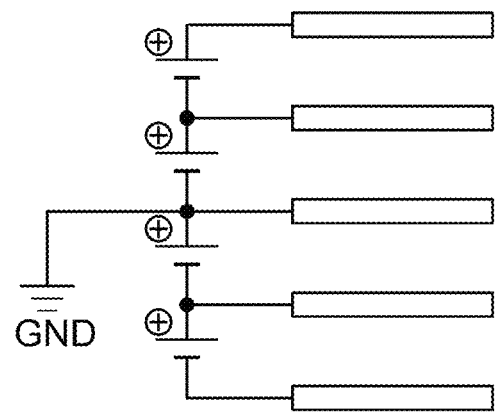
FIG. 31B is a series circuit diagram showing the power supply configuration of Embodiment 13 or 14.

FIG. 28 is a schematic diagram schematically showing a filtration device according to Embodiment 7, and is the same as FIG. 17. FIG. 29 is a schematic diagram schematically showing a filtration device according to Embodiment 13. FIG. 31A is a parallel circuit diagram showing a power supply configuration of Embodiment 13 and 14. FIG. 31A is a parallel circuit diagram. FIG. 31B is a series circuit diagram.

As shown in FIG. 26, the filtration system 100E according to Embodiment 13 is a filtration device 1G including: the filter chamber 3 to which the slurry 40 containing the particle (+) 42 and a liquid (the water molecule (−) 41) having different electric charges is supplied through the supply line (pipe) 102; the first electrode group 10A and the second electrode group 10B provided on both side surfaces of the filter chamber 3 to face each other and including at least one or both of two or more cathode electrodes or anode electrodes for separating the particle 42 and the liquid (the water molecule 41) in the slurry 40 by an electric field action; and the first discharge chamber 4 and the second discharge chamber 5 provided on a side of the electrode group opposite to the filter chamber 3 and configured to allow discharging of the concentrate 44 and the filtrate 45 that are separated substances.

The first electrode group 10A and the second electrode group 10B are cathode sides having the same polarity, the electrodes constituting the electrode group have pores, and an electrode 170A on an anode side having a polarity (+) different from the polarity (−) of the electrode groups 10A and 10B is disposed in the filter chamber 3.

Next, a case of increasing collection of the filtrate 45 will be described based on FIGS. 17, 26, 27, and 28.

As described above, in the filtration device 1F according to Embodiment 7 shown in FIG. 17, as shown in FIG. 28, the first discharge chamber 4 and the second discharge chamber 5 are respectively disposed on a left and right of the filtration chamber 3. As a result, the slurry 40 supplied to the filter chamber 3 is separated by the electric field action in the first electrode group 10A (11, 12) and the second electrode group 10B (13, 14) that are opposed to each other on the left and right with the filter chamber 3 as a center, and the filtrate 45 is separated into the first discharge chamber 4 and the concentrate 44 is separated into the second discharge chamber 5.

In contrast, in the filtration device 1G according to Embodiment 13, as shown in FIG. 29, a solid anode electrode is disposed in the filtration chamber 3, and the first electrode group 10A (11, 12) and the first electrode group 10B (11, 12) facing each other as cathode electrodes are respectively disposed on the left and right of the filter chamber 3. As a result, the water molecule 41 in the slurry 40 supplied to the filter chamber 3 is separated by an electric field action in the first electrode group 10A (11, 12) and the first electrode group 10A (11, 12) facing each other on the left and right with the filter chamber 3 as the center, and the filtrate 45 is separated into the first discharge chambers 4, 4 disposed on the left and right.

Accordingly, in the filtration device 1G according to Embodiment 13, the first discharge chambers 4, 4, which are ports for discharging the filtrate 45, are disposed on the left and right, so that a collection amount of the filtrate 45 can be doubled as compared with the filtration device 1F according to Embodiment 7 shown in FIG. 28.

Embodiment 14

Figure 27:
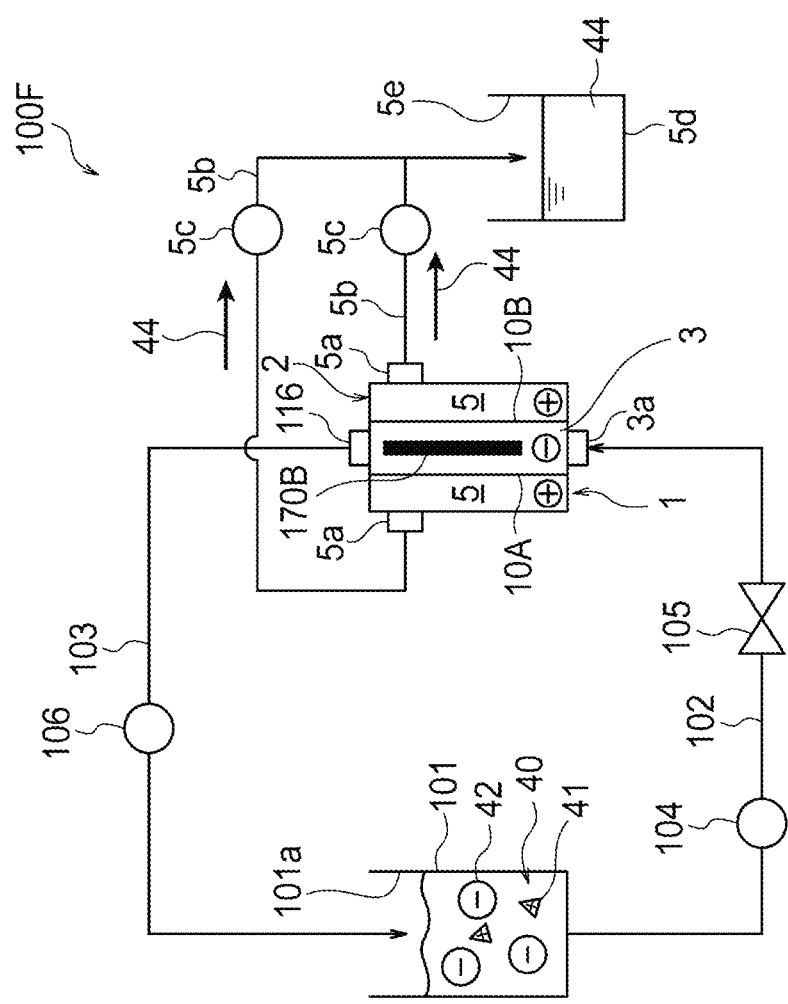
FIG. 27 is a diagram schematically showing a filtration system according to Embodiment 14.
Figure 30:
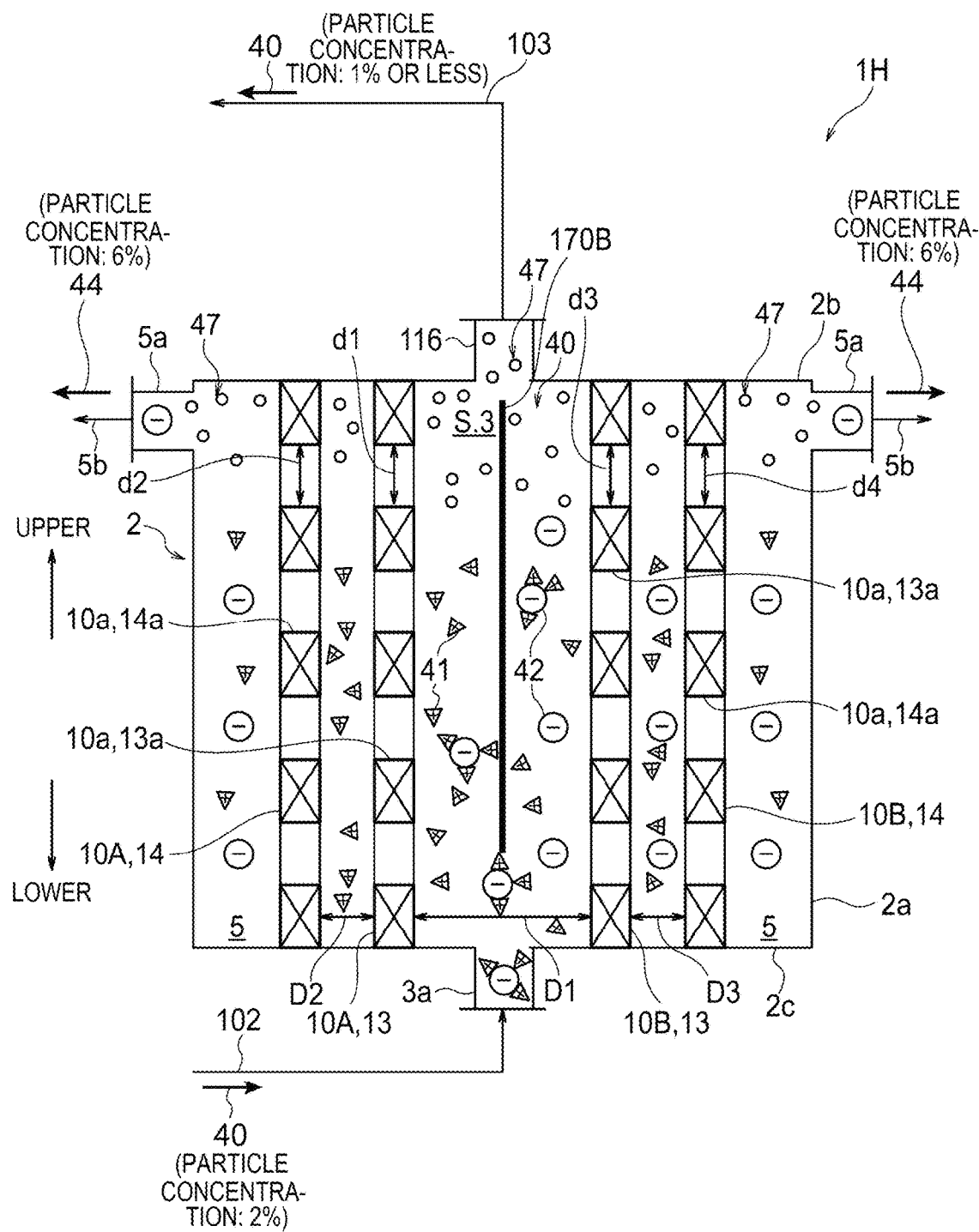
FIG. 30 is a schematic diagram schematically showing a filtration device according to Embodiment 14.

FIG. 27 is a diagram schematically showing a filtration system according to Embodiment 14. FIG. 30 is a schematic diagram schematically showing a filtration device according to Embodiment 14.

As shown in FIG. 27, the filtration system 100F according to Embodiment 14 includes: the filter chamber 3 to which the slurry 40 containing the particle (+) 42 and a liquid (the water molecule (−) 41) having different electric charges is supplied through the supply line (pipe) 102; the first electrode group 10A and the second electrode group 10B provided on both side surfaces of the filter chamber 3 to face each other and including at least one or both of two or more cathode electrodes or anode electrodes for separating the particle 42 and the liquid (the water molecule 41) in the slurry 40 by an electric field action; and the first discharge chamber 4 and the second discharge chamber 5 provided on a side of the electrode group opposite to the filter chamber 3 and configured to allow discharging of the concentrate 44 that is a separated substance. The first electrode group 10A and the second electrode group 10B are on the anode side having the same polarity. The electrodes constituting the electrode group have pores, and a electrode 170B on the cathode side having a polarity (+) different from the polarity (−) of the electrode group is disposed in the filter chamber 3.

Accordingly, a collection rate of the concentrate 44 can be doubled by disposing the second discharge chambers 5, 5, which are ports for discharging the concentrate 44, on a left and right.

In a filtration device 1H according to Embodiment 14, as shown in FIG. 30, cathode electrodes are disposed in the filter chamber 3, and the first electrode group 10A (13, 14) and the first electrode group 10B (13, 14) facing each other as anode electrodes are disposed on a left and right of the filtration chamber 3. As a result, the particle 42 in the slurry 40 supplied to the filter chamber 3 is separated by an electric field action in the first electrode group 10A (13, 14) and the first electrode group 10A (13, 14) including the anode electrodes facing each other on the left and right with the filter chamber 3 as a center, and the concentrate 44 is separated into the second discharge chambers 5, 5 disposed on the left and right.

Accordingly, in the filtration device 1H according to Embodiment 14, the second discharge chambers 5, 5, which are ports for discharging the concentrate 44, are disposed on the left and right sides, so that a collection amount of the concentrate 44 can be doubled as compared with the filtration device 1F according to Embodiment 7 shown in FIG. 28.

In the filtration device 1F according to Embodiment 7 in FIG. 28, when a concentration of the particles in the slurry 40 supplied through the supply line 102 into the filter chamber 3 is 2%, a concentration of the particles 42 in the remaining slurry 40 discharged from the filter chamber 3 through the circulation line 103 is 1.2%, a concentration of the particles 42 in the filtrate 43 discharged from the first discharge chamber 4 is 0.01%, and a concentration of the particles 40 in the concentrate 44 discharged from the second discharge chamber 5 is 4% to 6%.

In the filtration device 1G according to Embodiment 13 shown in FIG. 29, when a concentration of the particles in the slurry 40 supplied through the supply line 102 into the filter chamber 3 is 2%, a concentration of the particles 42 becomes 4% to 6% because the concentrate 44 is accompanied by the remaining slurry 40 discharged from the filter chamber 3 through the circulation line 103, and a concentration of the particles 42 in the filtrate 43 discharged from the first discharge chamber 4 becomes 0.01%.

In the filtration device 1H according to Embodiment 14 shown in FIG. 30, when a concentration of the particles in the slurry 40 supplied into the filter chamber 3 through the supply line 102 is 2%, a concentration of the particles 42 in the remaining slurry 40 discharged from the filter chamber 3 through the circulation line 103 is 1% or less, and a concentration of the particles 40 in the concentrate 44 discharged from the second discharge chamber 5 becomes 6%.

In Embodiments 13 and 14, the electrode disposed in the filter chamber 3 may or may not have holes, and may be a mesh electrode. A thickness of the electrode disposed in the filter chamber 3 is preferably, for example, about 0.05 mm to 5 mm.

APPENDIXES

The present embodiment includes the following configurations.

(1) A filtration device including:
a closed container having a filter chamber, a first discharge chamber, and a second discharge chamber inside;
a supply line configured to allow supply of a slurry in which a charged particle and a liquid are mixed;
a supply port configured to allow the supply line to communicate with the filter chamber;
a first discharge port configured to allow discharging of the liquid from the first discharge chamber;
a second discharge port configured to allow discharging of a concentrate from which the liquid is separated from the slurry from the second discharge chamber; and
a plurality of electrodes provided with a plurality of holes configured to allow the particle and the liquid to pass therethrough, in which
the plurality of electrodes include
a plurality of cathode electrodes that separate the filter chamber and the first discharge chamber, and
a plurality of anode electrodes that separate the filter chamber and the second discharge chamber,
the plurality of cathode electrodes include
a cathode first electrode, and
a cathode second electrode disposed closer to the first discharge chamber than the cathode first electrode,
the plurality of anode electrodes include
an anode first electrode facing the cathode first electrode across the filter chamber, and
an anode second electrode disposed closer to the second discharge chamber than the anode first electrode,
a cathode first potential having a same polarity as a polarity of the particle is supplied to the cathode first electrode,
a cathode second potential having a same polarity as the polarity of the particle is supplied to the cathode second electrode,
an absolute value of the cathode second potential is larger than an absolute value of the cathode first potential,
an anode first potential having a polarity different from the polarity of the particle is supplied to the anode first electrode,
the anode second potential having a polarity different from the polarity of the particles is supplied to the anode second electrode, and
an absolute value of the anode second potential is larger than an absolute value of the anode first potential.

(2) The filtration device according to (1), in which
the plurality of cathode electrodes include three or more electrodes, and
an absolute value of a cathode potential supplied to each of the plurality of cathode electrodes increases as a distance from the filter chamber increases.

(3) The filtration device according to (1) or (2), in which
the plurality of anode electrodes include three or more electrodes, and
an absolute value of an anode potential supplied to each of the plurality of anode electrodes increases as a distance from the filter chamber increases.

(4) The filtration device according to (1) or (2), in which
a filter material is provided between the plurality of cathode electrodes.

(5) The filtration device according to (1) or (2), in which
a dielectric having a plurality of holes is provided between the plurality of anode electrodes.

(6) The filtration device according to (5), in which
a diameter of the hole of the dielectric is 1000 nm or more and 4000 nm or less.

(7) The filtration device according to (1) or (2), further including:
a bleeder resistor;
a first electric interconnect having one end connected to the bleeder resistor; and
a second electric interconnect having one end connected to the bleeder resistor, in which
the other end of the first electric interconnect is connected to the electrode of the plurality of cathode electrodes that is farthest from the filter chamber, and
the other end of the second electric interconnect is connected to the electrode of the plurality of anode electrodes that is farthest from the filter chamber.

(8) The filtration device according to (1) or (2), further including:
neutralization electrodes disposed in the first discharge chamber and the second discharge chamber; and
a neutralization power supply configured to supply a neutralization potential having a polarity different from a polarity of the particle to the neutralization electrode, in which
an absolute value of the neutralization potential is larger than an absolute value of an anode potential supplied to the electrode of the plurality of anode electrodes that is farthest from the filter chamber.

(9) The filtration device according to (1) or (2), in which
an electrolytic corrosion prevention layer is provided on a surface of the electrode.

(10) The filtration device according to (1) or (2), further including:
a pump) configured to push the slurry inside the supply line toward the filter chamber.

(11) The filtration device according to (1) or (2), further including:
a plurality of cathode power supplies configured to supply cathode potentials to the plurality of cathode electrodes; and
a plurality of anode power supplies configured to supply anode potentials to the plurality of anode electrodes.

(12) The filtration device according to (1) or (2), in which
the first discharge chamber, the filter chamber, and the second discharge chamber are disposed in this order from above in a vertical direction.

(13) A method of operating the filtration device according to (1) or (2), in which
an anode potential supplied to the plurality of anode electrodes is set such that a force of an electric field generated between the plurality of anode electrodes becomes smaller than a filtration pressure in the filter chamber.

(14) The method of operating the filtration device according to (1) or (2), in which
after a force of an electric field generated between the plurality of anode electrodes is made larger than a filtration pressure in the filter chamber, an anode potential supplied to the plurality of anode electrodes is changed such that the force of the electric field becomes smaller than an excessive pressure in the filter chamber.

(15) A filtration system including:
a storage tank configured to store slurry in which a charged particle and a liquid are mixed;
a filtration device including a closed container in which an electrode is provided and configured to continuously perform solid-liquid separation of the slurry inside the closed container;
a supply line configured to allow continuous supply of the slurry from the storage tank to the inside of the closed container;
a circulation line configured to allow extracting of a part of the slurry from the inside of the closed container and allow continuous circulation of the slurry to the storage tank; and
a metering pump provided in the circulation line and configured to adjust a circulation amount of the slurry flowing through the circulation line per unit time to be smaller than a supply amount of the slurry flowing through the supply line per unit time.
(16) The filtration system according to (15), in which
the circulation line allows extracting of the slurry from an upper portion of the closed container.
(17) The filtration system according to (15) or (16), in which
the circulation line is provided with a gas vent valve.
(18) The filtration system according to (15) or (16), in which
the filtration device includes
the closed container having a filter chamber, a first discharge chamber, and a second discharge chamber inside,
a supply port configured to allow the supply line to communicate with the filter chamber,
a first discharge port configured to allow discharging of the liquid from the first discharge chamber,
a second discharge port configured to allow discharging of a concentrate from which the liquid is separated from the slurry from the second discharge chamber, and
a plurality of electrodes provided with a plurality of holes configured to allow the particle and the liquid to pass therethrough,
the plurality of electrodes include
a plurality of cathode electrodes that separate the filter chamber and the first discharge chamber, and
a plurality of anode electrodes that separate the filter chamber and the second discharge chamber,
the plurality of cathode electrodes include
a cathode first electrode, and
a cathode second electrode disposed closer to the first discharge chamber than the cathode first electrode,
the plurality of anode electrodes include
an anode first electrode facing the cathode first electrode across the filter chamber, and
an anode second electrode disposed closer to the second discharge chamber than the anode first electrode,
a cathode first potential having a same polarity as a polarity of the particle is supplied to the cathode first electrode,
a cathode second potential having a same polarity as the polarity of the particle is supplied to the cathode second electrode,
an absolute value of the cathode second potential is larger than an absolute value of the cathode first potential,
an anode first potential having a polarity different from the polarity of the particle is supplied to the anode first electrode,
the anode second potential having a polarity different from the polarity of the particles is supplied to the anode second electrode, and
an absolute value of the anode second potential is larger than an absolute value of the anode first potential.
(19) The filtration system according to (18), in which
the filter chamber, the first discharge chamber, and the second discharge chamber are disposed in a horizontal direction, and
the closed container has a take-out port through which an upper portion of the filter chamber communicates with the circulation line.
(20) The filtration system according to (19), in which
the first discharge port allows discharging of the liquid from an upper portion of the first discharge chamber.
(21) The filtration system according to (19), in which
the second discharge port allows discharging of the liquid from an upper portion of the second discharge chamber.
(22) The filtration system according to (18), further including:
a first discharge line connected to the first discharge port; and
a second discharge line connected to the second discharge port, in which
a gas vent valve is provided in the first discharge line and the second discharge line.
(23) The filtration system according to (18), in which
the plurality of cathode electrodes include three or more electrodes, and
an absolute value of a cathode potential supplied to each of the plurality of cathode electrodes increases as a distance from the filter chamber increases.
(24) The filtration system according to (18), in which
the plurality of anode electrodes include three or more electrodes, and
an absolute value of an anode potential supplied to each of the plurality of anode electrodes increases as a distance from the filter chamber increases.

REFERENCE SIGNS LIST 1, 1A to 1H filtration device
2 closed container
3 filter chamber
3a supply port
4 first discharge chamber
4a first discharge port
5 second discharge chamber
5a second discharge port
6 communication port
7 filter material
8 dielectric
10 electrode
10a hole
11 cathode first electrode
12 cathode second electrode
13 anode first electrode
14 anode second electrode
15 cathode third electrode
16 anode third electrode
20 power supply
21 cathode first power supply
22 cathode second power supply
23 anode first power supply 24 anode second power supply
25 cathode third power supply
26 anode third power supply
40 slurry
41 water molecule
42 particle
44 concentrate
45 filtrate
50 bleeder resistor
51 first electric interconnect
52 second electric interconnect
60 neutralization electrode
61 first neutralization electrode
62 second neutralization electrode
63 neutralization power supply
S closed space
Ea anode electric field
Ec cathode electric field
100, 100A to 100G filtration system
101 storage tank
102 supply line
103 circulation line
104 supply pump
106 circulation pump
110 compressor
111 washing tank
116 take-out port
120 washing drainage line
122 first gas vent valve
128 pressure adjustment line
129 back pressure valve
132 second gas vent valve
142 third gas vent valve
101a opening portion
101b pressure adjustment valve
160 filtration device unit
161 coupling chamber
170A anode electrode
170B cathode electrode

The invention claimed is:

1. A filtration device comprising:
a closed container having a closed space;
a filter chamber to which a slurry containing particles and a liquid having different electric charges is supplied through a supply line;
a first electrode group and a second electrode group, provided on both side surfaces of the filter chamber to face each other, the first electrode group including at least a first cathode electrode and a second cathode electrode configured to separate the particles and the liquid in the slurry into separated substances by a cathode electric field action generated between the first cathode electrode and the second cathode electrode, the second electrode group including at least a first anode electrode and a second anode electrode configured to separate the particles and the liquid in the slurry into separated substances by an anode electric field action generated between the first anode electrode and the second anode electrode;
a plurality of power supplies; and
a first discharge chamber and a second discharge chamber being configured to allow discharging of the separated substances,
wherein:
the first cathode electrode and the second cathode electrode are interposed between the filter chamber and the first discharge chamber, the first cathode electrode and the second cathode electrode comprising holes that allow the filter chamber to communicate with the first discharge chamber;
the first anode electrode and the second anode electrode are interposed between the filter chamber and the second discharge chamber, the first anode electrode and the second anode electrode comprising holes that allow the filter chamber to communicate with the second discharge chamber;
a number of the plurality of power supplies is the same as a number of electrodes contained in the first electrode group and the second electrode group, each electrode of the electrodes being connected to one power supply of the plurality of power supplies; and
the first electrode group and the second electrode group extend across an entirety of the filter chamber to divide the closed space.

2. The filtration device according to claim 1, wherein the electrode group between the filter chamber and the discharge chamber has a gradient in which an absolute value of a potential on a discharge chamber side is larger than an absolute value of a potential on a filter chamber side as the electrode group goes from the filter chamber side to the discharge chamber side.

3. The filtration device according to claim 1, wherein a vibrating member is provided in at least one location inside the filter chamber, the first discharge chamber, or the second discharge chamber.

4. The filtration device according to claim 1, wherein:
a unit including the filtration device is one unit module; and
a plurality of filtration device unit modules are coupled by a coupling chamber.

5. The filtration device according to claim 1, wherein:
a unit including the filtration device is one unit module; and
when modules including the filtration device unit are coupled, either the first discharge chamber or the second discharge chamber is shared.

6. The filtration device according to claim 1, wherein a first distance between the first cathode electrode and the second cathode electrode and a second distance between the first anode electrode and the second anode electrode are between 0.1 mm and 2 mm.

7. The filtration device according to claim 1, wherein an absolute value of a first cathode potential supplied to the first cathode electrode from a first cathode power supply of the plurality of power supplies and a second cathode potential supplied to the second cathode electrode from a second cathode power supply of the plurality of power supplies increases based on a distance of the first cathode electrode or the second cathode electrode from the filter chamber increasing, and
an absolute value of a first anode potential supplied to the first anode electrode from a first anode power supply of the plurality of power supplies and a second anode potential supplied to the second anode electrode from a second anode power supply of the plurality of power supplies increases based on a distance of the first anode electrode or the second anode electrode from the filter chamber increasing.

* * * * *